US012664102B2

(12) United States Patent    (10) Patent No.:   US 12,664,102 B2

Vangireddy et al.    (45) Date of Patent:    Jun. 23, 2026

(54) MEMORY MANAGEMENT

(71) Applicant: Arm Limited, Cambridge (GB)

(72) Inventors: Madhusudana Reddy Vangireddy, Anantapur (IN); John Michael Horley, Hauxton (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/859,246

(22) PCT Filed: Mar. 17, 2023

(86) PCT No.: PCT/GB2023/050658

§ 371 (c)(1),
(2) Date: Oct. 23, 2024

(87) PCT Pub. No.: WO2023/209324

PCT Pub. Date: Nov. 2, 2023

(65) Prior Publication Data

US 2025/0272252 A1    Aug. 28, 2025

(30) Foreign Application Priority Data

Apr. 28, 2022    (GB) ...................................... 2206166

(51) Int. Cl.
G06F 12/00     (2006.01)
G06F 12/14     (2006.01)

(52) U.S. Cl.
CPC ...... G06F 12/1483 (2013.01); G06F 12/1441 (2013.01); G06F 12/1491 (2013.01)

(58) Field of Classification Search
CPC ............. G06F 12/1483; G06F 12/1441; G06F 12/1491; G06F 12/1009; G06F 12/14
See application file for complete search history.

(56) References Cited

U.S. PATENT DOCUMENTS

2010/0088705 A1   4/2010   Attinella et al.
2015/0301951 A1*   10/2015   Bybell ................ G06F 12/1027
                                         711/207

(Continued)

OTHER PUBLICATIONS

International Search Report and Written Opinion for an International Application No. GB2023050658, dated Jun. 22, 2023.

(Continued)

*Primary Examiner* — Arvind Talukdar

(74) *Attorney, Agent, or Firm* — NIXON & VANDERHYE P.C.

(57)        ABSTRACT

A target virtual address is translated to a target physical address for a memory access request. At least for write requests, the memory access request is rejected when a target stage-1 translation table entry specifies that a target memory region corresponding to the target virtual address is a guarded control stack (GCS) region for storing a GCS data structure for protecting return state information, and the memory access request is not a GCS memory access request triggered by one of a restricted subset of GCS-accessing instruction types. When an anti-aliasing property is specified for the target memory region and the target stage-1 translation table entry or another stage-1 translation table entry used to locate the target stage-1 translation table entry is an unhardened entry unprotected by a translation hardening mechanism, the memory access request is rejected. In at least one operating state, a GCS memory access request is rejected when the anti-aliasing property is not specified for the target memory region.

18 Claims, 23 Drawing Sheets

(56) References Cited

U.S. PATENT DOCUMENTS

2017/0344492 A1    11/2017  Bolbenes et al.
2022/0091995 A1*   3/2022  Rodgers ............. G06F 12/1036

OTHER PUBLICATIONS

Examination Report and Notification of Intension to Grant for an
International Application No. GB2206166.7 dated Jul. 31, 2024.
International Search Report for an International Application No.
GB2206166.7, dated Jan. 10, 2023.
Bedichek, "Some Efficient Architecture Simulation Techniques,"
Department of Computer Science, FR-35 University of Washington
Seattle, Washington 98195.
Shanbhogue, "Security Analysis of Processor Instruction Set Archi-
tecture for Enforcing Control-Flow Integrity.".

* cited by examiner

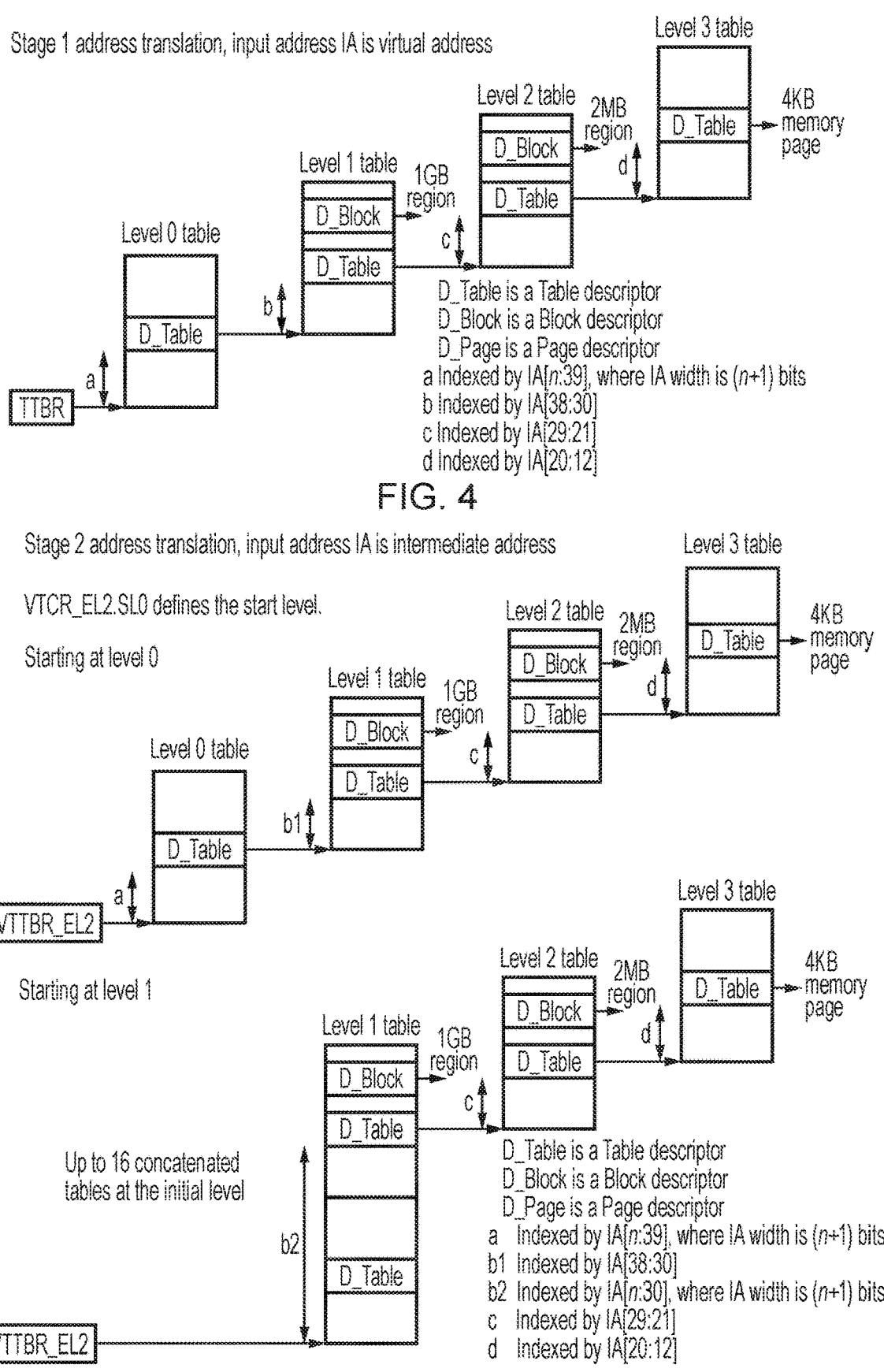

Stage 1 address translation, input address IA is virtual address

D_Table is a Table descriptor
D_Block is a Block descriptor
D_Page is a Page descriptor
a Indexed by IA[n:39], where IA width is (n+1) bits
b Indexed by IA[38:30]
c Indexed by IA[29:21]
d Indexed by IA[20:12]

FIG. 4

Stage 2 address translation, input address IA is intermediate address

VTCR_EL2.SL0 defines the start level.

Starting at level 0

Starting at level 1

Up to 16 concatenated tables at the initial level

D_Table is a Table descriptor
D_Block is a Block descriptor
D_Page is a Page descriptor
a   Indexed by IA[n:39], where IA width is (n+1) bits
b1  Indexed by IA[38:30]
b2  Indexed by IA[n:30], where IA width is (n+1) bits
c   Indexed by IA[29:21]
d   Indexed by IA[20:12]

FIG. 5

Write access control for memory regions marked by S2 permissions as partially-read-only, in response to different write request types:

| Write request types permitted to write to partially-read-only region | Write request types prohibited from writing to partially-read-only region |
|---|---|
| (optional) Write request issued in response to store instruction executed at EL2 or EL3 (including at least one type of store prohibited from writing to partially-read-only region if executed at EL0 or EL1) | Write request issued in response to at least one type of store instruction executed at EL0 or EL1 (e.g. majority of store instructions of the ISA) |
| Predetermined type of translation table entry updating instruction executed at EL1, for example:<br>• protected-entry-checking type of RCW instruction executed at EL1, when protected-entry checks are passed. | |
| Metadata-updating write request generated by MMU to update access tracking metadata in translation table entry (e.g. AF, write permission when DBM set) | | restricted subset of write request types permitted to write to partially-read-ony region when write issued at EL1

FIG. 9

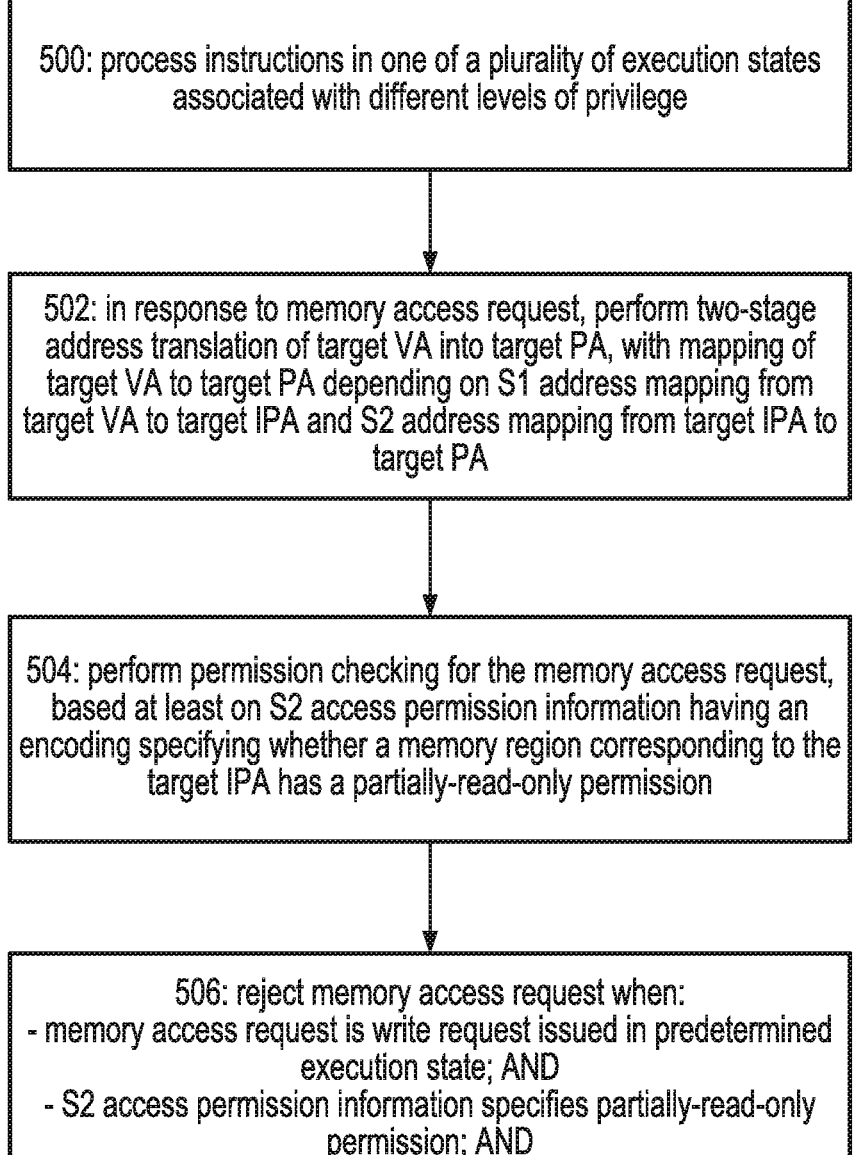

500: process instructions in one of a plurality of execution states associated with different levels of privilege 502: in response to memory access request, perform two-stage address translation of target VA into target PA, with mapping of target VA to target PA depending on S1 address mapping from target VA to target IPA and S2 address mapping from target IPA to target PA 504: perform permission checking for the memory access request, based at least on S2 access permission information having an encoding specifying whether a memory region corresponding to the target IPA has a partially-read-only permission 506: reject memory access request when:
- memory access request is write request issued in predetermined execution state; AND
- S2 access permission information specifies partially-read-only permission; AND
- write request is of a write request type other than a restricted subset of write request types

FIG. 10

Partially-read-only check

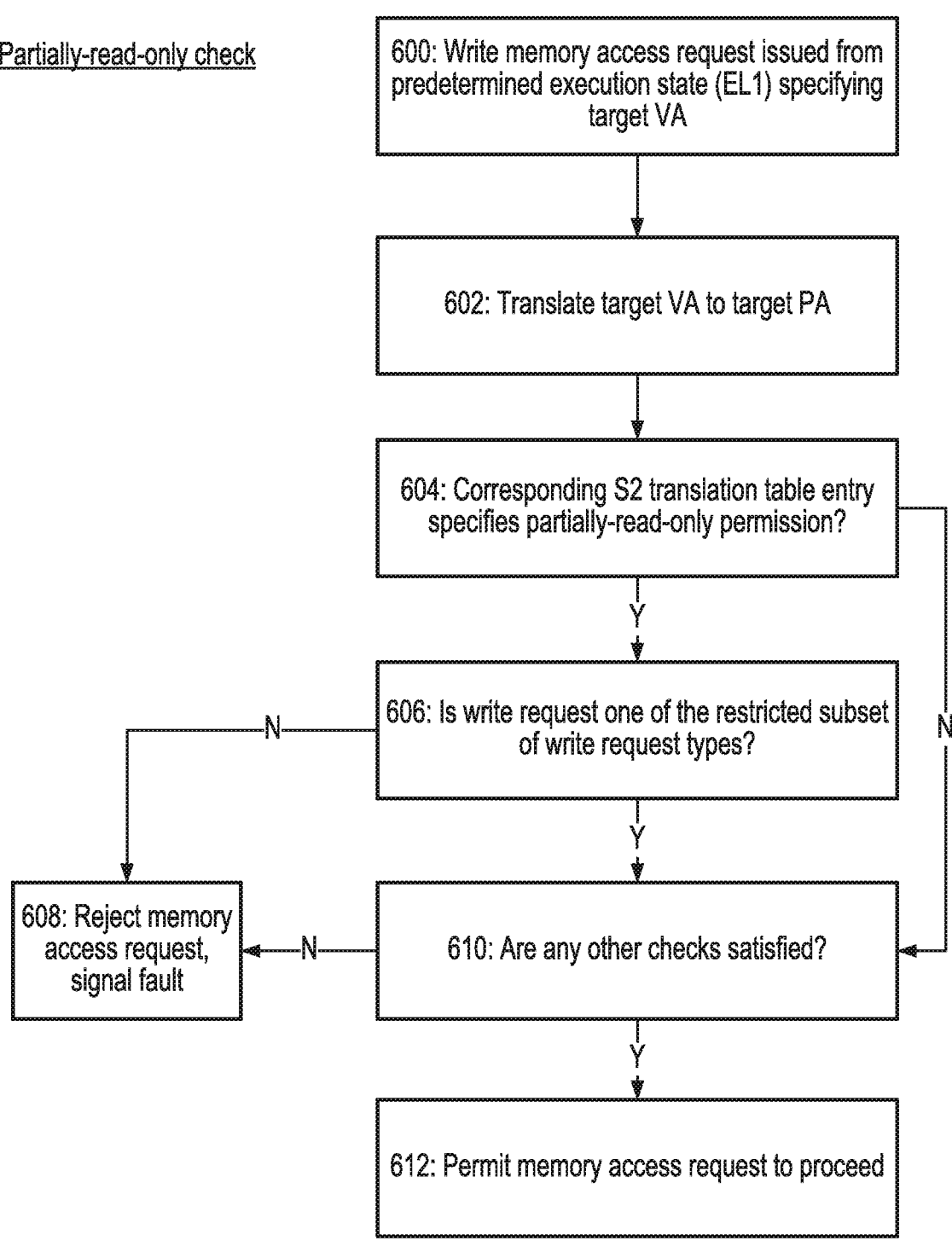

600: Write memory access request issued from predetermined execution state (EL1) specifying target VA 602: Translate target VA to target PA 604: Corresponding S2 translation table entry specifies partially-read-only permission?

606: Is write request one of the restricted subset of write request types?

608: Reject memory access request, signal fault

610: Are any other checks satisfied?

612: Permit memory access request to proceed

FIG. 11

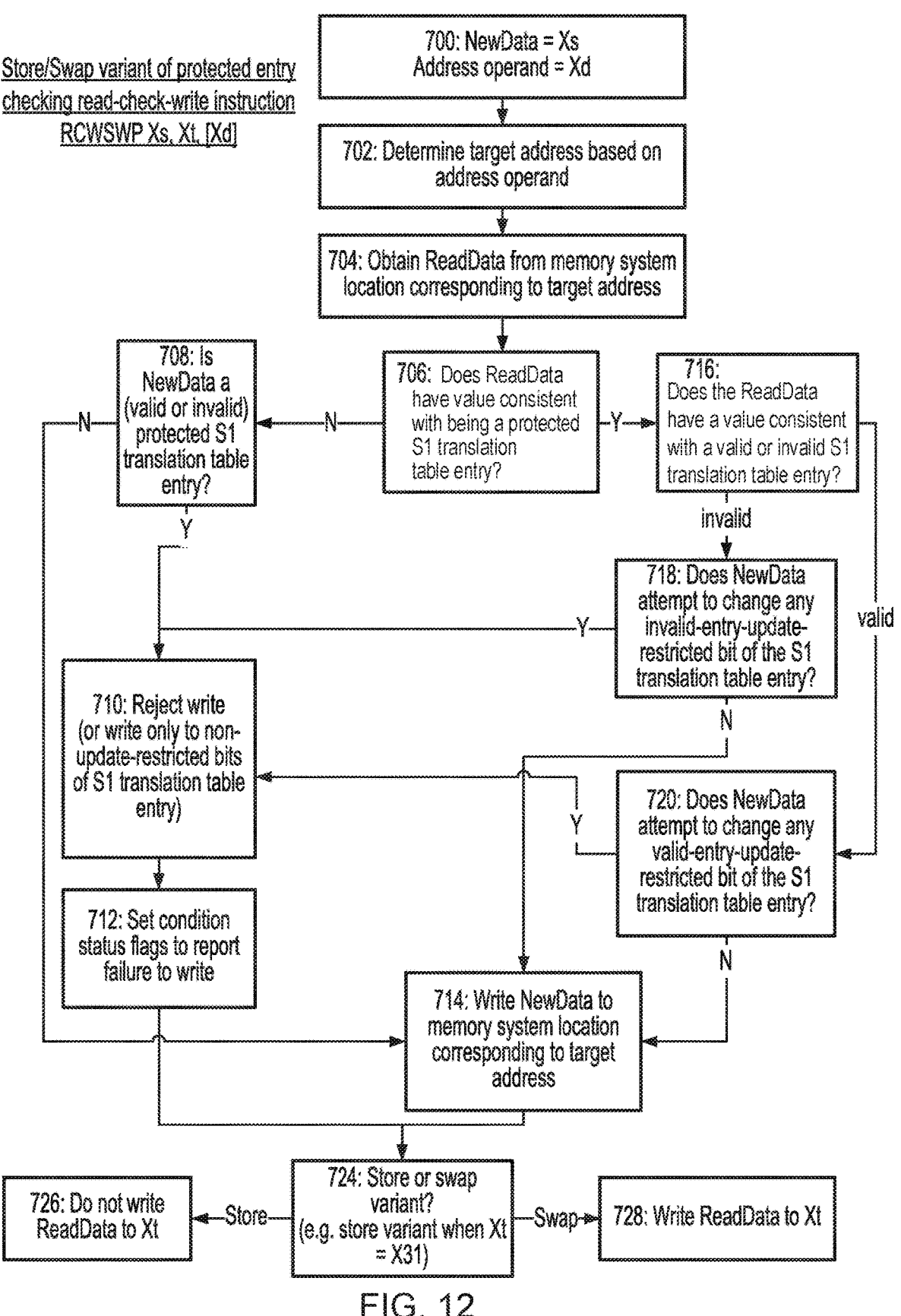

Store/Swap variant of protected entry checking read-check-write instruction RCWSWP Xs, Xt, [Xd]

700: NewData = Xs
Address operand = Xd

702: Determine target address based on address operand

704: Obtain ReadData from memory system location corresponding to target address 706: Does ReadData have value consistent with being a protected S1 translation table entry?

708: Is NewData a (valid or invalid) protected S1 translation table entry?

716: Does the ReadData have a value consistent with a valid or invalid S1 translation table entry?

718: Does NewData attempt to change any invalid-entry-update-restricted bit of the S1 translation table entry?

710: Reject write (or write only to non-update-restricted bits of S1 translation table entry)

720: Does NewData attempt to change any valid-entry-update-restricted bit of the S1 translation table entry?

712: Set condition status flags to report failure to write

714: Write NewData to memory system location corresponding to target address

726: Do not write ReadData to Xt

724: Store or swap variant? (e.g. store variant when Xt = X31)

728: Write ReadData to Xt

FIG. 12

Anti-aliasing check

S1 top-level base address check

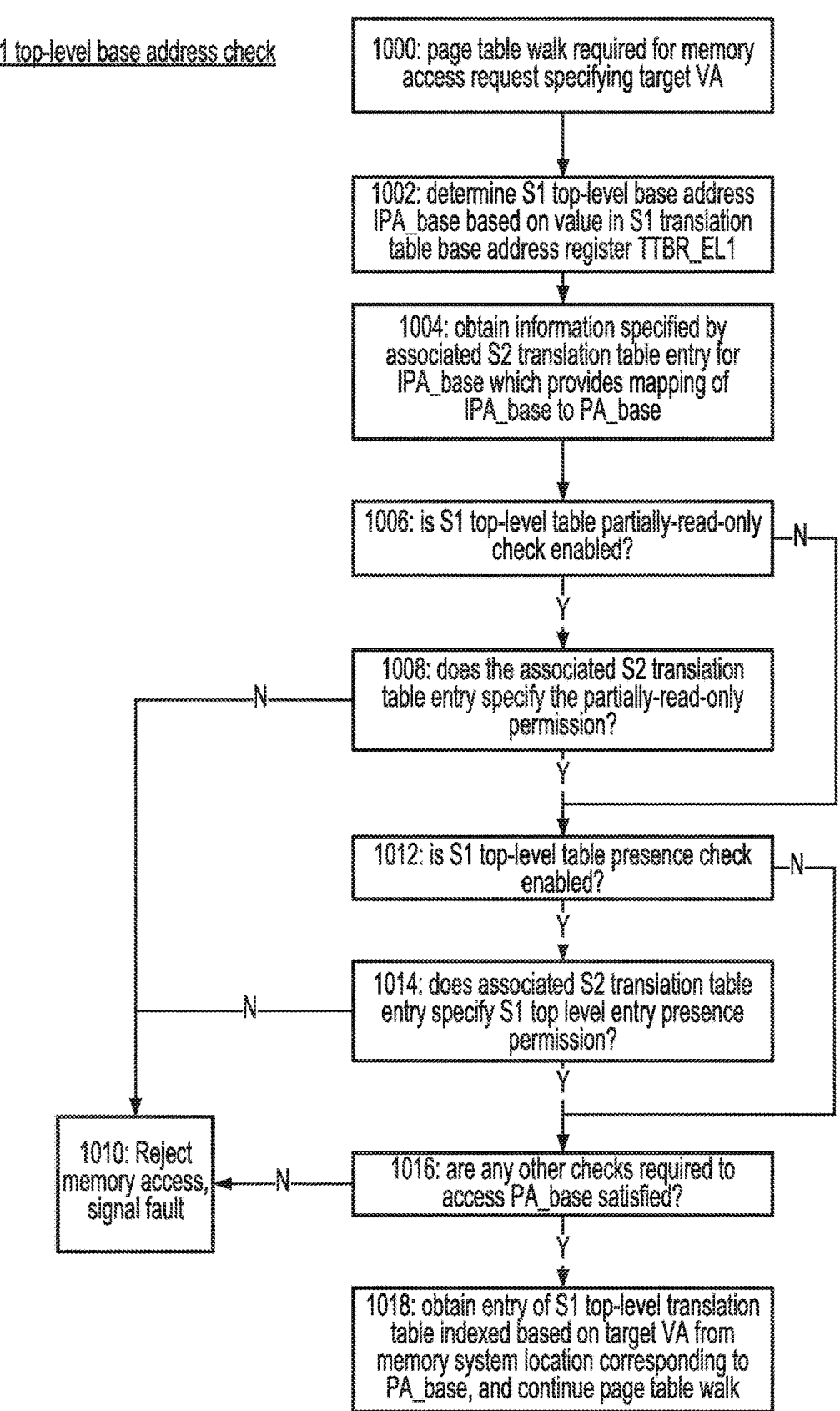

1000: page table walk required for memory access request specifying target VA

1002: determine S1 top-level base address IPA_base based on value in S1 translation table base address register TTBR_EL1

1004: obtain information specified by associated S2 translation table entry for IPA_base which provides mapping of IPA_base to PA_base 1006: is S1 top-level table partially-read-only check enabled?

1008: does the associated S2 translation table entry specify the partially-read-only permission?

1012: is S1 top-level table presence check enabled?

1014: does associated S2 translation table entry specify S1 top level entry presence permission?

1010: Reject memory access, signal fault

1016: are any other checks required to access PA_base satisfied?

1018: obtain entry of S1 top-level translation table indexed based on target VA from memory system location corresponding to PA_base, and continue page table walk

FIG. 17

S1/S2 translation table entry permissions field of translation
table entry references selected
field of permissions indirection
register permission
indirection
registers encoding 0
encoding 1
encoding 2
.
.
.
encoding N-1 selected field of permission
indirection register specifies
an encoding identifying
the permission type

MEMORY MANAGEMENT

The present technique relates to the field of data processing.

In a data processing apparatus, memory management circuitry is provided to control access to the memory system. The memory management circuitry is responsible for performing address translation to translate a target virtual address specified based on the operands of instructions executed by processing circuitry to a target physical address identifying a memory system location to be accessed. The memory management circuitry can also enforce access permissions, for example based on information specified in the translation table structures used to specify the mapping from the target virtual address to the target physical address.

At least some examples provide an apparatus comprising: processing circuitry to execute instructions in one of a plurality of execution states; and memory management circuitry to translate, in response to a memory access request specifying a target virtual address corresponding to a target memory region to be accessed, the target virtual address into a target physical address, where a mapping from the target virtual address to the target physical address depends at least on a stage-1 address mapping specified for the target virtual address by a target stage-1 translation table entry in a stage-1 translation table structure, the stage-1 translation table structure being accessible using a stage-1 base address settable by an instruction executed by the processing circuitry in a first execution state; in which: at least when the memory access request is a write request, the memory management circuitry is configured to reject the memory access request in response to determining that both of the following conditions are satisfied: stage-1 permission information specified by the target stage-1 translation table entry specifies that the target memory region is a guarded control stack (GCS) region for storing a GCS data structure for protecting return state information for returning from a function call or exception; and the memory access request is a request other than a GCS memory access request triggered by one of a restricted subset of GCS-accessing types of instruction; the memory management circuitry is configured to support a translation hardening mechanism for defining, based at least on translation hardening information settable by an instruction executed by the processing circuitry in a second execution state with greater privilege than the first execution state, at least one hardened stage-1 translation table entry which is protected by the translation hardening mechanism from being tampered with by an instruction executed in the first execution state; when an anti-aliasing property is specified for the target memory region, the memory management circuitry is configured to reject the memory access request in response to detecting that the target stage-1 translation table entry or another stage-1 translation table entry used to locate the target stage-1 translation table entry is an unhardened translation table entry which is unprotected by the translation hardening mechanism; and in at least one operating state of the processing circuitry, the memory management circuitry is configured to reject the memory access request in response to determining that the memory access request is said GCS memory access request and the anti-aliasing property is not specified for the target memory region.

At least some examples provide a method comprising: executing instructions in one of a plurality of execution states; and in response to a memory access request specifying a target virtual address corresponding to a target memory region to be accessed, translating the target virtual address into a target physical address, where a mapping from the target virtual address to the target physical address depends at least on a stage-1 address mapping specified for the target virtual address by a target stage-1 translation table entry in a stage-1 translation table structure, the stage-1 translation table structure being accessible using a stage-1 base address settable by an instruction executed by the processing circuitry in a first execution state; in which: at least when the memory access request is a write request, the memory access request is rejected in response to determining that both of the following conditions are satisfied: stage-1 permission information specified by the target stage-1 translation table entry specifies that the target memory region is a guarded-control-stack (GCS) region for storing a GCS data structure for protecting return state information for returning from a function call or exception; and the memory access request is a request other than a GCS memory access request triggered by one of a restricted subset of GCS-accessing types of instruction; a translation hardening mechanism is supported for defining, based at least on translation hardening information settable by an instruction executed in a second execution state with greater privilege than the first execution state, at least one hardened stage-1 translation table entry which is protected by the translation hardening mechanism from being tampered with by an instruction executed in the first execution state; and the method comprises: when an anti-aliasing property is specified for the target memory region, rejecting the memory access request in response to detecting that the target stage-1 translation table entry or another stage-1 translation table entry used to locate the target stage-1 translation table entry is an unhardened translation table entry which is unprotected by the translation hardening mechanism; and in at least one operating state of the processing circuitry, rejecting the memory access request in response to determining that the memory access request is said GCS memory access request and the anti-aliasing property is not specified for the target memory region.

At least some examples provide a computer program comprising instructions which, when executed by a host data processing apparatus, control the host data processing apparatus to provide an instruction execution environment for executing target code, the computer program comprising: processing program logic to simulate execution of instructions of the target code in one of a plurality of execution states; and memory management program logic to translate, in response to a memory access request specifying a target virtual address corresponding to a target memory region to be accessed, the target virtual address into a simulated target physical address, where a mapping from the target virtual address to the simulated target physical address depends at least on a stage-1 address mapping specified for the target virtual address by a target stage-1 translation table entry in a stage-1 translation table structure, the stage-1 translation table structure being accessible using a stage-1 base address settable by an instruction simulated as being executed in a first execution state; in which: at least when the memory access request is a write request, the memory management program logic is configured to reject the memory access request in response to determining that both of the following conditions are satisfied: stage-1 permission information specified by the target stage-1 translation table entry specifies that the target memory region is a guarded-control-stack (GCS) region for storing a GCS data structure for protecting return state information for returning from a function call or exception; and the memory access request is a request other than a GCS memory access request triggered by one of a restricted subset of GCS-accessing types of instruction; the memory management program logic is configured to support a translation hardening mechanism for defining, based at least on translation hardening information settable by an instruction simulated as being executed in a second execution state with greater privilege than the first execution state, at least one hardened stage-1 translation table entry which is protected by the translation hardening mechanism from being tampered with by an instruction simulated as being executed in the first execution state; when an anti-aliasing property is specified for the target memory region, the memory management program logic is configured to reject the memory access request in response to detecting that the target stage-1 translation table entry or another stage-1 translation table entry used to locate the target stage-1 translation table entry is an unhardened translation table entry which is unprotected by the translation hardening mechanism; and in at least one operating state of the processing circuitry, the memory management circuitry is configured to reject the memory access request in response to determining that the memory access request is said GCS memory access request and the anti-aliasing property is not specified for the target memory region.

The computer program may be stored on a computer-readable storage medium. The storage medium may be a non-transitory storage medium.

Further aspects, features and advantages of the present technique will be apparent from the following description of examples, which is to be read in conjunction with the accompanying drawings, in which:

FIGS. 4 and 5 illustrate an example of translation table walks for stage-1 and stage-2 address translation respectively;

FIG. 9 illustrates types of write request permitted and prohibited from writing to a partially-read-only memory region defined by a stage-2 translation table entry;

FIG. 10 illustrates a method for performing address translation and permission checking;

FIG. 11 is a flow diagram illustrating a check based on a partially-read-only permission;

FIGS. 12, 13 and 14 illustrate processing of different variants of a protected-entry-checking type of read-check-write instruction;

FIG. 17 illustrates a stage-1 top-level table presence check and a stage-1 top-level partially-read-only check;

Figure 1:
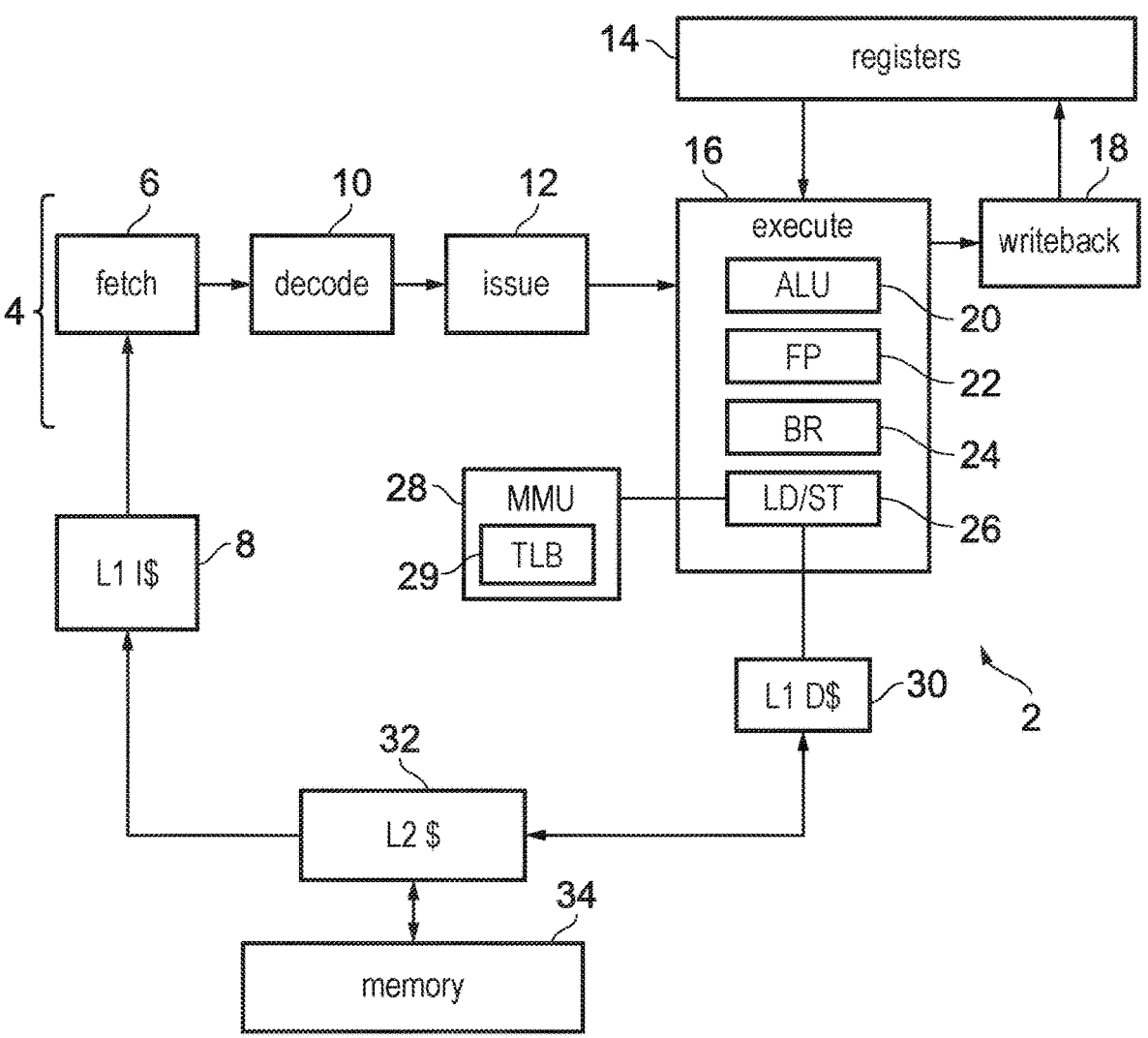
FIG. 1 illustrates an example of a data processing apparatus having processing circuitry and memory management circuitry.

An apparatus has processing circuitry to execute instructions in one of a number of execution states, and memory management circuitry to translate, in response to a memory access request specifying a target virtual address corresponding to a target memory region to be accessed, the target virtual address into a target physical address. A mapping from the target virtual address to the target physical address depends at least on a stage-1 address mapping specified for the target virtual address by a target stage-1 translation table entry in a stage-1 translation table structure. The stage-1 translation table structure is accessible using a stage-1 base address settable by an instruction executed by the processing circuitry in a first execution state.

Return-oriented-programming (ROP) based attacks are a common class of attacks on data processing systems. ROP attacks are attacks which attempt to cause a program to behave in an unexpected manner by corrupting the return state information used to return from a function call or an exception. Often software will save return state information to memory, e.g. to facilitate nesting of function calls or exceptions, where return state information for an outer function call or exception (of a nested set of function calls or exceptions) is saved to memory to preserve it before it can be overwritten in registers with return state information for an inner function call or exception. ROP attacks can attempt to tamper with the return state information while it is stored in memory, before it is restored to registers and used to control a function return or exception return. A successful ROP attack can cause the function return or exception return to return program flow to an instruction other than the next instruction after the point at which the function was called or the exception was taken, which can allow the attacker to control the processing circuitry to perform arbitrary operations other than the sequence of operations intended by the programmer.

To guard against ROP based attacks, it can be useful to provide a guarded control stack (GCS) data structure used to protect the return state information for returning from a function call or exception. Stage-1 translation table entries specify whether a memory region corresponding to a given virtual address is a GCS region for storing the GCS data structure. In response to a memory access request specifying a target virtual address, at least when the memory access request is a write request, the memory management circuitry rejects the memory access request in response to determining that both of the following conditions are satisfied:

stage-1 permission information specified by the target stage-1 translation table entry specifies that the target memory region is a guarded control stack (GCS) region for storing a GCS data structure for protecting return state information for returning from a function call or exception; and the memory access request is a request other than a GCS memory access request triggered by one of a restricted subset of GCS-accessing types of instruction.

Hence, a region of memory can be designated by a corresponding stage-1 translation table entry as a GCS region used to secure the return state information for function call or exception. The information stored in that region can be used to verify whether the return state information is appropriate before proceeding with a function return or exception return. Writes to a region designated as the GCS region are rejected if they are made in response to an instruction other than a restricted subset of GCS-accessing types of instruction. By restricting write access to the GCS region only to certain instruction types, this reduces the attack surface available to an attacker attempting to corrupt the return state information, since write requests triggered by other types of memory access instructions included within the program code being executed (if tricked into accessing the GCS region following modification of their address operands) would not be able to be used to successfully update the information stored in the GCS region. It is not essential to apply this restriction for read requests, as read requests cannot update the protected return state stored in the GCS region, but optionally some implementations could also choose to signal a fault when the target memory region for a read request is specified by the stage-1 permission information as a GCS region and the read request was not triggered by one of the restricted subset of GCS-accessing types of instruction.

However, as the stage-1 translation table entry is used to designate the GCS region, and the stage-1 translation table structure is accessed via a base register controllable by instructions executing in the first execution state (e.g. this could be a state in which an operating system is executed), then if an attacker is able to compromise the operating system or other software executing in the first execution state, they may be able to modify the stage-1 translation table entry corresponding to the GCS region so that the memory region is no longer specified as a GCS region, and/or create an aliasing stage-1 translation table entry which maps a different virtual address to a translated address of the GCS region without designating the corresponding memory region as a GCS region, in an attempt to circumvent the protection provided by the stage-1 translation table entry specifying the GCS region.

In the examples discussed below, the memory management circuitry supports a translation hardening mechanism for defining, based at least on translation hardening information settable by an instruction executed by the processing circuitry in a second execution state with greater privilege than the first execution state, at least one hardened stage-1 translation table entry which is protected by the translation hardening mechanism from being tampered with by an instruction executed in the first execution state. When an anti-aliasing property is specified for the target memory region, the memory management circuitry rejects the memory access request in response to detecting that the target stage-1 translation table entry or another stage-1 translation table entry used to locate the target stage-1 translation table entry is an unhardened translation table entry which is unprotected by the translation hardening mechanism. In at least one operating state of the processing circuitry, the memory management circuitry rejects the memory access request in response to determining that the memory access request is said GCS memory access request and the anti-aliasing property is not specified for the target memory region.

Hence, the following combination of measures is implemented:

Writes to GCS regions (indicated using stage-1 permission information) are restricted to being performed using certain designated GCS-accessing types of instruction;

Stage-1 translation table entries can be designated as hardened based on information settable by an instruction executed in a more privileged execution state than the first execution state which is able to control the base address of the stage-1 translation table structure;

Memory regions designated as having the anti-aliasing property are not accessible based on an unhardened stage-1 translation table entry; and GCS memory access requests are rejected if the anti-aliasing property has not been set for the target memory region.

This combination of measures allows the GCS data structure to be protected against tampering much more securely, because this enforces the requirement to apply the anti-aliasing property to any GCS memory region (otherwise GCS memory access requests are unsuccessful), while the anti-aliasing property enforces that no unhardened translation table entry (which may be vulnerable to modification by an attacker or could be an aliasing translation table entry which an attacker has defined to circumvent a hardened translation table entry) can be used to enable access to the GCS region when the anti-aliasing property is defined for the GCS region. Hence, this approach provides much greater protection against attacks based on return-oriented programming.

The GCS memory access requests may include read requests and write requests. GCS read requests may be triggered by one or more types of GCS-accessing load instruction and GCS write requests may be triggered by one or more types of GCS-accessing store instruction which trigger a write request. As mentioned above, GCS memory access requests are, in the at least one operating state, subject to the requirement that a fault is signalled if the anti-aliasing property is not specified for the target memory region. This fault can be signalled regardless of whether the GCS memory access request is a read request or a write request. Hence, both GCS-accessing load instructions and GCS-accessing store instructions may trigger the check of the anti-aliasing property and the fault if the anti-aliasing property is not specified for the target memory region (even if read requests to GCS regions of memory would not trigger a fault when caused by an instruction other than a GCS-accessing type of instruction).

The memory management circuitry may support two-stage address translation in which the stage-1 address mapping comprises a mapping from the target virtual address to a target intermediate address, and the address mapping from the target virtual address to the target physical address also depends on a stage-2 address mapping from the target intermediate address to the target physical address specified for the target intermediate address by a target stage-2 translation table entry in a stage-2 translation table structure. The stage-2 translation table structure is accessible using a stage-2 base address settable by an instruction executed by the processing circuitry in the second execution state. Two-stage address translation can be useful for supporting virtualisation where a number of guest operating systems may coexist on the same hardware platform. The second execution state may be an execution state for executing a hypervisor used to control virtualisation for the guest operating systems.

The anti-aliasing property may be settable by an instruction executed in the second execution state. The anti-aliasing property could be specified for the target memory region in a data structure maintained by software executing in the second execution state, separate from the stage-2 translation table structure.

However, as the stage-2 translation table structure may in any case be managed by the software executing in the second execution state, it can be most efficient for the target stage-2 translation table entry to specify whether the anti-aliasing property is specified for the target memory region.

Similarly, while the translation hardening information could include information defined by software executing in the second execution state using a separate data structure from the stage-2 translation table structure, it can be more efficient to reuse the stage-2 translation table structure to define permission information including the translation hardening information. Hence, for a given stage-1 translation table entry stored at a given memory region corresponding to a given intermediate address, the translation hardening information for specifying whether the given stage-1 translation table entry is a hardened stage-1 translation table entry includes stage-2 permission information specified by a corresponding stage-2 translation table entry corresponding to the given intermediate address.

It is not essential to provide any architectural mechanism for enforcing that software has set appropriate access permissions or address mappings to ensure that stage-2 translation table entries are protected against being updated by software executing in the first execution state or a less privileged state. It is typical for hypervisor software executing in the second execution state, which is responsible for stage-2 translation table structures, to take measures to protect those structures against modification by operating system software or other software executing in the first execution state (or a less privileged execution state than the first execution state). For example, the hypervisor could do this by allocating the entries of the stage-2 translation table structure to memory regions corresponding to physical addresses which are not mapped to any intermediate physical address in the stage-2 translation table structures used by software executing in the first execution state (or a less privileged state), so that the software in the first execution state has no way of accessing those regions (alternatively, read-only permissions could be used to protect the stage-2 translation table structures). The responsibility for defining appropriate translation table mappings and/or permissions to ensure that the memory regions storing the stage-2 translation table structures are protected against access by software executing in the first execution state may lie with software executing in the second execution state which controls the stage-2 translation table structures. Hence, while it may be preferable that, when the apparatus is in use, a hypervisor (or other software executing in the second execution state) configures the stage-2 translation table structures with address mappings and access permissions suitable to that software's own needs, so that the anti-aliasing property and the translation hardening information specified using stage-2 translation table entries can be restricted to being set by an instruction executed in the second execution state (or more privileged execution state) and cannot be set by an instruction executed in the first execution state (or less privileged execution state), there is no need for the hardware architecture of the apparatus to provide any special architectural measures for enforcing that those mappings/access permissions have actually been set to protect the stage-2 translation table structures against modification by software executing in the first execution state or a less privileged execution state. For example, there is no need for an architecturally-defined check to verify whether the stage-2 translation table entry used to define the anti-aliasing property (or the translation hardening information) has itself been protected against tampering. It may be assumed that the hypervisor software will set appropriate stage-2 address mappings/permissions to protect its own operation.

The translation hardening mechanism can be implemented in different ways. In general the translation hardening mechanism may be any architectural mechanism which allows certain hardened stage-1 translation table entries to be provided with greater protection against tampering than unprotected stage-1 translation table entries. For example, a stage-1 translation table entry could be provided with a certain encoding which marks the entry as hardened, and the processing circuitry or memory management circuitry could check on writes to memory whether data to be written has the hardened encoding of the stage-1 translation table entry, in which case the write could be suppressed. However, in practice enforcing such checks on every write to memory (including writes to memory regions not storing translation table entries) could be extremely performance intensive and consume a lot of power.

A more efficient mechanism for the translation hardening mechanism can be to specify stage-2 permission information using a stage-2 translation table entry which is used to provide the stage-2 address mapping for the region storing the hardened stage-1 translation table entry, where the stage-2 permission information has at least one encoding which indicates a permission type which restricts the ability for the data in the corresponding region to be modified. For example, that permission type may be a read-only permission indicating that write requests are prohibited and/or a partially-read-only permission type indicating that write requests are permitted only for a restricted subset of write request types.

For example, each hardened stage-1 translation table entry may comprises a stage-1 translation table entry for which the given memory region storing that stage-1 translation table entry is indicated by the stage-2 permission information of the corresponding stage-2 translation table entry as being one of:

a read-only memory region for which write requests are prohibited; and a partially-read-only memory region for which write requests to the partially-read-only memory region are permitted for a restricted subset of write request types and prohibited for write request types other than the restricted subset, the restricted subset of write request types comprising at least a metadata-updating write request generated by the memory management circuitry to update access tracking metadata in a translation table entry.

Some implementations may support only the read-only option for hardened stage-1 translation table entries. This may simplify implementation because read-only permissions may already be supported at stage-2 and enforcing the read-only permission may require less complex control logic.

Other implementations could choose to support the partially-read-only permission, which can be useful because a fully read-only permission may prevent access tracking metadata in a translation table entry being updated is by the memory management circuitry. Such metadata-updating write requests can be useful to enable the frequency of access to respective memory regions to be tracked, which can be useful for software such as an operating system to make decisions on which memory regions should be paged out to external storage and which memory regions should be retained within faster-to-access on-chip memory, for example. As the access tracking metadata may not affect the permissions defining what memory accesses are allowed to the corresponding address region, they may be safe to be updated even if write access is not permitted to other parts of stage-1 translation table entry. Hence, by supporting the partially-read-only permission, this may provide a better balance between security and ease of programming for software developers.

In some implementations, the only type of permission allowed at stage 2 for a hardened stage-1 translation table entry could be the partially-read-only permission.

However, in other implementations, a given stage-1 translation table entry may be regarded as a hardened stage-1 translation table entry if either the read-only permission or the partially-read-only permission is defined in the stage-2 permission information of the corresponding stage-2 translation table entry which defines the stage-2 address mapping for the memory region that stores the given stage-1 translation table entry. Hence, it can be useful for the stage-2 permission information to have encodings for indicating both the read-only memory region and the partially-read-only memory region, and for both these encodings to allow a corresponding stage-1 translation table entry (stored in the memory region to which that stage-2 permission information applies) to be regarded as hardened. This gives the programmer of hypervisor or other software executing in the second execution state the option of selecting whether read-only or partially-read-only permission is preferred for preventing tampering with the corresponding stage-1 translation table entry.

Setting a stage-2 permission to read-only or partially-read-only can be useful for hardening stage-1 translation table entries stored in the corresponding memory region, but in practice the stage-2 permissions are set at granularity of pages and a single page may store many stage-1 translation table entries. It may not be necessary to protect all of the stage-1 translation table entries stored within a given page against tampering by a compromised operating system or other software executing in the first execution state. However, once any stage-1 translation table entry stored in a given page requires hardening, then the read-only or partially-read-only stage-2 permission set for that page may cause write requests (or at least, write requests other than the restricted subset of write requests in the case of the partially-read-only permission) to fault causing an exception handler to be executed. This may not be a problem because even if it is still desired to allow an operating system to update the stage-1 translation table entries associated with non-sensitive information despite the corresponding memory region being set in the stage-2 access permissions to have the read-only or partially-read-only permission to protect other entries in that region against tampering, then one approach could be to trap each update to a hypervisor which could decide whether the update is permitted. However, such update requests may be relatively frequent and so trapping each legitimate translation table entry update to the hypervisor may cause loss of performance.

Such traps to the hypervisor can be avoided in an implementation which:

supports the partially read-only permission being defined in the stage-2 permission information as discussed above;

provides each stage-1 translation table entry with an encoding specifying whether that stage-1 translation table entry is a protected entry for which updates are restricted in comparison to unprotected stage-1 translation table entries not specified as a protected entry, and supports a write request type, included as one of the restricted subset of write request types allowed to write to a partially-read-only region of memory, which is allowed to update an unprotected stage-1 translation table entry but is prohibited from updating at least a subset of bits of a protected stage-1 translation table entry.

With this approach, a memory region marked with the partially read-only permission using the stage-2 permission information can contain a mixture of protected entries and unprotected entries, so that the hardware of the memory management circuitry may prevent at least a subset of bits protected within a protected stage-1 translation table entry being updated while unprotected entries can still be updated by software even though they are stored in a partially read-only region. This avoids the need to trap each update of an unprotected entry to the hypervisor, improving performance.

For example, the restricted subset of write request types (allowed to update unprotected stage-1 translation table entries stored in a partially-read-only region of memory) may include a write request issued in response to a protected-entry-checking type of read-check-write instruction. The apparatus may have protected-entry-checking circuitry responsive to the processing circuitry executing the protected-entry-checking type of read-check-write instruction for requesting an update to a given memory system location, to: read data from the given memory system location, check whether the data read from the given memory system location has a value consistent with a stage-1 translation table entry specified as a protected entry, and in response to determining that the data read from the given memory system location has a value consistent with a stage-1 translation table entry specified as a protected entry, prevent an update-restricted subset of bits of the stage-1 translation table entry from being updated in response to the read-check-write instruction. The update-restricted subset of bits could be all of the bits of the stage-1 translation table entry, or could be a proper subset (less than all bits) of the bits of the stage-1 translation table entry. The update-restricted subset of bits could be defined as a fixed subset of bits of the stage-1 translation table entry, or as a programmably defined subset of bits of the protected stage-1 translation table entry (e.g. with control information stored in a control register indicating which bits are the programmably defined subset of bits). By defining a special type of write request triggered by a particular type of read-check-write instruction that is allowed to update unprotected entries (and optionally unprotected bits of protected entries) within a partially-read-only region of memory (while other types of write request triggered by other load/store operations may not be considered one of the restricted subset of write request types allowed to update data stored in a partially-read-only region), this can avoid the need to trigger an exception to trap to the hypervisor (for checking whether data to be updated for a given write request is a protected entry) on every write to a partially-read-only region of memory.

In an implementation which supports defining stage-1 translation table entries as protected, the information indicating whether a given stage-1 translation table entry is specified as the protected entry may also be considered part of the translation hardening information. The memory management circuitry may treat an unprotected stage-1 translation table entry as an unhardened stage-1 translation table entry when the stage-2 permission information specified by the corresponding stage-2 translation table entry specifies that the given memory region is the partially-read-only memory region (unprotected entries stored in a read-only memory region can still be considered hardened). Hence, each hardened stage-1 translation table entry may comprise one of: a stage-1 translation table entry for which the given memory region is indicated by the stage-2 permission information as being a read-only memory region for which write requests are prohibited; and a stage-1 translation table entry specified as a protected entry for which the given memory region is indicated by the stage-2 permission information as a partially-read-only memory region. The unprotected stage-1 translation table entries could be modifiable in an arbitrary manner by software operating at the first execution state executing the protected-entry-checking type of read-check-write instruction, and so it is safest to treat these as unhardened even if stored in a partially-read-only memory region defined by stage-2 permission information. Unprotected entries would not be modifiable if stored in a read-only memory region, so there is no need to impose a requirement to be a protected entry for entries stored in a read-only memory region.

It will be appreciated that the specification of translation table entries as protected or unprotected is not an essential feature and some implementations may not support this. For example, implementations which are restricted to using the stage-2 read-only permission (not the partially-read-only permission) for hardening stage-1 translation table entries may not need to support the protected entry encoding, and even if the partially read-only permission is supported then implementations without support for the protected/unprotected stage-1 translation table entry encoding could either allocate only translation table entries intended to be hardened to a particular page marked with the partially read-only permission at stage-2, or could trap all writes to the corresponding region to the hypervisor, which may then determine whether an update requested by an operating system in the first execution state will be allowed depending on whether the data being updated is a stage-1 translation table entry intended to be hardened against tampering.

The translation hardening mechanism and anti-aliasing property described above may be generic architectural mechanisms which are not specific to protecting translation entries used to access the GCS data structure, but can also be used to protect against tampering and aliasing of other stage-1 translation table entries used for other data structures providing sensitive information desired to be protected against tampering by a compromised operating system. An alternative approach would be to define, in stage-2 permission information, a dedicated encoding identifying the corresponding memory region as a GCS memory region reserved for providing the guarded control stack structure. In this alternative approach, the GCS stage-2 permission would be applied to the memory region actually storing the GCS data structure, in contrast to the translation hardening information (e.g. read-only or partially-read-only permission) described above which would be applied (by software when the apparatus is in use) at stage-2 for the memory region which stores the stage-1 translation table entry used to give access to the GCS data structure. However, a disadvantage of defining dedicated GCS permissions at stage-2 is that there may be a limited amount of encoding space available for defining permissions information for a given stage-2 translation table entry, and so defining a dedicated GCS permission may waste valuable encoding space which could be more useful for other purposes. By reusing, for the purpose of protecting a GCS structure, a generic architectural mechanism applicable for hardening stage-1 address translations against tampering in general, but rejecting GCS memory access requests if the anti-aliasing property has not been specified for the targeted memory region (to prevent GCS access if there is a risk of the translation hardening mechanisms not having been applied), this can avoid needing to expend encoding space in stage-2 translation table entries on dedicated protection for guarded control stack data structures used to protect return state information, and so can result in more efficient encoding of translation table structures.

It is not necessary for the anti-aliasing property to be checked for GCS memory access requests issued in all operating states of the processing circuitry. A GCS-translation-hardening-check enable control parameter may be provided (e.g. in a control register) which can be set to an enable state and a disable state. The at least one operating state of the processing circuitry (in which the GCS memory access request is rejected if the anti-aliasing property is not set for the target memory region) may comprise an operating state in which the GCS-translation-hardening-check enable control parameter is set to an enable state indicating that GCS memory access requests are to be subject to a check of whether the anti-aliasing property is specified for the target memory region. If the GCS-translation-hardening-check enable control parameter is in the disable state, whether the GCS memory access request is allowed may be determined independent of whether the anti-aliasing property is set for the target memory region (hence when the GCS-translation-hardening-check is disabled, it would be possible for a GCS memory access request to be allowed even if the anti-aliasing property is not set for the target memory region). Providing an enable/disable control for the GCS-translation-hardening check can be useful to enable backwards compatibility when executing legacy software which may have been written for an architecture not supporting the anti-aliasing property, in which case the GCS anti-aliasing check can be disabled.

As mentioned above, a write request to a GCS region is rejected if it is not triggered by one of a restricted subset of GCS-accessing types of instruction (optionally, read requests could also be rejected if not triggered by a GCS-accessing type of instruction, although this is not essential). The memory management circuitry may also reject a memory access request (including both write requests and read requests) in response to determining that the memory access request is the GCS memory access request and that the stage-1 permission information does not specify that the memory region corresponding to the target virtual address is the GCS region. This reduces the attack surface available to an attacker because it means that GCS memory access requests can only be used for accessing GCS regions and cannot be used for accessing regular memory regions used to store other data. This means that if the address operands of a GCS-accessing type of instruction are modified by the attacker (or caused to be incorrect by the attacker forcing an incorrect sequence of program flow), so as to cause the GCS memory access requests to access a non-GCS region, this is detected as an error and the request to access memory will be rejected.

A number of different types of instruction may be supported as part of the restricted subset of GCS-accessing types of instruction.

For example, the restricted subset of GCS-accessing types of instruction may comprise a return state push instruction to control the processing circuitry to push return state information, obtained based on information indicated in one or more registers of the processing circuitry, to the GCS data structure. In some examples, the return state push instruction could be a dedicated GCS-specific instruction, which is specific to controlling pushing of return state information to the GCS data structure. However, it is also possible for at least one variant of the return state push instruction to be an instruction which, in addition to pushing of return state information to the GCS data structure, also controls the processing circuitry to perform another operation (e.g. an operation which often be performed by software when calling a function or handling an exception). For example, the other operation could be a function-calling branch operation which triggers a branch to a target address and also controls a function return address to be saved to a register (e.g. a register called a "link register"). For example, a "branch-with-link" instruction (for controlling the processing circuitry to perform such a function-calling branch operation) could also act as the return state push instruction when executed in a GCS mode of the processing circuitry for supporting use of the GCS data structure. When GCS mode is disabled, the branch-with-link instruction may cause the processing circuitry to perform the function-calling branch operation but not the operation to push the return state information to the stack data structure. When the GCS mode is enabled, the branch-with-link instruction may cause the processing circuitry to perform both the function-calling branch operation and the push of the return state information to the stack data structure (for this particular example, the return state information may include the function return address saved to the link register in response to the branch-with-link instruction).

The restricted subset of GCS-accessing types of instruction may also comprise a return state pop instruction to control the processing circuitry to pop return state information from the GCS data structure. In some examples, the return state pop instruction could also control the processing circuitry to signal a fault condition in response to determining a mismatch between the return state information popped from the GCS data structure and current return state information determined based on information indicated in one or more registers of the processing circuitry. Other examples may define a separate return state verifying instruction which does not itself pop return state information from the GCS data structure but verifies whether protected return state popped from the GCS data structure by an earlier return state pop instruction matches the current return state information determined based on the information in registers. A number of variants of return state push and pop instructions could be supported in an instruction set architecture supported by the processing circuitry, for example including variants dedicated to pushing/popping exception return state information and function (procedure) return state information respectively.

Again, the return state pop instruction could be a dedicated GCS-specific instruction, or could be a repurposed variant of another type of instruction which also performs another operation. For example, the return state pop instruction could also control the processing circuitry to perform an exception return. For example, when executed when GCS mode is disabled, an exception return instruction may control the processing circuitry to perform the exception return based on intended exception return state information defined in registers (but not the popping of protected return state information from the GCS data structure and verification of the intended exception return state information against the protected return state information). When the exception return instruction is executed in GCS mode, the exception return instruction may control the processing circuitry to perform both the exception return and the popping of protected return state information from the GCS data structure and verification of the intended exception return state information against the protected return state information.

The apparatus may have at least one GCS-pointer register to store a stack pointer indicative of an address of the guarded-control-stack data structure. The GCS-accessing types of instruction may determine their target virtual address with reference to the stack pointer stored in the GCS-pointer register. In some examples, there may be more than one GCS-pointer register, each GCS-pointer register indicating the stack pointer to be used in a respective execution state of the processing circuitry.

Where information is specified by a particular translation table entry (whether a stage-1 or stage-2 translation table entry), that information can be specified either directly in the encoding of the translation table entry, or indirectly with reference to information stored within a register referenced by the translation table entry. For example, for an indirect reference, a permission indirection register may be provided comprising a number of fields which can be set by software to indicate a particular permission type, and a translation table entry may specify field selection information indicating which fields of the permission indirection register specifies the permission to be applied to the corresponding memory region. This indirect permission approach can be used for a number of different permission types, including the read-only or partially read-only permissions provided at stage-2 as discussed above, and/or the definition of the particular memory region as a GCS region at stage-1, and/or the definition of the anti-aliasing property for the target memory region. For example, the stage-1 permission information specifying whether the target memory region is the GCS region may be specified in a field of a permission indirection register referenced by the target stage-1 translation table entry. Similarly, the stage-2 permission information (specifying whether the target memory region is read-only or partially-read-only) could also be specified in a field of a permission indirection register referenced by the target stage-2 translation table entry. Indirect permission using a permission indirection register can be useful for a number of reasons. For example, indirect permission specification allows software to update the permission type applied to two or more different memory regions (which all reference the same field of a permission indirection register) using a single write to a register, rather than needing to update each separate translation table entry corresponding to those memory regions. Also, in some translation table entry formats there may be insufficient encoding space to encode every possible permission type desired to be encoded, and so use of permission indirection can allow a limited number of bits within the entry encoding itself to reference a larger field of a permission indirection register which is able to select from a wider range of permissions than is possible within the entry itself. Nevertheless, other approaches may specify the relevant permissions directly within the encoding of the translation table entry. Therefore, it will be appreciated that when this application indicates that information is "specified by" a translation table entry, this information could either be directly specified in the encoding of the translation table entry or specified indirectly via a permission indirection register (or a mixture of both direct and indirect specification of the information).

Also, in some implementations, certain bits of a translation table entry or the permission information specified directly or indirectly by the translation table entry could be interpreted in different ways depending on control state specified in a control register of the apparatus. For example, a control parameter stored in a control register could control whether a certain bit (or bitfield) of permission information is interpreted in a first manner or a second manner. This can be helpful to enable legacy software to operate according to a legacy encoding scheme and newer software to interpret the same bits according to a different encoding scheme. Hence, when it is stated that permission information specifies some information (or has an encoding identifying that information), it is not necessary that the permission information specifies that information in all operating modes of the apparatus, as in some cases it may depend on the current setting for at least one control parameter stored in at least one control register whether that permission information is deemed to specify that information.

The techniques discussed above may be implemented within a data processing apparatus which has hardware circuitry provided for implementing the processing circuitry and memory management circuitry discussed above.

However, the same technique can also be implemented within a computer program which executes on a host data processing apparatus to provide an instruction execution environment for execution of target code. Such a computer program may control the host data processing apparatus to simulate the architectural environment which would be provided on a hardware apparatus which actually supports target code according to a certain instruction set architecture, even if the host data processing apparatus itself does not support that architecture. The computer program may have processing program logic and memory management program logic which emulates functions of the processing circuitry and memory management circuitry discussed above, including support for the GCS region, translation hardening mechanism, anti-aliasing property and policing (for GCS memory access requests) of whether the anti-aliasing property has been specified for the target memory region, as discussed above. Such a simulation program can be useful, for example, when legacy code written for one instruction set architecture is being executed on a host processor which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture. The simulation program may be stored on a storage medium, which may be an non-transitory storage medium.

Specific Example of Data Processing Apparatus

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU), which is an example of memory management circuitry, 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and access permissions which govern, for example, whether a given process executing on the pipeline is allowed to read, write or execute instructions from a given memory region.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness. While FIG. 1 shows a single processor core with access to memory 34, the apparatus 2 also could have one or more further processor cores sharing access to the memory 34 with each core having respective caches 8, 30, 32.

Figures 2, 3:
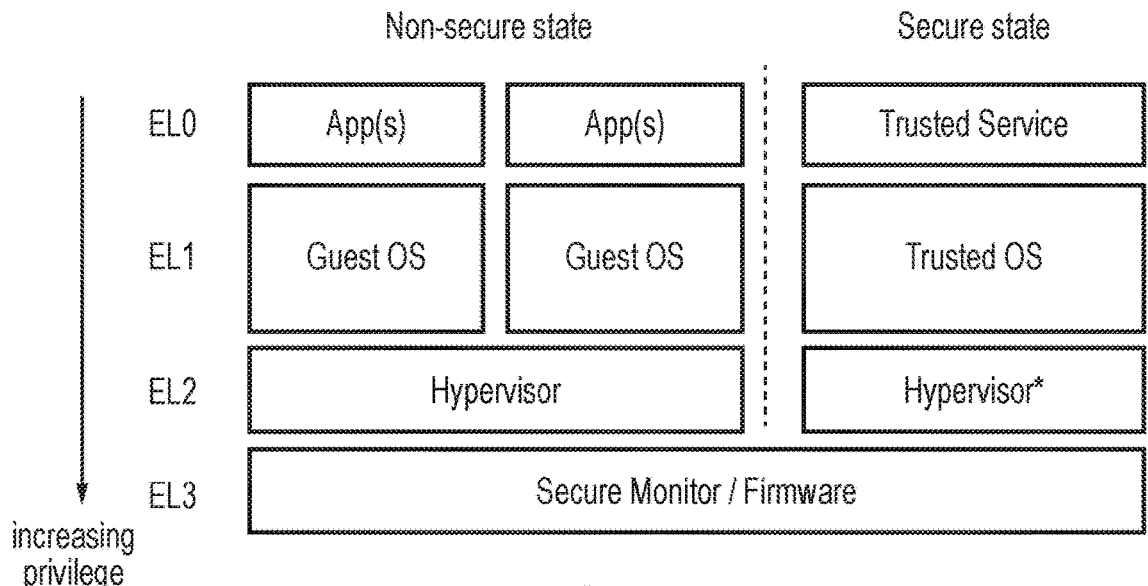
FIG. 2 illustrates an example of execution states of the processing circuitry.
FIG. 3 illustrates two-stage address translation.

FIG. 2 is a diagram illustrating different execution states (also referred to as exception levels) in which the processing circuitry 4 can operate when executing instructions. In this example there are four exception levels EL0, EL1, EL2, EL3, where exception level EL0 is the least privileged exception level and exception level EL3 is the most privileged exception level. In general, when executing in a more privileged exception level, the processing circuitry may have access to some memory locations or registers 14 which are inaccessible to lower, less privileged, exception levels.

In this example, exception level EL0 is for executing applications which are managed by corresponding operating systems or virtual machines executing at exception level EL1. Where multiple virtual machines coexist on the same physical platform then a hypervisor may be provided operating at EL2, to manage the respective virtual machines. Although FIG. 2 shows examples where the hypervisor manages the virtual machines and the virtual machines manage applications, it is also possible for a hypervisor to directly manage applications at EL0.

Although not essential, some implementations may implement separate hardware-partitioned secure and non-secure domains of operation for the processing circuitry. The data processing system 2 may have hardware features implemented within the processor and the memory system to ensure that data and code associated with software processes operating in the secure domain are isolated from access by processes operating in the non-secure domain. For example, a hardware architecture such as the TrustZone® architecture provided by Arm® Limited of Cambridge, UK may be used. Alternatively other hardware enforced security partitioning architectures could be used. Secure applications (trusted services) may operate in exception level EL0 in the secure domain and secure (trusted) operating systems or virtual machines may operate in exception level EL1 in the secure domain. In some implementations, there is no support for EL2 in the secure state and the hypervisor may execute solely in non-secure EL2. In other implementations, there may be support for a secure hypervisor executing in secure EL2 as indicated by the asterisk in FIG. 2. In some examples, a secure monitor program for managing transitions between the non-secure domain and the secure domain may be provided executing in exception level EL3. Other implementations could police transitions between the security domains in hardware so that the secure monitor program may not be needed.

Address Translation

One task performed by the MMU 28 is address translation between virtual addresses (VAs) and physical addresses (PAs). Software executing on the processing circuitry 4 specifies memory locations using virtual addresses, but these virtual addresses can be translated by the MMU 28 into physical addresses identifying the memory system location to access. A benefit of using virtual addresses is that it allows management software, such as an Operating System (OS), to control the view of memory that is presented to software. The OS can control what memory is visible, the virtual address at which that memory is visible, and what accesses are permitted to that memory. This allows the OS to sandbox applications (hiding the resources of one application from another application) and to provide abstraction from the underlying hardware. Another benefit of using virtual addresses is that an OS can present multiple fragmented physical regions of memory as a single, contiguous virtual address space to an application. Virtual addresses also benefit software developers, who will not know a system's exact memory addresses when writing their application. With virtual addresses, software developers do not need to concern themselves with the physical memory. The application knows that it is up to the OS and the hardware to work together to perform the address translation.

In practice, each application can use its own set of virtual addresses that will be mapped to different locations in the physical system. As the operating system switches between different applications it re-programs the map. This means that the virtual addresses for the current application will map to the correct physical location in memory.

Virtual addresses are translated to physical addresses through mappings. The mappings between virtual addresses and physical addresses are stored in translation tables (sometimes referred to as page tables). Translation tables are stored in memory and are managed by software, typically an OS or hypervisor. The translations tables are not static, and the tables can be updated as the needs of software change. This changes the mapping between virtual and physical addresses.

For memory accesses performed when the processing circuitry 4 is in a certain subset of execution states (in particular, when the processing circuitry 4 is in non-secure EL0 or non-secure EL1), two-stage address translation is used as shown in FIG. 3 (for other execution states one stage of address translation using the stage-1 page tables is sufficient). Hence, the virtual addresses from Non-secure EL0 and Non-secure EL1 are translated using two sets of tables. These tables support virtualization and allow the hypervisor to virtualize the view of physical memory that is seen by a given virtual machine (VM) (the virtual machine corresponding to a guest operating system and the applications controlled by that guest operating system). We call the set of translations that are controlled by the OS, Stage 1. The Stage 1 tables translate virtual addresses to intermediate physical addresses (IPAs—an example of the intermediate addresses mentioned earlier). In Stage 1, the OS thinks that the IPAs are physical address spaces. However, the hypervisor controls a second set of translations, which is called Stage 2. This second set of translations translates IPAs to physical addresses.

The stage-1 and stage-2 translation tables are implemented as hierarchical table structures comprising a number of levels of translation tables as shown in FIGS. 4 and 5 for stage-1 and stage-2 respectively. In this example, both the stage-1 and stage-2 tables can have up to 4 levels of page tables, namely level 0 (L0), level 1 (L1), level 2 (L2) and level 3 (L3).

Figure 6:
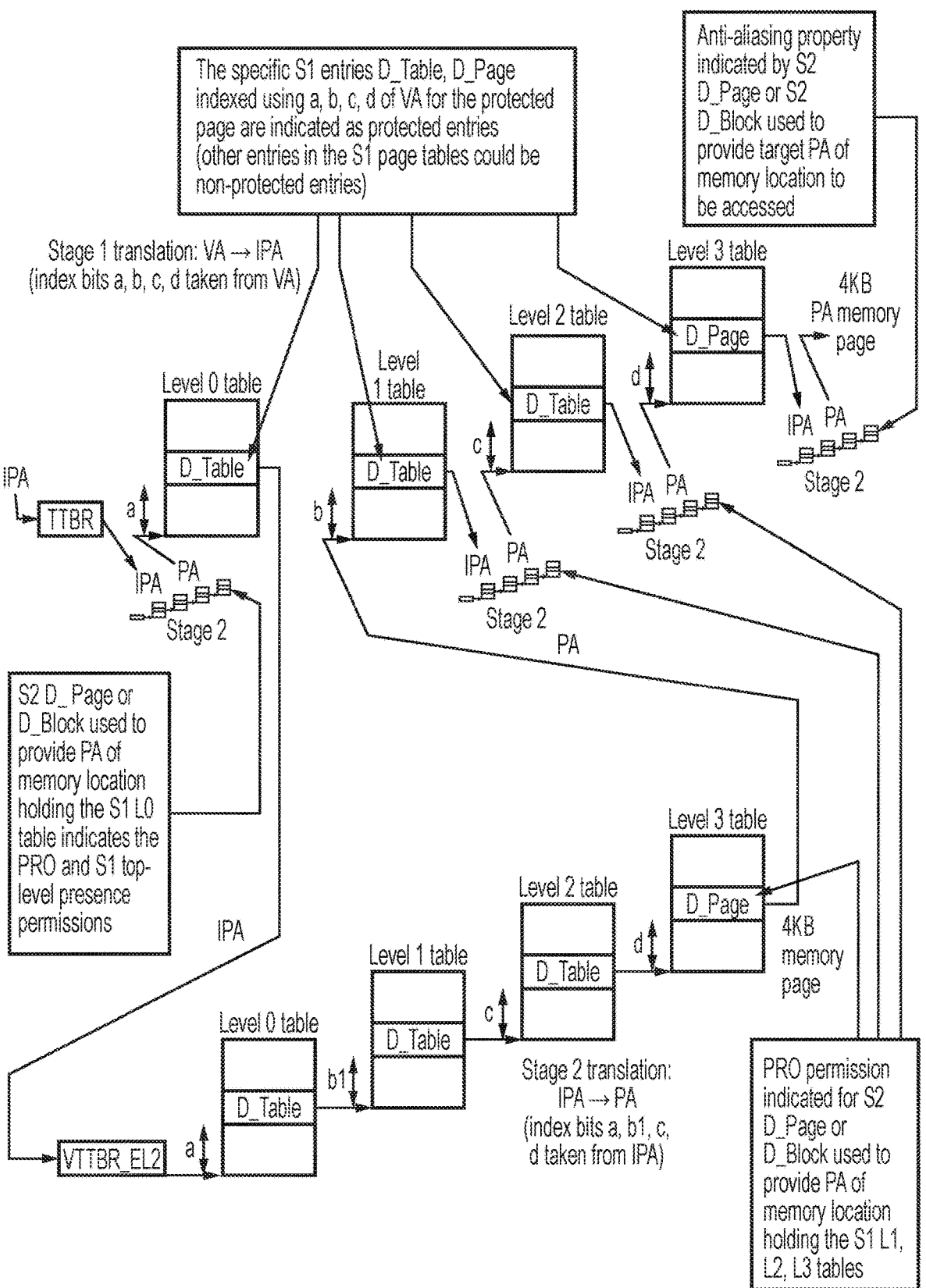
FIG. 6 illustrates table lookups performed for a full translation table walk of both stage-1 and stage-2 translations, when considering that each table base address and the final intermediate address determined at stage 1 is to be translated to a physical address using a respective stage-2 translation.

To locate the physical address mapping for a given address, a translation table walk is performed comprising one or more translation table lookups. The translation table walk is the set of lookups that are required to translate the virtual address to the physical address. For the Non-secure EL1&0 translation regime, this set includes lookups for both the stage-1 translation and the stage-2 translation (see FIG. 6 shown below). The information returned by a successful translation table walk using stage-1 and stage-2 lookups is:

The required physical address (translated based on the stage-1 mapping to the intermediate address and the stage-2 mapping to the physical address).

Access permissions and/or memory attributes for the target memory region, which provide information about how to control access to that memory region. These may include stage-1 access permissions and/or attributes defined in the stage-1 table structure and stage-2 access permissions and/or attributes defined in the stage-2 table structure.

For traversing a given one of the stage-1 and stage-2 structures, the walk starts with a read of a top-level (L0) translation table for the initial lookup, based on an address specified in a translation table base address register (TTBR for stage 1, VTTBR_EL2 for stage 2). Each translation table lookup returns a descriptor, that indicates one of the following:

The entry is the final entry of the traversal of the stage-1 or stage-2 structure, which provides the address mapping being sought. If the entry is in the final L3, this entry is called a Page descriptor (D_Page), while if the entry providing the final entry of the walk is at one of the higher levels it is called a Block descriptor (D_Block). The final entry of the traversal contains the output address (OA—i.e. IPA for stage 1 or PA for stage 2), and the permissions and attributes for the access. If a Block descriptor is found at a higher level of the translation table structure, this means that the Block descriptor represents a memory region of greater size than a 4 kB memory page represented by a single entry at L3 (the particular sizes represented by Block descriptors at L1 and L2 being dependent on the number of index bits used to index into the L1 or L2 tables—in this example L1 and L2 Block descriptors represent 1 GB and 2 MB regions respectively).

An additional level of lookup is required. In this case, the entry is called a Table descriptor (D_Table), since it provides the translation table base address for that lookup in a further level of table. The Table descriptor can optionally also provide other hierarchical attributes that can be applied to the final translation. An encoding of translation table entries at levels 1 and 2 distinguishes a Block descriptor from a Table descriptor.

The descriptor is invalid. In this case, the memory access generates a Translation fault.

FIG. 4 illustrates indexing of the stage-1 translation tables using respective bits of a virtual address provided as the input address for the table lookups. The base address of the top-level table L0 is read from TTBR, and the base addresses of the L1, L2, L3 tables are indicated by addresses stored in the indexed Table descriptors in the L0, L1, L2 tables respectively (if no Block descriptors are identified in L1 or L2 tables-if a Block descriptor is found in the indexed entry of L1 or L2 then the traversal is halted at that level as the output address mapping has already been found). The particular entry to select within a given level of stage-1 translation table is determined based on an index value a, b, c, d which corresponds to a certain subset of bits of the virtual address provided as input address for the lookup. FIG. 4 illustrates which bits of the input address are used for each index value a, b, c, d in one particular example. The address of the relevant entry in a given table is obtained by adding a multiple of the index bits a, b, c or d to the base address of that given table as determined based on TTBR or the address specified in a Table descriptor at the previous level (the multiplier applied to the index value corresponding to the size of one translation table entry).

Similarly, FIG. 5 illustrates indexing of the stage-2 translation tables using respective bits of an intermediate address provided as the input address for a stage-2 table lookup. The indexing is similar to that shown in FIG. 4 for stage 1, but uses a different base address register VTTBR_EL2 to provide the base address of the L0 table. As shown in the example of FIG. 5, for stage-2 lookups it is possible to vary the starting level at which the walk of the stage-2 translation table starts, based on a value stored in a control register VTCR_EL2.SL0 which can specify that the lookup should start at either L0 or L1. If the stage-2 lookup starts at L0 then the indexing for levels 0, 1, 2, 3 uses index values a, b1, c, d respectively similar to FIG. 4 for stage-1. If the stage-2 lookup starts at L1 then the indexing is performed in a similar way, but now a greater number of index bits b2 are used at the top level (L1) of the lookup as shown in FIG. 5. Providing variable starting levels is not an essential feature and could be omitted if desired. Although not shown in FIG. 4, it would also be possible to provide a variable starting levels for a lookup at stage-1.

As shown in FIG. 6, in practice when the full translation table walk including both stage-1 and stage-2 translation is performed, then each stage-1 table base address obtained from the TTBR and the Table descriptors accessed in the stage-1 L0, L1, L2 translation tables will be an intermediate address which itself needs translating using the stage-2 translation tables. Hence, in cases when the translation table walk does not encounter any Block descriptors, but proceeds all the way to L3 where a Page descriptor is found, then the full page table walk process may include accessing the multiple levels of page tables in the following sequence:

Stage-2 translation of the base address of the stage-1 L0 page table into a physical address (the stage-1 L0 base address is typically an intermediate physical address because the stage 1 translations are configured by the operating system). The stage-2 translation comprises 4 lookups (stage-2 L0; stage-2 L1; stage-2 L2; stage-2 L3).

Stage-1 L0 lookup of an entry at the address obtained based on the L0 index portion "a" of the target virtual address and the translated stage-1 L0 base address, to obtain the stage-1 L1 base address (an intermediate physical address)

Stage-2 translation of the stage-1 L1 base address into a physical address (again, comprising 4 lookups).

Stage-1 L1 lookup of an entry at the address obtained based on the L1 index portion "b" of the target virtual address and the translated stage-1 L1 base address, to obtain the stage-1 L2 base address (an intermediate physical address)

Stage-2 translation of the stage-1 L2 base address into a physical address (again comprising 4 lookups)

Stage-1 L2 lookup of an entry at the address obtained based on the L2 index portion "c" of the target virtual address and the translated stage-1 L2 base address, to obtain the stage-1 L3 base address (an intermediate physical address).

Stage-2 translation of the stage-1 L3 base address into a physical address (again comprising 4 lookups).

Stage-1 L3 lookup of an entry at the address obtained based on the L3 index portion "d" of the target virtual address and the translated stage-1 L3 base address, to identify the target intermediate physical address corresponding to the target virtual address.

Stage-2 translation of the target intermediate physical address into the target physical address which represents the location in memory to access corresponding to the original target virtual address (again, comprising 4 lookups).

Hence, without any caching, and assuming the starting level for stage 2 is L0, the translation would comprise 24 lookups in total. If the starting level for stage 2 is L1, this can reduce the number of lookups to 19 (one less lookup for each of the 5 stage-2 translations performed). Nevertheless, as can be seen from the above sequence, performing the entire page table walk process can be very slow as it may require a large number of accesses to memory to step through each of the levels of page tables for each of the stages of address translation. This is why it is often desirable to cache infor- mation derived from translation table walks in the TLB 29 of the MMU 28. The cached information can include not only a final stage-1 address mapping from VA to IPA, a final stage-2 mapping from IPA to PA, or a combined stage-1 and stage-2 mapping from VA direct to PA (derived from pre- vious lookups of the stage-1 and stage-2 structures), but also entries from higher level page tables of the stage-1 and the stage 2 tables can be cached within the TLB 29 of the MMU 28. This can allow at least some steps of the full page table walk to be bypassed even if the final level address mapping for a given target address is not currently in the address translation cache.

FIG. 6 is annotated with information specifying particular permissions or properties that could be defined for some of the translation table entries involved in the two-stage address translation. This will be described in more detail later once these permissions and properties have been explained below.

Memory Management Unit Example

Figure 7:
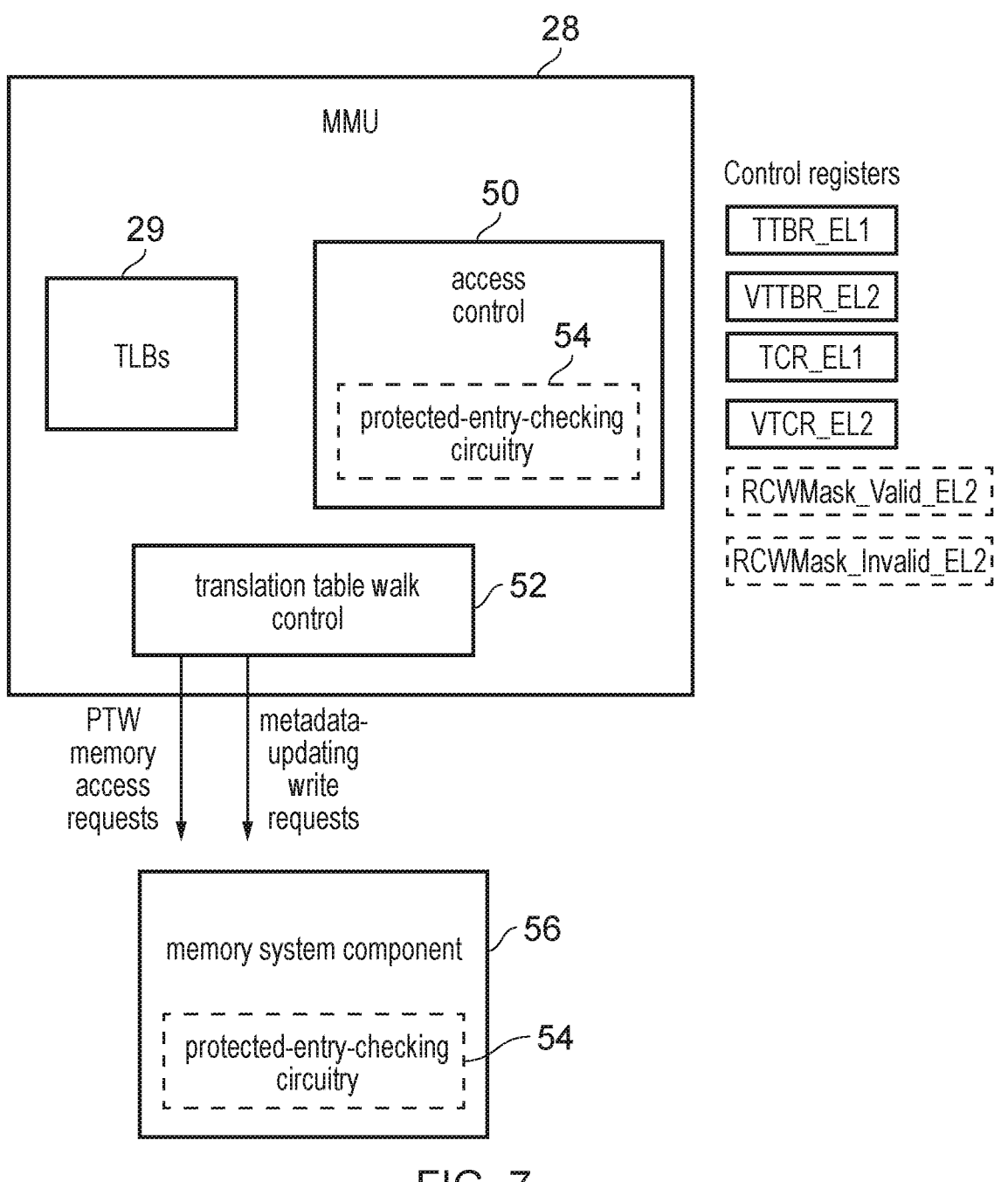
FIG. 7 illustrates an example of the memory management circuitry and control registers for controlling memory management.

FIG. 7 illustrates the memory management unit 28 in more detail. While FIGS. 1 and 7 show a single MMU 28 for conciseness, it is also possible for separate instruction-side and data-side MMUs to be provided to handle memory management operations for instruction fetch accesses initi- ated by the fetch stage 6 and data accesses initiated by the load/store unit 26 respectively—in this case both instruc- tion-side and data-side MMUs may have the components shown in FIG. 7. As well as the TLBs 29, the MMU 28 includes access control circuitry 50 for checking the access permissions specified in looked up translation table entries and controlling handling of a memory access request accord- ing to those access permissions. For example, the access control circuitry 50 may implement checks for determining whether the specific type of memory access request (e.g. based on whether the request is a read, write or instruction fetch request, or based on the type of instructions executed that caused the request to be issued) satisfies the permissions specified in a corresponding translation table entry for a given region of memory being accessed. The MMU also includes translation table walk control circuitry 52 which, in the event that required information from the translation tables is not available already in the TLBs 29, issues memory access requests to memory to request reading of translation table entries during the translation table walk process as shown above in FIGS. 4 to 6. The translation table walk control circuitry 52 can be responsible for generating the addresses of the memory system locations to be read to obtain the relevant translation table entries in the stage-1 or stage-2 translation table structure. In addition, while per- forming a translation table walk, the translation table walk control circuitry 52 may generate metadata-updating write requests which request updates to access tracking metadata within certain translation table entries being traversed in the translation table walk. These metadata-updating write requests may update the access tracking metadata to reflect that a particular memory region has been accessed, which can be useful for managing operations such as paging. The metadata-updating write requests are generated in hardware, to specify addresses which are not directly specified as an instruction fetch address, or load/store target address derived from operands of load/store instructions executed by the processing circuitry 4, as the addresses of the metadata-updating write requests are addresses of the translation table entries accessed in the translation table walk, rather than addresses of the data or instruction being accessed.

The MMU 28 has access to various control registers for controlling translation table walks and other aspects of memory management operations. For example, the control registers may include the stage-1 and stage-2 base address registers TTBR_EL1, VTTBR_EL2 as mentioned earlier with respect to FIGS. 4 and 5. The stage-1 base address in register TTBR_EL1 is writable in response to instructions executing at exception level EL1, EL2 or EL3 (i.e. in the first execution state or an execution state with greater privilege than the first execution state). The stage-2 base address in register TTBR_EL2 is writable in response to instructions executing at exception level EL2 or EL3 (i.e. in the second execution state or an execution state with greater privilege than the second execution state). It is possible in some cases to set a control value to indicate that writes to TTBR_EL1 triggered by instructions executing at EL1 should be trapped to EL2 so that the hypervisor operating at EL2 can check the update being requested by the operating system and prevent the update if necessary. The control registers also include registers TCR_EL1, VTCR_EL2 which are used to specify various control status values which affect the way in which stage-1 and stage-2 translations and access permission checks are performed. For example, the control value speci- fying the starting level for a stage-2 walk may be specified in VTCR_EL2. Also, the TCR_EL1 or VTCR_EL2 control registers may specify control values specifying what types of security checks are enabled/disabled. As discussed in more detail below, the control registers can also include mask registers (labelled RCWMask_Valid_EL2 and RCW- Mask_Invalid_EL2) for specifying an update-restricted sub- set of bits for which updates are restricted in protected stage-1 translation table entries for valid and invalid entries respectively. It will be appreciated that further control reg- isters can also be provided, and that the labels used for the control registers could vary. For example, one or more permission indirection registers could be provided to specify indirect access permission information which can be refer- enced by a given translation table entry to specify the access permissions information for the given translation table entry. Also it is possible for the same information to be arranged within control registers in different formats, so the particular allocation of information to one control register or another is not an essential feature.

As shown in FIG. 7, the apparatus may have protected- entry-checking circuitry 54 for performing a protected-entry check when an update is requested to a stage-1 translation table entry encoded as a protected entry (this will be described in more detail below). As shown in the dotted lines in FIG. 7, it is possible to implement the protected-entry- checking circuitry 54 at different locations within the pro- cessing system. For example, the protected-entry-checking circuitry 54 could be part of the access control circuitry 50 of the MMU 28. Alternatively, the protected-entry-checking circuitry could be implemented within the memory system component 56 closer to the physical memory system loca- tion being accessed by a given memory access request to be checked using the protected-entry-checking circuitry 54. For example, the memory system component 56 could be a cache 30, 32, an interconnect used to manage access to shared memory by multiple processor cores, or a memory controller associated with a particular memory storage unit. Also, the protected-entry-checking circuitry 54 could include distributed logic at multiple locations in the system (e.g. the MMU 28, the load/store unit 26 and/or the memory system component 56).

Translation Table Access Permissions and Attributes

Figure 8:
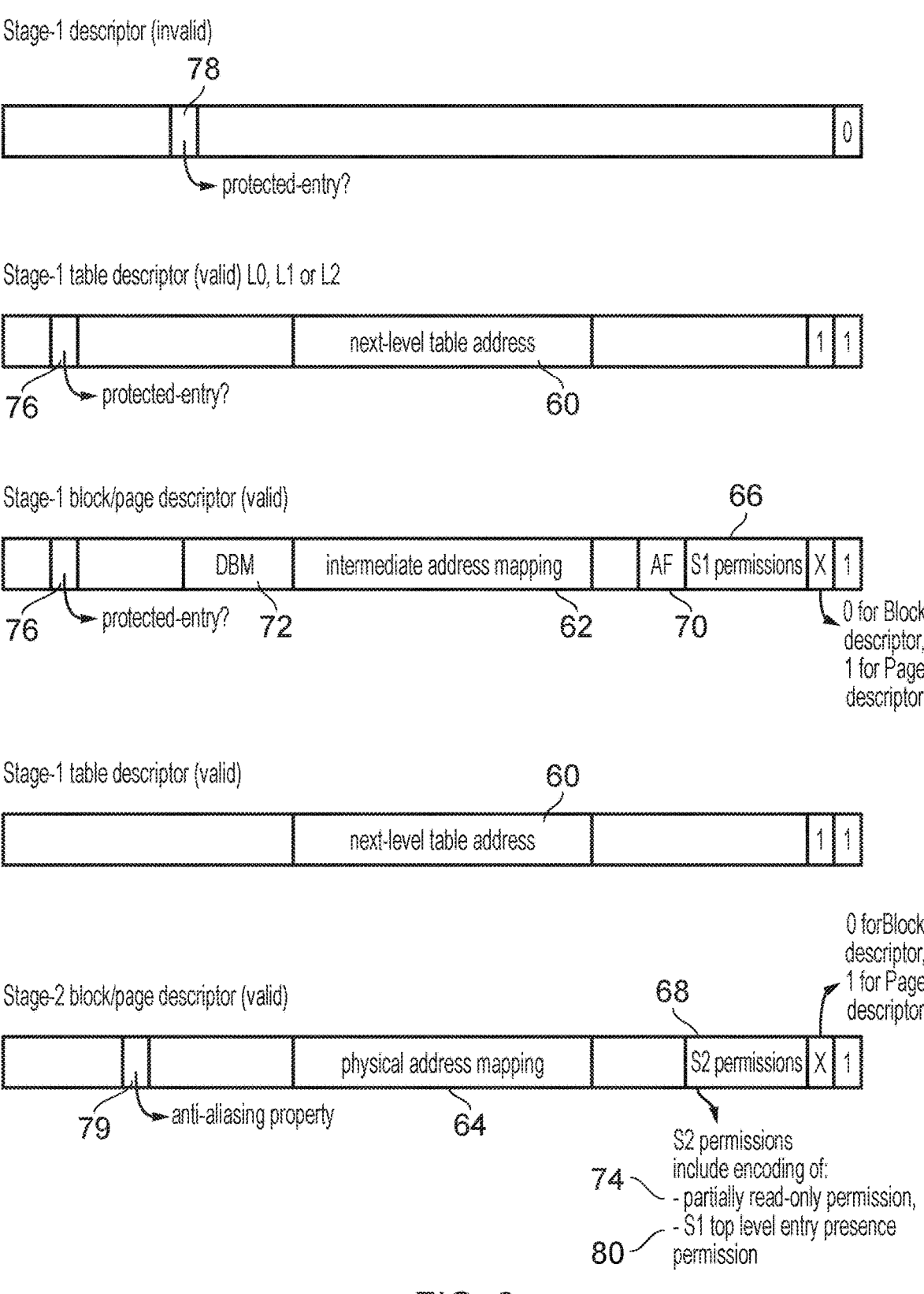
FIG. 8 illustrates an example of translation table entries for stage-1 and stage-2 address translation.

FIG. 8 illustrates example formats for translation table entries in the stage-1 and stage-2 translation table structures. It will be appreciated that the same information could be represented in different arrangements and so the particular ordering and layout of fields within the descriptors can vary from what is shown in FIG. 8.

In this example, valid translation table descriptors have a least significant bit set to 1 and invalid translation table descriptors have a least significant bit set to 0. For valid descriptors read at one of levels 0, 1, 2 of the translation table structure, the second least significant bit distinguishes whether the descriptor is a Table descriptor (second least significant bit set to 1) or a Block descriptor (second least significant bit set to 0). Page descriptors at L3 of the stage-1 or stage-2 structures may have the second least significant bit set to 1 to allow a Page descriptor to be distinguished from a Block descriptor. Of course, valid/invalid entries, and Table/Block/Page descriptors could also be distinguished by other encoding methods.

For both stage-1 and stage-2 entries, a valid Table descriptor provides the next-level table address 60 which indicates the base address of a translation table at the next level of the stage-1 or stage-2 translation table structure. Valid stage-1 Block or Page descriptors provide the intermediate address mapping 62 corresponding to the virtual address used to index the stage-1 translation table structure. Valid stage-2 Block or Page descriptors provide the physical address mapping 64 corresponding to the intermediate address used to index the stage-2 translation table structure.

Stage-1 Block and Page descriptors also provide stage-1 access permissions 66 used to control access to the corresponding memory region. For example, the stage-1 access permissions 66 (typically set by the OS at EL1) may specify whether the region is allowed to be read, written and/or used for an instruction fetch of executable instruction.

Similarly, stage-2 Block and Page descriptors provide stage-2 access permissions 68 used to control access to the corresponding memory region. Again, the stage-2 access permissions 68 (typically set by the hypervisor at EL2) may specify whether the region is allowed to be read, written and/or used for an instruction fetch of executable instruction. If there is a conflict between the stage-1 access permissions 66 and the stage-2 access permissions 68 then the more restrictive set of attributes may take precedence.

Stage-1 or stage-2 Block/Page descriptors can also specify other attributes associated with the memory region, not shown in FIG. 8. For example, these attributes could specify properties such as whether it is allowed to cache data from the corresponding memory region, whether the region is defined as Device memory such that reordering or merging of different memory accesses to the device memory is not allowed, etc.

The stage-1 Block/Page descriptors can also specify access-tracking metadata which can be used by an operating system to track frequency of access to a given memory region. For example, the metadata may include an access flag (AF) 70 and a dirty bit modifier (DBM) 72.

Periodically, the operating system could clear the access flag in entries corresponding to a set of memory regions to be monitored. When a read access is made to one of these memory regions, the access flag 70 may be set (if not set already following an earlier access) in the corresponding stage-1 Block or Page descriptor (the memory access request which causes the access flag 70 to be set may be one of the metadata-updating write requests generated by the translation table walk control circuitry 52 mentioned earlier). After a period of monitoring, the operating system can then check the access flag 70 to assist with operations which may benefit from information about how frequently certain pages are accessed. For example, the operating system could maintain a further tracking data structure in memory with entries per memory region which track how many times the memory region has been accessed, and so at the end of each period of monitoring the entries of that further tracking structure which correspond to memory regions with the access flag is 70 set could be incremented. After a number of periods of monitoring that further tracking structure will therefore provide an indication of relative frequency of accesses to the corresponding memory region. This can provide useful information for controlling operations such as paging, where it can be useful to know the least frequently accessed pages of memory for which the corresponding data may be prioritised for paging out to external storage compared to other more frequently accessed pages.

Similarly, the DBM 72 assists with tracking which pages have been subject to writes. If the operating system wishes to track whether a given page has been written, when the page is mapped or at the start of a period of monitoring, the operating system can set the access permissions for that page as "read-only" (even if the page is intended to be allowed to be written) and set the DBM bit 72. On an access permission fault caused by a write to a read-only page when the DBM bit 72 is set, the operating system may determine from the DBM bit 72 being set that this is not a "real" violation of a read-only permission, and instead cause the operating system to update a data structure stored in memory that tracks the pages subject to write requests, and also update the write access permission for the page to indicate that the page can now be written to without triggering a fault. After a period of monitoring, the tracking data structure in memory can be used by software to determine whether, on paging out a particular region, it is necessary to write back the modified data form that region to external storage, or whether (if no writes have occurred), the data stored in the on-chip memory can simply be discarded on paging out the region, as the corresponding data in external memory can be assumed to still be the same if the data is clean.

The access flag 70 and dirty bit modifier 72 are just some examples of possible access tracking data that could be stored within translation table entries and other examples could provide other types of access tracking metadata. E.g. in another example, a multi-bit access counter could be provided as access tracking metadata. Also, in another example instead of the DBM bit 72 being used to modify handling of read-only access permission violations on a write request and to trigger updating of the write permission, the DBM flag 72 could instead be directly updated in response to the first write to a page after clearing the DBM flag 72, in a similar way to the way in which the access flag 70 is updated on the first access to a page as described earlier.

As shown in FIG. 8, the various translation table descriptors can also include a number of other pieces of information which can be useful for protecting stage-1 translation table entries against corruption by operating system code under attack by an attacker. Typical operating system code may include many lines of code which may be difficult to fully verify as safe against attack, and so it is desirable to provide architectural mechanisms for protecting against the possibility that an attacker may be able to modify the behaviour of the operating system code to cause writes to regions of memory used to store translation table entries, in an attempt to modify the address mappings or the permissions in those entries so as to give the attacker rights to access regions of memory in an unauthorised manner.

As shown in FIG. 8, to provide a translation hardening mechanism, the additional attributes and permissions described below for hardening stage-1 translation tables against attack include the following:

Stage-2 Block/Page descriptors specify stage-2 access permissions 68 having an encoding indicating whether the corresponding memory region has a partially-read-only (PRO) permission (the partially-read-only permission could also be referred to as a "mostly-read-only" permission);

Valid stage-1 descriptors at all levels of the stage-1 translation table structure (including Table descriptors and Block/Page descriptors) have an encoding specifying whether that translation table entry is a "Protected" entry for which additional protection against unauthorised updates is provided compared to non-protected entries. For example, a bitfield 76 within a valid stage-1 descriptor may signify whether the entry is a Protected entry.

Invalid stage-1 descriptors at all levels of the stage-1 translation table structure may also have an encoding specifying whether that translation table entry is a "Protected" entry. This may be indicated using a bit field 78 which may be at a different position within the translation table entry encoding compared to the bit field 76 used to signify protected entries for valid stage-1 translation table entries.

Stage-2 Block/Page descriptors may have an indicator 79 specifying whether the corresponding memory region has an anti-aliasing property. In some examples, the presence or absence of anti-aliasing property could be encoded in a combined bitfield which can also signal other types of property, or alternative the anti-aliasing bitfield can be a standalone bitfield which does not signal any other information. If specified, the anti-aliasing property indicates that, for an access to the corresponding physical address to be allowed, all the stage-1 translation table entries accessed in the translation table walk to obtain the intermediate address used to access that stage-2 descriptor would need to be specified as Protected entries using bitfield 76 and to be stored in regions of memory for which the corresponding stage-2 Block/Page descriptor indicates the partially read-only permission 74.

Stage-2 Block/Page descriptors may also specify, in the stage-2 access permissions 68, a stage-1 top-level entry presence permission 80 indicating whether the corresponding memory region is allowed to hold the top-level translation table for the stage-1 translations (i.e. the stage-1 L0 table in the example of FIGS. 4 and 6). In one example, the encoding of the stage-2 access permissions 68 may be such that the stage-1 top-level entry presence permission is encoded as a further attribute of the PRO permission, so that the values allowed to be encoded for the stage-2 access permissions 68 may include values indicating:

PRO permission without stage-1 top-level entry presence permission;

PRO permission with stage-1 top-level entry presence permission; or one or more other types of permission not having either PRO permission or stage-1 top-level entry presence permission (e.g. read-only permission, read/write permission, and/or execute permission).

In this case, it may not be possible to specify the stage-1 top-level entry presence permission independently of the PRO permission. However, other implementations could encode the stage-1 top-level entry presence permission independently from the PRO permission so that the stage-1 top-level entry presence permission could be specified even if the PRO permission is not provided.

Use of these attributes and permissions will be discussed in more detail below. It will be appreciated that not all of these attributes and permissions need to be supported in every possible implementation. While FIG. 8 illustrates an example where the S1 and S2 access permissions are specified directly in the encoding of the translation table entry, it is also possible to specify the same information indirectly using permissions specified in a permissions register. For example, the S1 or S2 permissions field 66, 68 could specify an index value which selects which of a number of permission fields of the permissions register specifies the access permissions for the corresponding translation table entry. It is also possible for some fields of the translation table entries to be interpreted in different ways depending on control state stored in a control register. For example, the protected entry field 76 of a stage-1 translation table entry may be interpreted as indicating whether the stage-1 translation table entry is protected when a control value stored in a control register has a first value, and be interpreted in a different manner when the control value has a second value. Similarly, the anti-aliasing property field 79 of a stage-2 translation table entry may be interpreted as indicating whether the stage-2 translation table entry has the anti-aliasing property when a control value stored in a control register has a first value, and be interpreted in a different manner when the control value has a second value.

Figure 18:
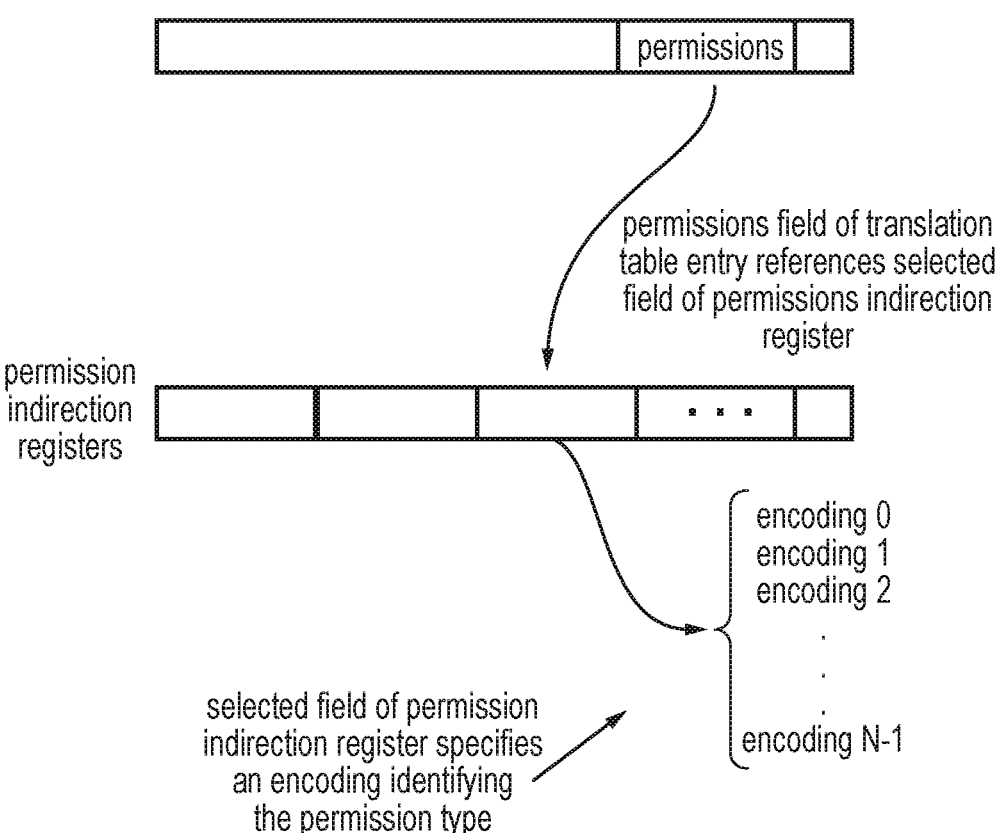
FIG. 18 illustrates permission information indirectly specified by a translation table entry.

While the S1 permissions 66 and S2 permissions 68 are shown as directly specified by the corresponding S1 or S2 descriptor, it is also possible for these permissions (or other information specified by the translation table entry) to be specified indirectly using an indirection register, as shown below with respect to FIG. 18.

Partially-Read-Only Permission

FIG. 9 summarises write access control behaviour for a memory region marked by the stage-2 access permissions 68 as having the partially-read-only (PRO) permission. A memory region having the PRO permission is, at least for write requests issued when the current execution state is EL1 (the state in which operating system code is expected to be executed), writable for a restricted subset of write request types, but treated as read-only for the write request types. As only some write request types see the memory region as read-only, this permission is therefore described as a partially read-only permission.

FIG. 9 summarises the types of write requests permitted and prohibited to write to a memory region for which the corresponding stage-2 translation table entry defines the region as having the PRO permission. The restricted subset of write request types permitted to write to a PRO region when the write is issued at EL1 includes the metadata-updating write requests generated by the MMU 28 to update the access tracking metadata in a translation table entry, such as the access flag 70 or the write permission in the case when the dirty bit modifier 72 is set, as discussed above. Also, the restricted subset can include at least one predetermined type of translation table entry updating instruction executed at exception state EL1, which can be a dedicated type of instruction intended for use in updating translation table entries, to express the intent of the program code to distinguish such writes for updating translation table entries from writes for updating data other than translation table entries. For example, the predetermined type of translation table entry updating instruction could include the variants of the protected-entry-checking read-check-write (RCW) instruction discussed with respect to FIGS. 12 to 14 below. As shown in FIG. 9, a write request issued in response to at least one other type of store instruction executed in one of exception states EL0 and EL1 is prohibited from writing to a PRO region of memory. For example, the prohibited write request types may include the majority of store instructions in the instruction set architecture supported by the processing circuitry 4. By restricting the ability to update translation table entries to a limited set of instruction types when the region is marked with the PRO permission, this reduces the attack surface available for an attacker to exploit when attempting to corrupt stage-1 translation table entries, as for example, tampering with the address operand for a general-purpose store which is not one of the restricted subset of write requests will not allow access to the PRO region of memory.

Optionally, write requests issued in response to a store instruction executed in one of execution states EL2 or EL3 may be permitted to write to a partially read-only region, even if they are a type of store instruction which would have been prohibited to write that region if executed at execution state EL0 or EL1. However, this is not essential as mentioned earlier.

FIG. 10 is a flow diagram illustrating a method of processing instructions and controlling memory management operations. At step 500 the processing circuitry 4 processes instructions in one of a number of execution states EL0-EL3 associated with different levels of privilege. At step 502, in response to a memory access request, the MMU 28 performs two-stage address translation of a target virtual address (VA) specified by the memory access request into a target physical address (PA), with the mapping of the target VA to the target PA depending on a stage-1 address mapping from the target VA to a target intermediate address (IPA) and stage-2 address mapping from the target IPA to the target PA. At step 504, the access control circuitry 50 of the MMU 28 performs permission checking for the memory access request, based at least on the stage-2 access permission information 68 specified in a corresponding stage-2 translation table entry. The permission checking can also be based on the stage-1 access permission information 66. The stage-2 access permission information 66 has an encoding specify whether a memory region corresponding to the target IPA has the PRO permission. At step 506, the MMU 28 rejects the memory access request when the memory access request is a write request issued in a predetermined execution state (e.g. EL1), the stage-2 access permission information does specify the PRO permission, and the write request is of a write request type other than the restricted subset of write request types allowed to write to PRO regions of memory. Optionally, the MMU 28 could also reject the memory access requests when it is a write request issued in an execution state (e.g. EL0) other than the predetermined execution state when the PRO permission is specified by the stage-2 access permission information and the write request type is not one of the restricted subset of write request types.

FIG. 11 illustrates in more detail the partially-read-only check performed by the access control circuitry 50 of the MMU 28. At step 600, a write memory access request is issued when the processing circuitry 4 is in the predetermined execution state (EL1). The write request specifies a target VA. The write request could have been issued by the load/store unit 26 of the processing circuitry 4 in response to a load/store instruction executed by the processing circuitry, or by the fetch stage 6 when requesting an instruction fetch. The write request could also be a metadata-updating write request issued by the MMU 28 to update access tracking metadata in translation table entries during a translation table walk process.

At step 602 the target VA is translated into the target PA identifying the memory system location to be accessed. To perform the translation, the MMU 28 can look up the target VA within the TLBs 29 and if a mapping from the target VA to the target PA is already available in the TLBs 29 then no translation table walk is necessary. Otherwise, at least part of the translation table walk process shown in FIG. 6 may be needed, although some parts may be able to be skipped if information derived from the corresponding translation table entries for that part of the translation table walk is already cached in the TLBs 29. For write memory access requests issued from non-secure EL1, the translation is performed as a two-stage address translation based on the mappings defined in both the stage-1 and stage-2 translation tables, although this does not necessarily mean that two separate translations need to be performed, as it is possible for a combined stage 1/stage 2 TLB to be provided which caches mappings direct from target VA to target PA (depending on both the stage-1 and stage-2 mappings), along with the corresponding stage-1 and stage-2 permissions information, to avoid the target IPA needing to be determined explicitly.

At step 604 the access control circuitry checks whether the corresponding stage-2 (S2) translation table entry (the stage-2 entry which specifies the mapping from the target IPA to the target PA) specifies the PRO permission. If so, then at step 606 the access control circuitry checks whether the write request being processed is one of the restricted subset of write request types. If the current write request is not one of the restricted subset of write request types (including at least the metadata-updating write request), then at step 608 the memory access request is rejected and a fault is signalled. If the write request is one of the restricted subset of write request types then the partially-read-only check is passed and so the method proceeds to step 610. Also, if at step 604 the corresponding stage-2 translation table entry did not specify the PRO permission, then the partially read-only check at step 606 can be omitted and so the method proceeds from step 604 direct to step 610.

At step 610 the access control circuitry determines whether any other checks, required to allow the write memory access request to proceed, are satisfied. For example, these checks could include checks using the stage-1 access permissions 66, checks using other stage-2 access permissions 68 in the case when the PRO permission is not specified, security checks based on whether the request was issued from the secure or non-secure state (in implementations which support the secure state) as well as other checks specific to particular instruction types, such as the checks discussed below with respect to FIGS. 12 to 14 regarding whether data at the target memory location is a protected translation table entry. If any of these other checks are not satisfied then again at step 608 the memory access request is rejected and a fault is signalled. Fault syndrome information may be set to distinguish the cause of the fault. If the checks performed at step 610 are satisfied then at step 612 the memory access request can be permitted to proceed and so the memory system location associated with the target PA can be updated with the write data specified by the write request.

Hence, as shown in FIG. 6 discussed earlier, the PRO permission may be specified in the stage-2 access permissions 68 of the stage-2 translation table entries which are used to provide the physical address of the memory system location holding the various levels of stage-1 translation tables used in the traverse of the stage-1 table structure to obtain the intermediate address of a memory region containing sensitive information. This protects those stage-1 translation entries against corruption by erroneously functioning code or operating system code under attack by a malicious party, since the PRO permission restricts the ability to write to the corresponding memory regions to a limited subset of instruction types, greatly reducing the number of lines of code which can be vulnerable to corruption of the stage-1 translation tables. Nevertheless, hardware-generated write requests for updating access tracking metadata in translation table entries can still be permitted for such regions to avoid compromising the efficiency of paging operations by the operating system.

While FIG. 11 shows the partially read-only check being performed for a write memory access request issued when in the predetermined execution state EL1, it could also be performed for other execution states. However, this may not be essential since for write requests issued in the least privileged execution state EL0, it is likely that the memory regions holding the stage-1 translation tables will in any case be marked by the stage-1 access permissions 66 as being inaccessible to application-level code operating at EL0, so stage-1 permissions checks may already prevent such write requests corrupting stage-1 translation tables. Also, for code executing at EL2 or EL3 the translation tables would not use two-stage address translation and are unlikely to restrict writes to a region storing a stage-1 translation table entry since the hypervisor or monitor code may be the code which is controlling the restrictions on which updates to stage-1 translation tables are allowed. Therefore, some implementations may restrict the partially-read-only check to be performed only when the current execution state is EL1. Other implementations may apply the partially-read-only check regardless of which execution state is the current execution state.

Protected-Entry Encoding for Stage-1 Translation Table Entries

The use of the PRO permission to mark certain memory regions as read-only for write requests other than a restricted subset of write types is helpful to protect the stage-1 tables against corruption. However, as shown in FIG. 6, typically a given translation table at a given level of the translation table structure occupies a whole page in memory, and so the PRO permission would apply to the entire translation table at a given level of the stage-1 translation table structure, which may include translation table entries for a variety of memory regions which may include some memory regions used for sensitive information which need to be protected against unauthorised access, and other memory regions which only contain non-sensitive information which does not require this protection.

It is possible to provide an implementation which does not support the use of protected-entry encodings for stage-1 translation table entries as discussed further below. In this case, to allow the operating system to update certain stage-1 translation table entries associated with non-protected regions containing non-sensitive information, the fault generated on a write access to a PRO region which is not one of the write request types allowed to write to the PRO region could cause a trap to the hypervisor operating at EL2, and the hypervisor could then determine in software whether the region for which the operating system wishes to update the stage-1 translation table entry should be protected against being updated by the operating system, and if the region does not need to be protected, the update requested by the operating system can be allowed to proceed. However, in practice the operating system may need to change translation table entries for non-protected regions of memory relatively frequently, and so trapping to the hypervisor each time an update is required may be slow in terms of performance.

The protected-entry encoding (e.g. using bits 76, 78) for stage-1 translation table entries helps to allow the operating system to make updates to non-protected entries without hypervisor intervention (and, optionally for some implementations, to make updates to non-update-restricted bits of protected entries without hypervisor intervention). This helps improve performance because hypervisor involvement can be avoided more often, even when a given stage-1 translation table is stored in a PRO region of memory because it contains a mixture of protected entries and non-protected entries. The instruction decoder 10 and execute stage 16 of the processing circuitry 4 support at least one type of instruction, called a protected-entry-checking type of read-check-write (RCW) instruction, which can be used to request an update to a given memory system location where the update is made conditional on a protected entry check, which checks the data stored at the accessed memory system location to check whether it has a value consistent with an encoding of a protected stage-1 translation table entry. If it is found that the data at the accessed memory system location has a value consistent with the data being a protected stage-1 translation table entry, then updates to at least an update-restricted subset of bits of the given memory system location are suppressed. The RCW instruction is allowed to be executed by the operating system executing at EL1. The RCW instruction is one of the restricted subset of instructions allowed to update data in memory regions marked with the PRO permission by the corresponding stage-2 translation table entry.

The protected entry check is performed in hardware by the protected-entry-checking circuitry 54, which as shown in FIG. 7 can be implemented either within the MMU 28, or closer to the memory system location storing the data, for example within a memory system component 56 such as a cache, interconnect or memory controller. It is also possible to use a distributed set of logic with some parts of the protected-entry-checking circuitry 54 implemented in the MMU 28 (or the execute stage 16 of the pipeline) and other parts implemented closer to memory storage. The read, check and write operations performed in the protected entry check are performed as an atomic (indivisible) operation, so that when access is requested to the given memory system location by another thread executing on the same processor circuitry as the thread executing the RCW instruction or by another processor core, the other access sees either the value of the given memory system location prior to processing the RCW instruction, or the value of the given memory system location after processing the RCW instruction, not any partial effect of the RCW instruction, and also it is not possible for a write to the given memory system location to update the given memory system location in the period between the protected entry check reading the data at the given memory system location and the subsequent updating of the data at the given memory system location in response to the RCW instruction. Any known technique for enforcing atomic read/write operations to a memory system location can be used to enforce the atomicity (e.g. locking the memory location against access by other operations in the period between the read and the write, or allowing a conflicting access in that period but restarting the RCW operation if a conflicting access is detected in the period between the read and write). By enforcing atomicity of the read, check and write, this avoids race conditions which could lead to incorrect processing results. As the read, check and write operations are performed atomically, it can be useful for the protected-entry-checking circuitry 54 to be implemented within a memory system component 56 closer to the storage location being updated, to reduce the duration of the period between the read and the write compared to the duration if the read data has to be returned all the way up to the MMU 28 or another element of the processor pipeline 4 for the check to be performed before the write can proceed and return the write data to the memory system location storing the data.

In the example shown in FIG. 8, both valid and invalid stage-1 translation table entries have an encoding allowing the entry to be specified as a protected entry. However, it is not essential for invalid entries to be capable of being specified as protected, and other examples could omit the protected entry encoding bitfield 78 from the invalid entry format. Also, different implementations may choose different options for how many bits of a protected entry have their update suppressed in response the RCW instruction. Some implementations could prevent any updates to a protected entry in response the RCW instruction, with updates only be permitted in response the RCW instruction if the data at the given memory system location is not encoded as a protected entry. Other implementations could specify an update-restricted subset of bits and a non-update-restricted subset of bits, and so updates to the non-update-restricted subset of bits may be allowable even for protected entries. For example, there may be some fields which are not critical to security, such as the access flag 70 and dirty bit modifier 72, which could be allowed to be updated even in a protected entry. Which bits are update-restricted or non-update-restricted could either be fixed in a non-programmable manner for a given architecture, or could be programmable by software using a selection value stored in a control register. For example, the selection value could select from one of several different modes, each mode associated with a different setting for which bits are update-restricted. However, in the example of FIG. 7 the selection value is encoded as a bit mask which identifies the positions of the update-restricted bits, with the selection value stored in a mask register (e.g. the RCWMask_Valid_EL2 and RCWMask_Invalid_EL2 registers shown in FIG. 7 for selecting the update-restricted bits for valid and invalid entries respectively—the RCW_Mask_Invalid_EL2 register could be omitted in implementations where invalid entries are not capable of being encoded as protected entries). Updates to the selection value may be restricted to program instructions executing at a threshold privilege level or higher, for example only instructions executing at EL2 or EL3 may be allowed to update the selection value. There may be some bits which are forced to be update-restricted, regardless of the state of the selection value. For example, the bitfield 76, 78 used to encode whether the entry is a protected entry may not be allowed to be updated regardless of which other bits are able to be updated. In general, the RCW instruction may be prohibited from changing the status of whether a particular entry is protected or non-protected. The setting of the bitfield 76, 78 would instead be controlled by program code executing at a higher level of privilege, such as EL2 or EL3, which may be accessing memory using a different set of stage-2 translation tables which does not mark the memory region storing the protected entry as partially read-only, and so can set the bitfield 76, 78 of the protected stage-1 entry using a standard general purpose store instruction.

There are a variety of ways in which the protected-entry check could be implemented. In one example, if the entry stored at the accessed memory system location is valid and protected, then it cannot be altered, and if it is invalid then it can be altered, including making it valid (so long as the entry is not also made protected). Alternatively, there could be a protected bitfield 76 in the valid entry, and a protected bitfield 78 in the invalid entry, and no changes to protected entries may be allowed, otherwise updates are allowed to non-protected (valid or invalid) entries other than (changing the status of whether the entry is protected). Another example could provide a protected bitfield 76 in the valid entry, and a protected bitfield 78 in the invalid entry, and the RCW instruction may be allowed to make any changes to the entry if not protected (other than making it protected), while if it is protected then the RCW instruction can make changes to some bits as described for a valid entry, and to some bits in an invalid entry. In some examples, the mechanism for describing which bits are protected is a hardwired architectural choice of any field except the protection or valid fields. Alternatively, the mechanism for describing which bits are protected in the valid entry could use a mask register owned by EL2, and/or the mechanism for describing which bits are protected in the invalid entry is a mask register owned by the EL2. Different choices for defining the update-restricted bits are possible for valid and invalid entries respectively—e.g. one approach could be to define a mask register for defining the update-restricted bits of the valid entry, but hardwire the update-restricted bits for the invalid entry.

There can also be variation in how to apply the check when it is allowed to update some fields in a protected entry, two example options being:

A) The protected-entry-checking circuitry 54 reads the current entry to check if the entry is valid and/or protected, and then stores only the bits that are allowed to be written (without checking if the RCW instruction was attempting to change the update-restricted bits that are not allowed to be written).

B) The protected-entry-checking circuitry 54 reads the current entry to check if the entry is valid and/or protected. If it is protected, and the RCW instruction is not attempting to change any bits that are not allowed to be written, the write can take place, but if the RCW instruction attempts to update any update-restricted bit, the write fails and nothing is written.

Both A and B are viable alternatives.

In response to the RCW instruction, an indication of whether the write was successful or failed can be written to condition status flags stored in a control register of the processing circuitry 4. For example, condition status register may include a number of condition flags (e.g. a negative flag N, zero flag Z, carry flag C and overflow flag V) which can be set depending on the outcome of a processing operation and can be tested by a conditional instruction which may then trigger an operation (such as a branch operation or arithmetic/logical operation) conditionally depending on the state of the condition status flags. Hence, it can be useful to update the condition status flags based on whether any part of the write requested by the RCW instruction was unsuccessful, to allow a subsequent instruction to take action depending on the outcome of the write without needing to re-read the memory system location to check whether the write was successful.

Figure 13:
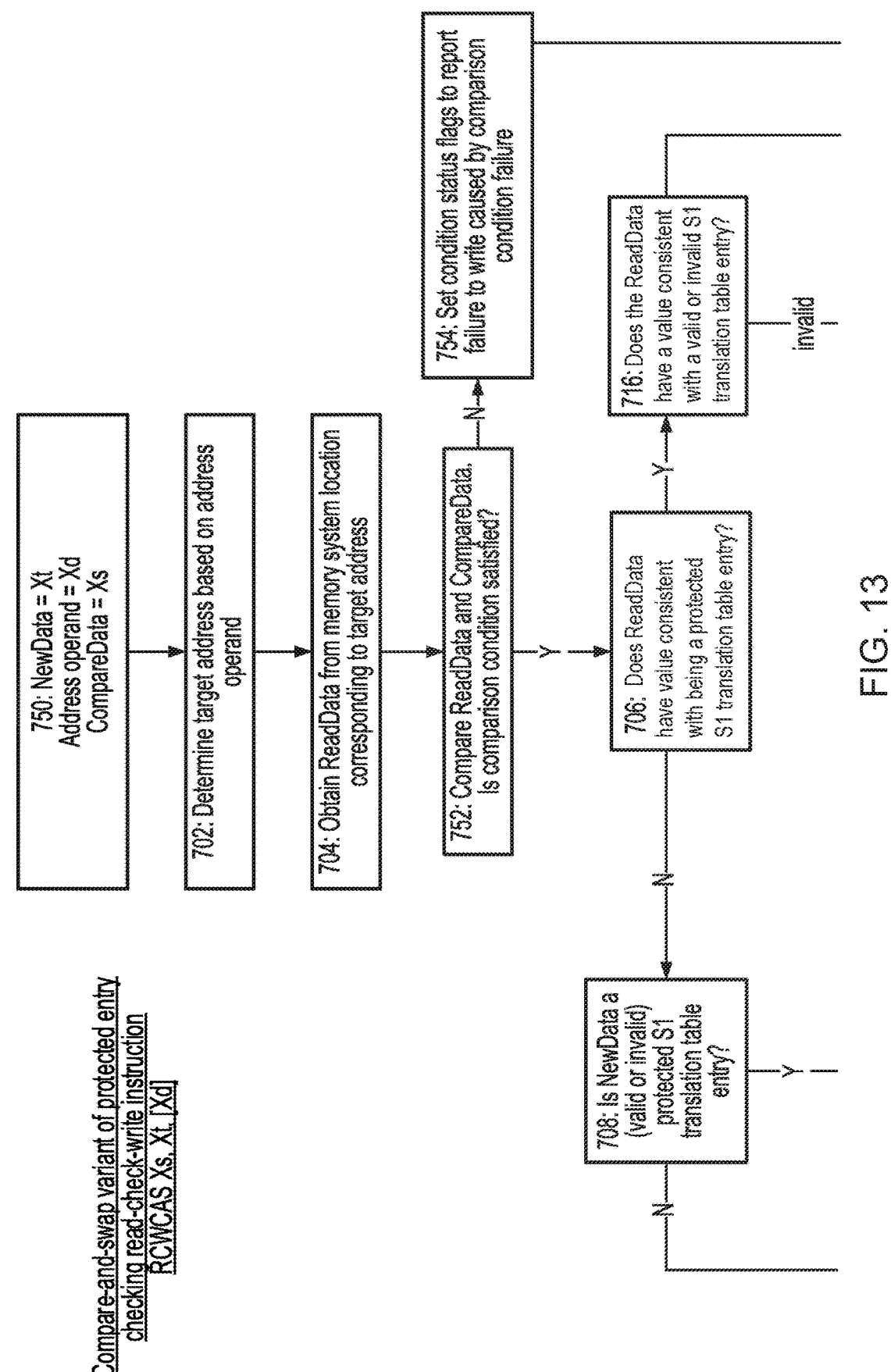
Figure 13:
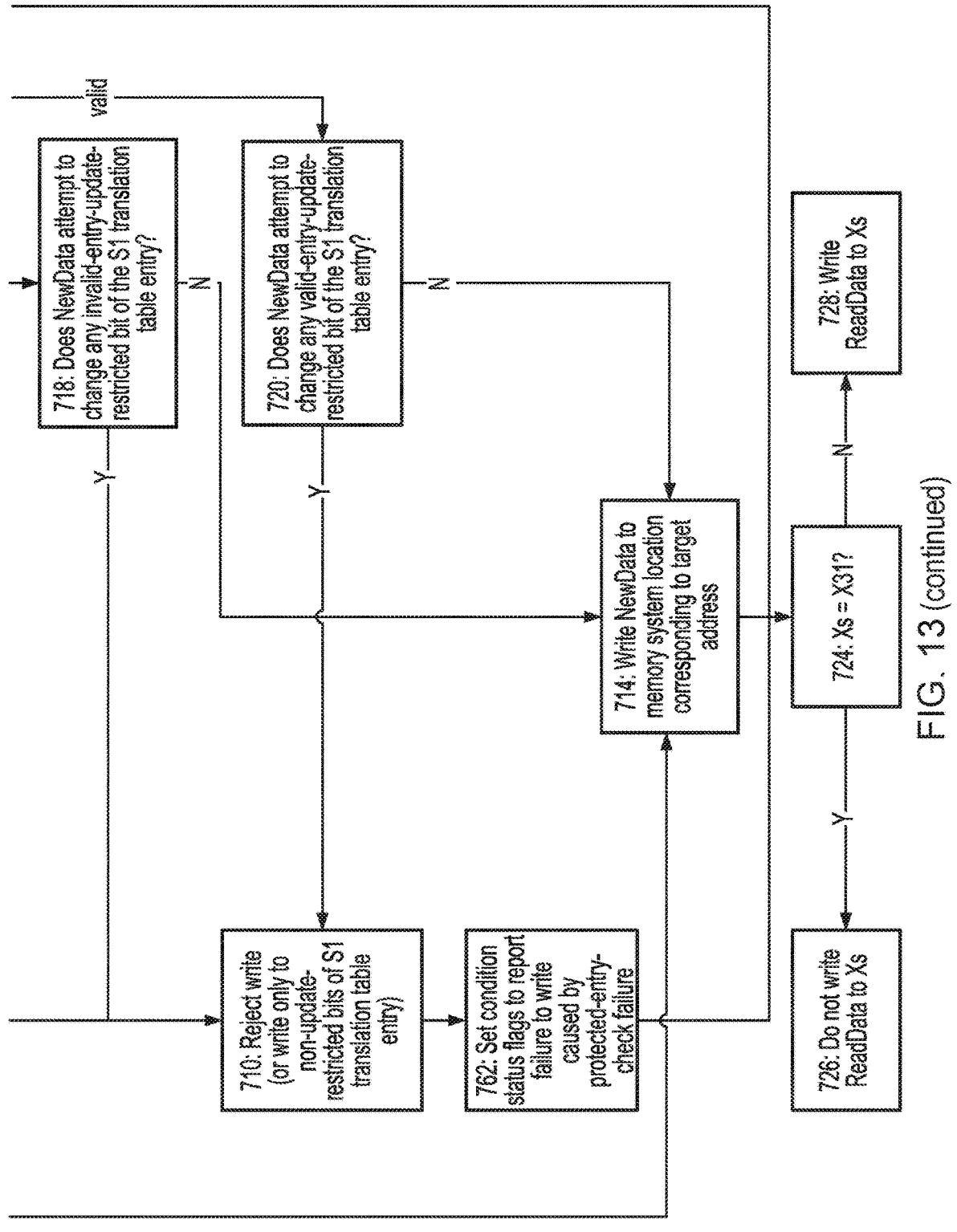
Figure 14:
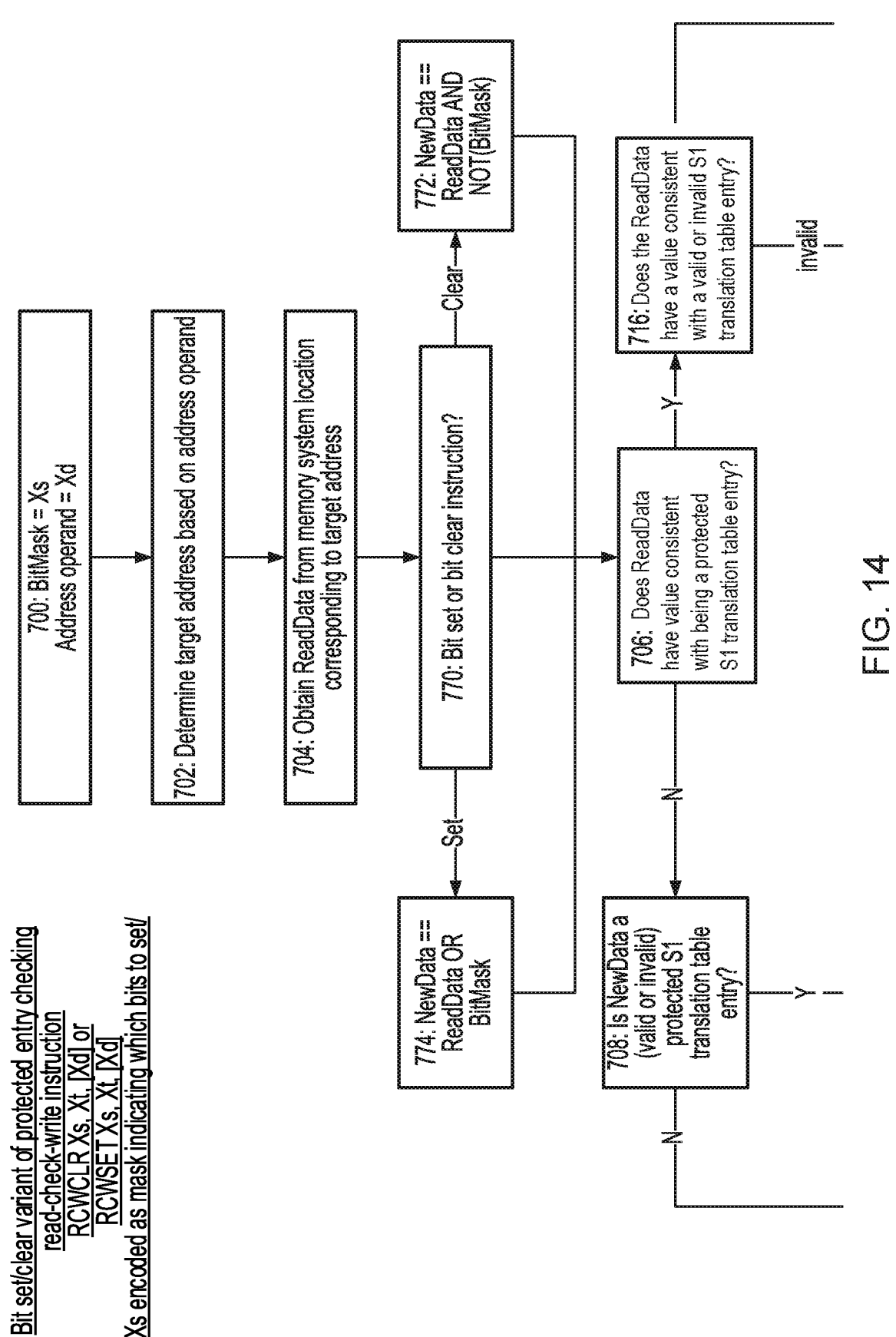
Figure 14:
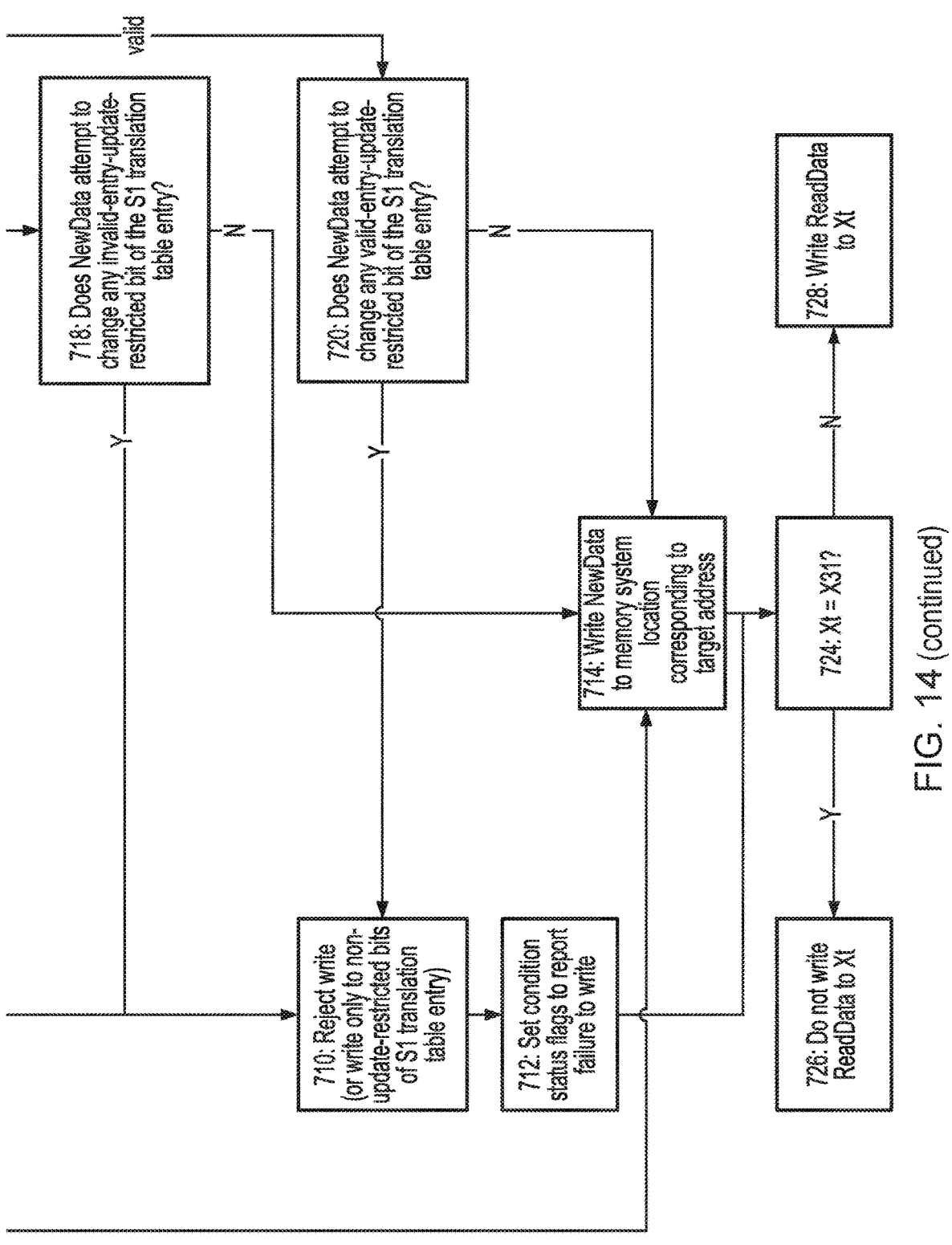

FIGS. 12, 13 and 14 illustrate processing of a number of variants of the protected-entry-checking RCW instruction. FIG. 12 illustrates an example of processing of either a store variant or a swap variant of the instruction (the majority of processing steps being the same for both instructions, other than the final step 726 or 728 which depends on the variant). The store and swap variants both specify a register Xd which provides an address operand used to generate an address of the given memory system location to be updated, and a source register Xs which provides the new data to be written to the given memory system location. At least the swap variant also specifies a destination register Xt to which the old data read from the given memory system location is to be written. The store variant does not need to specify any destination register as the store variant differs from the swap variant in that the old data is not written to any destination register. However, in one example the store variant and the swap variant could be encoded using an identical encoding, except that the instruction may be treated as the store variant when the field used to specify the destination register Xt has a predetermined value. For example, some instruction set architectures may define a particular register specifier (e.g. register 31) as corresponding to a "zero" register which when specified as an operand for an instruction causes the operand to be treated as if it has the value zero, without needing the operand to actually be read from a register provided in hardware. Hence, in some examples, the instruction could be treated as the store variant when the destination register Xt is specified as the "zero" register X31. In other examples, the store instruction could be encoded as a completely different instruction type to the swap instruction.

At step 700 of FIG. 12, the address operand and new data ("NewData") to be written are read from the registers identified by register specifiers Xd and Xs respectively. At step 702, the target address for the memory access is determined based on the address operand. For example the address operand could be treated as an absolute address directly specifying the target address, or could define offset relative to a reference address such as a value in a further base register or the program counter value identifying the address of the RCW instruction itself. The target address computed based on the address operand is a virtual address and may be translated into a physical address by the MMU 28. At step 704, assuming any MMU checks (other than the protected entry check) for whether the target address is accessible to the current instruction are passed, a read request is issued to the memory system to obtain the data ("ReadData") read from the memory system location corresponding to the (translated) target address. This corresponds to the "Read" of the RCW instruction.

As step 706 the protected-entry-checking circuitry 54 determines whether the ReadData has a value consistent with encoding of a protected stage-1 (S1) translation table entry. This corresponds to the "Check" part of the RCW instruction. If the ReadData does not have a value consistent with being a protected stage-1 translation table entry, then at step 708 the protected-entry-checking circuitry checks whether the NewData is encoded as a protected stage-1 translation table entry. If so, then at step 710 the write requested by the RCW instruction is rejected, or alternatively the non-update-restricted bits of the stage-1 translation table entry specified as the NewData by the RCW instruction can be written to the corresponding bits of the memory system location, with at least the bits used to encode whether the entry is protected being considered update-restricted bits which are not written. Either way, at step 712 the condition status flags are set to report the failure to carry out the write requested by the RCW instruction fully.

If at step 706 the ReadData was determined to be encoded as a protected stage-1 translation table entry then at step 716 the protected-entry-checking circuitry 54 determines whether the read data has a value consistent with being a valid or invalid stage-1 translation table entry. If the read data has a value consistent with being an invalid protected stage-1 translation table entry, then at step 718 the protected-entry-checking circuitry 54 determines whether the New-Data attempts to change any invalid-entry-update-restricted bits of the stage-1 translation table entry (including at least any bits used to encode whether the entry is protected), and if so then again the method proceeds to step 710 and 712 to suppress the update of at least the invalid-entry-update-restricted bits and set the condition status flags (again, this could be done either by rejecting the write entirely or by writing only to non-update-restricted bits).

On the other hand, if at step 716 it is determined that the ReadData has a value consistent with being a valid stage-1 translation table entry encoded as a protected entry, then at step 720 the protected-entry-checking circuitry 54 determines whether the NewData attempts to change any valid-entry-update-restricted bits (including at least any bits used to encode whether the entry is protected) of the stage-1 translation table entry read from the memory system location corresponding to the target address. If so, then again at step 710 the write is rejected or permitted only to write the non-update-restricted bits, and at step 712 the condition status flags are set to report the failure of the write.

In implementations which do not support invalid translation table entries being encoded as protected entries, steps 716 and 718 can be omitted and the method can proceed direct from step 706 to step 720 in the case when the ReadData is encoded as a protected entry.

If at step 708 the NewData to be written in the case when the ReadData was not a protected entry, or at steps 718 or 720 the NewData (to be written in the case when the ReadData was a protected entry) does not attempt to change any update-restricted bits, then at step 714 the write of the RCW instruction is permitted, and so the NewData is written to the memory system location corresponding to the target address.

Regardless of whether the write was successful or rejected (at least partially), at step 724 the operation varies depending on whether the current RCW instruction being executed is the store variant or the swap variant. If the instruction is the store variant then at step 726 no further action is needed and the ReadData is not written to any destination register. If the instruction is the swap variant then at step 728 the ReadData is written to the destination register Xt. Some implementations may not support both the store and stop variants, in which case step 724 can be omitted and the method can proceed direct from step 714 to the relevant one of steps 726 and 728.

The read at step 704, write at step 714 and the various checking operations performed between steps 704 and 714 are performed atomically, as an indivisible set of operations for which it is not possible for an intervening write to the memory system location to take place between the read at step 704 and the write at steps 710 or 714, or for another thread of execution to see a partial outcome of performing the set of operations.

FIG. 13 is a flow diagram illustrating processing of a compare-and-swap (CAS) variant of the protected-entry-checking RCW instruction. The steps of FIG. 13 illustrated with the same reference numerals as in FIG. 12 are the same as discussed above. Note that the notation used for the registers used to store the ReadData and provide the New-Data has been swapped in FIG. 13 compared to FIG. 12-Xt now being the register providing the NewData and Xs being the destination register written with the old value of the ReadData prior to the write. FIG. 13 differs from FIG. 12 in that step 700 is replaced with step 750 as the CAS variant specifies an additional source operand, called the compare data ("CompareData"). In this example, to reduce the number of register fields needed in the instruction encoding, the CompareData is specified in the same register Xs used as the destination register for writing the ReadData at step 728, but this is not essential and other examples could specify the compare data in a further register separate from Xs.

Steps 702 and 704 are the same as in FIG. 12. After step 704, an additional step 752 is performed to compare the ReadData read from the given memory system location corresponding to the target address and the CompareData specified by the RCW instruction in register Xs. The protected-entry-checking circuitry 54 determines, based on the comparison, whether a comparison condition is satisfied. For example, the comparison condition could be whether the CompareData and ReadData are equal, or could be based on another comparison condition such as less than, greater than, not-equal, etc. Some implementations may fix the comparison condition as being an equals condition, while other implementations could allow a parameter of the instruction to select which type of comparison to perform. If the comparison condition is not satisfied, then at step 754 the write requested by the RCW instruction is rejected and the condition status flags are set to report the failure to write being caused by the comparison condition failure (e.g. setting the negative flag N on a comparison condition failure). If the comparison condition is satisfied then steps 706, 708, 710, 714, 716, 718, 720 are performed in the same way as in FIG. 12 to check the protected entry status of the data read from the memory system location corresponding the target address and controlling whether the write is permitted based on the outcome of the check. If the write is permitted then step 714 is the same as discussed earlier to allow the write to proceed to write the NewData to the memory system location. If the write is rejected or only partially performed at step 710, then the subsequent step 712 of FIG. 12 is replaced with step 762 of FIG. 13, which is the same in that it sets the condition status flags to report the failure to write, but in the case of the compare and swap variant this may distinguish that the failure was caused by a protected-entry-check failure, setting the condition status flags to a different value to the value used at step 754 in the case of a comparison condition failure.

Regardless of whether or not either the comparison condition is satisfied or the protected-entry checks are successful, steps 724, 726 and 728 are the same as in FIG. 12 to optionally write the ReadData to the destination register Xs (again it is possible to suppress the update of the destination register Xs when the destination register specifier specifies a predetermined value, e.g. 31).

FIG. 13 shows a case where the comparison condition evaluation takes precedence over the protected entry check, so if the comparison condition fails but also the entry is protected and the checks at steps 708, 718, 720 fail, then the condition status codes would indicate the CAS failure. It would also be possible for the protected entry check to take precedence so that if the entry is protected and the checks at steps 708, 718 or 720 fail, then even if the comparison condition would have been failed then the condition status codes would indicate the failure to write due to the protected entry check. For example, FIG. 13 could be modified to implement steps 752 and 754 after step 714 instead of before step 706.

FIG. 14 is a flow diagram illustrating processing of a bit set/clear variant of the protected-entry-checking RCW instruction. In FIG. 14, steps 700-728 are the same as in FIG. 12, except that in FIG. 14 the NewData, rather than being specified directly in a source register, is calculated based on a bit mask ("BitMask") provided in the source register Xs which encodes the positions of the bits to be set or cleared within the addressed memory system location. Hence, the only differences relative to FIG. 12 are that at step 700 the register Xs defines the BitMask rather than specifying the NewData directly, and that between steps 704 and 706 additional steps 770, 772, 774 are performed. At step 770 the method differs depending on whether a bit set or bit clear instruction is being executed (it is not necessary to support both types of instruction, so if only one of these instructions is supported then step 770 could be omitted and the relevant one of steps 772, 774 performed after step 704). If a bit set instruction is being executed then at step 774 the NewData is set to the result of performing a bitwise OR operation on the ReadData read from the addressed memory system location and the BitMask specified by the RCW instruction (hence, for the bit set instruction the bit positions marked with a '1' in the BitMask are requested to be set to 1 within the addressed memory system location). In contrast, at step 772 if the bit clear instruction is being executed then the NewData is set to the result of performing a bitwise AND operation on the ReadData and the inverse of the BitMask (hence, for the bit clear instruction the bit positions marked with a '1' in the BitMask are requested to be cleared to 0 within the addressed memory system location). For both the bit set and bit clear variants, the bits of the ReadData corresponding to '0' bits of the BitMask retain their original values in the NewData, so are unchanged by the RCW instruction. Having calculated the NewData at step 772 or 774, the subsequent steps of FIG. 14 are all the same as in FIG. 12.

For all of the flow diagrams in this application, it will be appreciated that the same functionality could also be implemented in a different sequence, so that while the flow diagrams show a sequential sequence of steps, for any steps that do not depend on each other, it is possible to reorder the steps or perform them at least partially in parallel.

Hence, as shown in FIG. 6, the various stage-1 translation table entries used to traverse the translation table tree structure to reach the intermediate address mapping corresponding to a sensitive memory page (e.g. a page expected to be used for sensitive data or instructions) can be set to have the protected entry encoding. This may be the case even if one of these entries is temporarily set as invalid to prohibit access to the page (e.g. as a result of a paging operation). Meanwhile other entries in the same page tables as the protected entries could be non-protected entries for which updates are less restricted. By supporting the protected entry encoding this makes it possible for a given page table stored in a PRO region of memory to contain a mixture of protected and non-protected entries, with the non-protected entries being able to be updated by operating system code executing at EL1 without hypervisor intervention, by executing the RCW instruction according to any of the variants discussed above, while the protected entries can have tighter restrictions placed on them. Since a dedicated type of instruction (e.g. one or more of the variants of the RCW instruction mentioned above) is provided for triggering the protected-entry checks, and the PRO permission prevents other types of instructions (such as the majority of store instructions) being able to update the PRO region of memory, this avoids the need to carry out the protected entry checks on every write to memory which would be very expensive in terms of performance.

Anti-Aliasing Check

Figure 15:
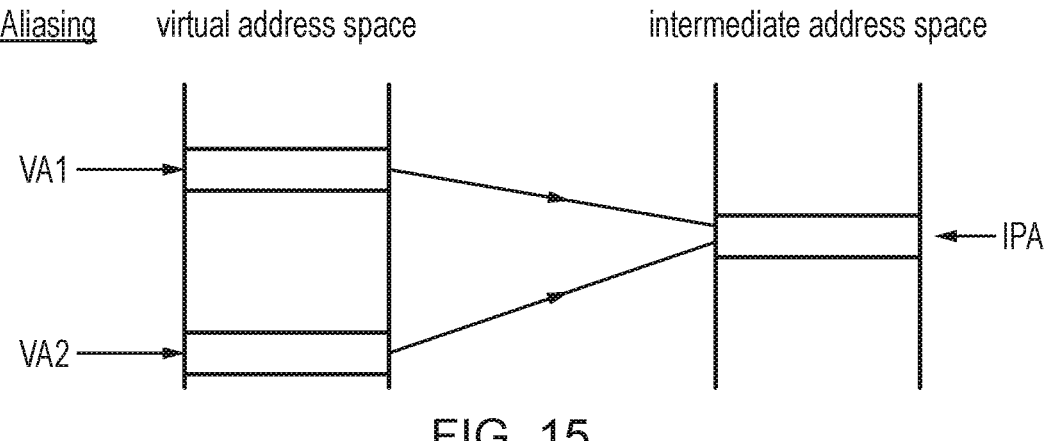
FIG. 15 illustrates aliasing of virtual addresses onto the same intermediate address.

The mechanisms discussed above are useful for protecting a particular stage-1 translation entry against corruption (either deliberately by code hacked by a malicious party or accidentally by poorly written code). However, as shown in FIG. 15 it is possible for several different virtual addresses to alias to the same intermediate address, by defining stage-1 translation table entries specifying the same intermediate address mapping 62. To prevent an attacker being able to circumvent the protections provided by the PRO permission and protected-entry encoding discussed above for a first set of stage-1 translation entries mapping VA1 to IPA, by defining an aliasing stage-1 entry mapping a different virtual address VA2 to the same intermediate address IPA, as shown in FIG. 8 stage-2 translation table entries may have a bitfield 79 specifying whether the corresponding region of memory has an anti-aliasing property (alternatively, the anti-aliasing property 79 could be specified indirectly by the stage-2 translation table entry, with reference to an indirection register). If the region is indicated as having the anti-aliasing property then an additional anti-aliasing check is performed on accesses to that region to check whether all walked stage-1 translation table entries (that would be accessed in a translation table walk to locate the corresponding stage-1 translation table entry specifying the stage-1 address mapping from the virtual address to the physical address for that region) are either: (a) stored in PRO or read-only regions of memory and encoded as protected entries, or (b) stored in read-only regions of memory. Note that this is not necessarily require the page table walk through those walked stage-1 translation table entries to actually be performed on every access to the memory region associated with the stage-2 translation table entry having the anti-aliasing property. It is possible that information could be cached in the TLB 29 to indicate whether the anti-aliasing check is passed (or to indicate for certain walked stage-1 translation table entries whether they have already been determined to be stored in a PRO region and/or be a protected entry), to avoid needing to perform the full translation table walk every time.

Figure 16:
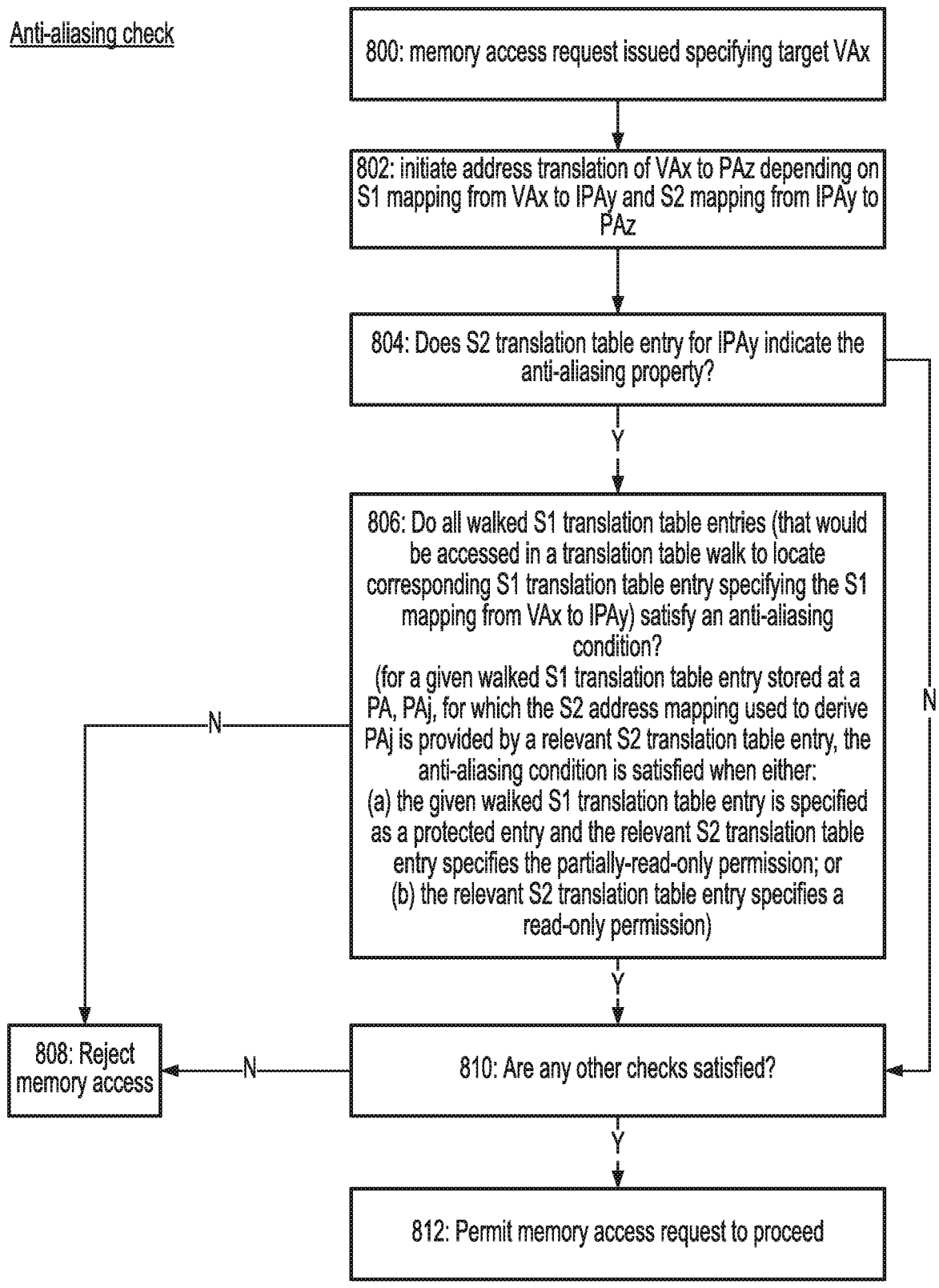
FIG. 16 illustrates an anti-aliasing check.

FIG. 16 is a flow diagram showing a method of performing the anti-aliasing check. At step 800 a memory access request is issued specifying a certain target virtual address VAx. At step 802 the MMU 28 initiates the address translation from the target virtual address VAx to the target physical address PAZ, depending on a stage-1 mapping from VAx to an intermediate address IPAy and a stage-2 mapping from intermediate address IPAy to the target physical address PAz (it is not essential to perform two separate actions for stage-1 and stage-2 translation—while that is one option, other examples could have a combined stage-1-and-2 TLB which can map directly from VAx to PAz for translations which have already been cached, but on a miss in the TLB the new VA-to-PA mapping is identified by performing the stage-1 and stage-2 walks as shown in FIG. 6).

At step 804 the MMU 28 checks whether the stage-2 translation table entry (Block or Page descriptor) corresponding to IPAy indicates the anti-aliasing property. If so, then at step 806 the MMU checks whether all walked stage-1 translation table entries satisfy an anti-aliasing condition. The walked stage-1 translation table entries are the entries that would, if a full translation table walk corresponding to virtual address VAx was performed, be accessed in a translation table walk to locate the corresponding S1 translation table entry specifying the S1 address mapping from VAx to IPAy (the walk may not actually be required for the current memory access, depending on what is already cached in TLBs 29). For example, in FIG. 6 the walked stage-1 translation table entries would be the entries marked D_Table in the L0, L1 and L2 stage-1 page tables, and the entry marked D_Page in the L3 stage-1 page table. The anti-aliasing condition is satisfied for a given walked stage-1 translation table entry when either of the following conditions is satisfied:

a) the given walked stage-1 translation table entry is specified as a protected entry, and the given walked stage-1 translation table entry is stored at a physical address, PAj, for which the PRO permission or a read-only permission is specified by the relevant stage-2 translation table entry which provides the stage-2 address mapping used to derive PAj; or b) a read-only permission is specified by the relevant stage-2 translation table entry providing the stage-2 address mapping used to derive the physical address PAj of the given walked stage-1 translation table entry.

For the specific example of FIG. 6, the relevant stage-2 translation table entry for the L1 stage-1 entry used to derive the PA of the accessed page would be the stage-2 L3 entry indicated as "D_Page" in FIG. 6. For the other walked stage-1 entries shown in FIG. 6, there would similarly be relevant stage-2 L3 entries (or stage-2 L1 or L2 entries if a stage-2 Block descriptor is found corresponding to IPAy) that should be marked with the PRO or read-only permission in order for the anti-aliasing condition to be satisfied (these are the entries at the end of the various stage-2 translation walks shown for obtaining the physical addresses of each walked stage-1 translation table).

If at step 806 of FIG. 16 the MMU 28 determines that any one or more of the walked stage-1 translation table entry does not satisfy the anti-aliasing condition, then at step 808 the memory access is rejected. A fault can be signalled, which can trigger an exception handler (e.g. executing at EL2) to perform an error handling action.

Step 808 is omitted if all the walked stage-1 translation table entries satisfy the anti-aliasing condition. In this case, at step 810 the MMU 28 also checks whether any other checks are satisfied (such as any checks based on the PRO permission being set for the access to memory region, the protected-entry checks if the memory access request is issued in response to an RCW instruction, or any other specific checks for protecting against other inappropriate accesses, such as a check based on the secure/non-secure state in implementations which support this). If any of the other checks are not satisfied then again at step 808 the memory access is rejected (the fault type generated may depend on the cause of the access check failure). Otherwise at step 812 the memory access request is permitted to proceed.

Hence, as shown in FIG. 6, the anti-aliasing property can be set in the stage-2 translation table entry which provides the physical address mapping for the memory region being accessed (this could be either a Page descriptor or a Block descriptor). If the anti-aliasing property is set then for valid accesses to the corresponding memory location, this will require all the walked stage-1 translation table entries on the path to the entry providing the intermediate address mapping for that memory region to either (a) be marked as protected and for the stage-2 entry providing the physical address mappings of the regions storing those walked stage-1 translation table entries to specify the PRO permission, or (b) be stored at a PA for which a read-only permission is specified by the stage-2 entry providing the PA mapping for that PA. This means that an attacker cannot easily set up a new aliasing stage-1 address mapping to circumvent the protections applied for the trusted address mapping expected to be used to access the corresponding region of memory. An attacker able to influence the behaviour of operating system code at EL1 will not have control over the stage-2 entries used to control memory access because this will be based on the base address in the VTTBR_EL2 register which cannot be updated by code executing at EL1 (so cannot cause the PRO or read-only permissions to become set for the regions storing the attacker's newly created aliasing stage-1 address mappings). Also, the attacker is not able to cause stage-1 entries to become protected since the mechanism for code executing at EL1 to update stage-1 translation table entry may be to execute the protected-entry-checking type of RCW instruction discussed above (other instructions being prohibited from writing to the PRO regions of memory), and that instruction is not able to change the protected status of any translation table entry. Also, read-only regions cannot be written to by any write instruction. Therefore, any new entry which the attacker is able to create should fail at least one of the anti-aliasing checks of whether the stage-1 entries used to obtain the VA-IPA mapping are protected and/or whether those entries are stored in PRO or read-only regions of memory.

Protection Against Inappropriate Updates to Stage-1 Top-Level Base Address

Another attack which might be attempted by an attacker able to influence the behaviour of operating system code executing at EL1 could be to modify the stage-1 top-level base address (identifying the location in memory of the L0 stage-1 page table) indicated by the base address register TTBR_EL1. For example, the attacker could substitute an address of a new set of stage-1 tables defined by the attacker, to replace the address of the authorised page table structure which is correctly formed and behaves correctly as verified by the hypervisor. Also, the attacker could try to force the MMU 28 to use the existing authorised stage-1 page tables in an unexpected way, for example by substituting the base address of one of the L1, 2 or 3 page tables to replace the correct L0 base address, so that next-level table pointers or address mappings for a different memory region may incorrectly be used for a memory region being accessed, due to the table accessed being used at the wrong level of the tree from the expected level so that different bits of the virtual address are used to select the relevant entry from the table.

FIG. 17 illustrates stage-1 top-level base address checks which can be performed to protect against these types of attacks. At step 1000 a page table walk is required for a memory access request specifying a certain target virtual address (for memory access requests which do not require a page table walk because the required address mappings are already available from the TLB, then any required stage-1 top-level base address check would already have been done at the time when those address mappings were allocated to the cache following an earlier page table walk, and so it is not necessary to carry out another check). At step 1002, the stage-1 top-level base address is determined based on the value in the stage-1 translation table base address register TTBR_EL1. The base address is specified as an intermediate address, IPA_base. At step 1004 the MMU 28 obtains information specified by the associated stage-2 translation table entry which provides the mapping from IPA_base to PA_base. For example, this information could be obtained from the TLB 29 if already cached in the TLB, or could be obtained by performing a stage-2 translation table walk using the stage-2 base address specified in the stage-2 translation table base address register VTTBR_EL2.

At step 1006, the MMU 28 determines whether a stage-1 top-level table partially-read-only check is enabled. For example, this may be determined based on a stage-1 top-level table partially-read-only check enable control value stored in a control register (e.g. the stage-2 translation control register VTCR_EL2 for which updates are restricted to code executing at exception level EL2 or higher). Alternatively, other implementations may consider the stage-1 top-level table partially-read-only check to be permanently enabled. If the stage-1 top-level table partially-read-only check is enabled, then at step 1008 the MMU 28 checks whether the associated stage-2 translation table entry specifies the PRO permission, and if not then at step 1010 the memory access is rejected and a fault is signalled. This means that if the attacker tries to modify the stage-1 translation table base address register TTBR_EL1 to point to a new L0 page table created by the attacker, accesses based on the modified base address will fail because the attacker will not have been able to modify the PRO regions of memory and so must have written to a non-PRO region, so the stage-1 top-level table PRO check will fail.

If the stage-1 top-level table PRO check is either disabled at step 1006, or is enabled but passes at step 1008, then at step 1012 the MMU 28 determines whether a stage-1 top-level table presence check is enabled. Again, this could be determined based on a stage-1 top-level table presence check enable control value stored in a control register (e.g. the stage-2 translation control register VTCR_EL2). The enable control value used to determine whether the check is enabled at step 1012 could be the same as the enable control value mentioned above for step 1006 (e.g. in some implementations, the checks at steps 1008 and 1014 could be regarded as two steps of a single check that is either enabled as a whole or disabled as a whole). If the stage-1 top-level table presence check is enabled then at step 1014 the MMU 28 determines whether the associated stage-2 translation table entry specifies the stage-1 top-level entry presence permission 80. As mentioned above with respect FIG. 8, the stage-1 top-level entry presence permission could be encoded as an alternative variant of the PRO permission (so that memory regions having the stage-1 top-level entry presence permission are also assumed to have the PRO permission), or could alternatively be encoded as an independent attribute separate from an indication of whether the PRO permission is provided. If the associated stage-2 translation table entry does not specify the stage-1 top-level entry presence permission then again at step 1010 the memory access is rejected and a fault is signalled. This can be used to protect against a valid and authentic L1, L2 or L3 table being substituted for the L0 table by modifying the stage-1 top-level base address to point to the address of the L1, L2 or L3 table, since the stage-2 entries corresponding to memory regions used to hold the L1, L2 or L3 tables may be defined not to have the stage-1 top-level entry presence permission. Only the memory regions used to hold any valid and authentic stage-1 L0 tables can be marked in the corresponding stage-2 entries as having the stage-1 top-level entry presence permission, to restrict which addresses can be used as the stage-1 L0 base address for a valid memory access.

If the stage-1 top-level table presence check is either disabled at step 1012 or enabled but passes at step 1014, then at step 1016 the MMU carries out any other checks required to access the memory region identified by PA_base, and if these fail again rejects the memory access at step 1010. If any other checks are passed, then at step 1018 the stage-1 top-level base address IPA_base can validly be used to perform a page table walk. Hence, an address of a stage-1 top-level translation table entry is obtained by applying an index offset to the determined PA_base, with the index offset determined based on a subset of bits of the target VA to be translated. The page table walk then continues as discussed earlier.

Hence, as shown in FIG. 6, in the expected usage defined by software (so not enforced as a requirement by the hardware), among the stage-1 entries accessed on a page table walk to obtain the PA mapping 64 for a memory region for which added protection is desired, the stage-2 Page/ Block descriptor which provides the PA mapping 64 iden- tifying the storage location of the stage-1 L0 page table specifies both the PRO and stage-1 top-level presence per- missions, and the stage-2 Page/Block descriptors which provide the PA mapping 64 identify the storage location of the stage-1 L1, L2 or L3 page tables specify the PRO permission but do not specify the stage-1 top-level presence permission. This protects against the base address substitu- tion attacks described above. An alternative avoiding the need to implement base-address checks could be to trap any accesses to the stage-1 base address register TTBR_EL1 to the hypervisor executing at EL2, which could then examine whether the update requested by operating system code executing at EL1 is valid and reject the update if necessary. However, in practice the operating system may frequently need to switch the address in the base address register TTBR_EL1 on context switches, and so trapping every update may be costly in terms of performance. By imple- menting the stage-1 top-level base address check shown in FIG. 17 this can avoid the need for such traps on base address register updates to TTBR_EL1, to improve perfor- mance.

In some examples, a single variant of the stage-1 top-level presence permission can be supported, in which case the check at step 1014 of FIG. 17 can simply be a check of whether that stage-1 top-level presence permission has been specified.

Other examples may support more than one variant of the stage-1 top-level presence permission to allow finer control over which particular stage-1 translation table base address registers can specify an address in the corresponding memory region. For example, some implementations may support two stage-1 base address registers:

TTBR0_EL1, selected for stage-1 translations in EL0 or EL1 when a configurable number (N) of most signifi- cant bits of the virtual address to be translated are all set to 0 (N can be defined in a control value specified in a control register); and TTBR1_EL1, selected for stage-1 translations in EL0 or EL1 when any of the N most significant bits of the virtual address to be translated is non-zero.

Several variants of the stage-1 top-level presence permission can then be defined including:

Toplevel0: indicates a memory region allowed to be used for a Top-level translation table accessed via TTBR0_EL1 but not a top-level translation table accessed via TTBR1_EL1;

Toplevel1: indicates a memory region allowed to be used for a Top-level translation table accessed via TTBR1_EL1 but not a top-level translation table accessed via TTBR0_EL1;

Toplevel01: indicates a memory region allowed to be used for a top-level translation table accessed via either TTBR0_EL1 or TTBR1_EL1.

In this case, one implementation of the check at step 1014 may cause the fault to be signalled at step 1010 of FIG. 17, if either of the following conditions are satisfied:

TTBR0_EL1 is used to provide a base address for which the corresponding memory region does not have either the Toplevel0 or Toplevel01 permission; or TTBR1_EL1 is used to provide a base address for which the corresponding memory region does not have either the Toplevel1 or Toplevel01 permission.

In some implementations, further controls, set in a control register controlled by software at EL2, can control whether TTBR0_EL1 is prohibited from giving access to a Toplevel1 page, and whether TTBR1_EL1 is prohibited from giving access to a Toplevel0 page. In this case, the check at step 1014 may cause the fault to be signalled at step 1010 if either of the following conditions are satisfied:

TTBR0_EL1 is used to provide a base address for which the corresponding memory region does not have the Toplevel01 permission or has the Toplevel1 permission when the TTBR0/Toplevel1 fault enable control is set to enable faults to be triggered when TTBR0_EL1 is used to access a Toplevel1 page; or.

TTBR1_EL1 is used to provide a base address for which the corresponding memory region does not have the Toplevel01 permission or has the Toplevel0 permission when the TTBR1/Toplevel0 fault enable control is set to enable faults to be triggered when TTBR1_EL1 is used to access a Toplevel0 page.

These features allow more fine-grained control over which memory address regions can be used to provide the top-level stage-1 translation table, but the enable controls allow these more fine-grained checks to be disabled if it is considered acceptable for any Toplevel page to be used to provide base addresses for both TTBR0 and TTBR1.

In some implementations, the encoding of the various top-level presence permissions Toplevel0, Toplevel1, Toplevel01 can be combined with the encoding of the PRO permission, so that these are treated as Toplevel0 PRO permission, a Toplevel1 PRO permission and a Toplevel01 PRO permission. In such an implementation it would not be possible to define a Toplevel0, Toplevel1, or Toplevel01 memory region as not having the PRO permission. Never- theless, it is possible to define a PRO region as not having any of the Toplevel0, Toplevel1, or Toplevel01 permissions as there is a separate PRO permission encoding which is not treated as having any of the stage-1 top-level table presence permissions.

In the example of FIG. 8, the PRO permission and S1 top level entry presence permission are shown as specified in the S2 permissions field 68 specified directly as part of the encoding of the stage-2 translation table entry itself. Simi- larly, the stage-1 translation table entry is shown as directly encoding stage-1 permissions in a field 66 of the entry itself. However, as shown in FIG. 18, it is also possible for permissions information to be specified indirectly by the stage-2 translation table entry in a permission indirection register. In this case, the stage-2 translation table entry could specify a field identifier identifying which field of the permission indirection register specifies the stage-2 permissions for that entry, and the referenced field of the permission indirection register is encoded to indicate the permission type. This approach can be used, for example, for the PRO permission 74, S1 top level entry presence permission 80, anti-aliasing property 79 described above, or the GCS attribute described below. Indirect permission specification using a register can be useful to allow software to quickly update permissions for many translation table entries that all reference the same permissions field, by a single update to a register field, rather than needing to update many different translation table entries in memory. Also, in implementations where each field of the permission indirection register has more bits than the corresponding permissions field of the translation table entry, the indirection can help to support more types of permissions than would be possible with the limited encoding space for permissions within the entry.

Figure 19:
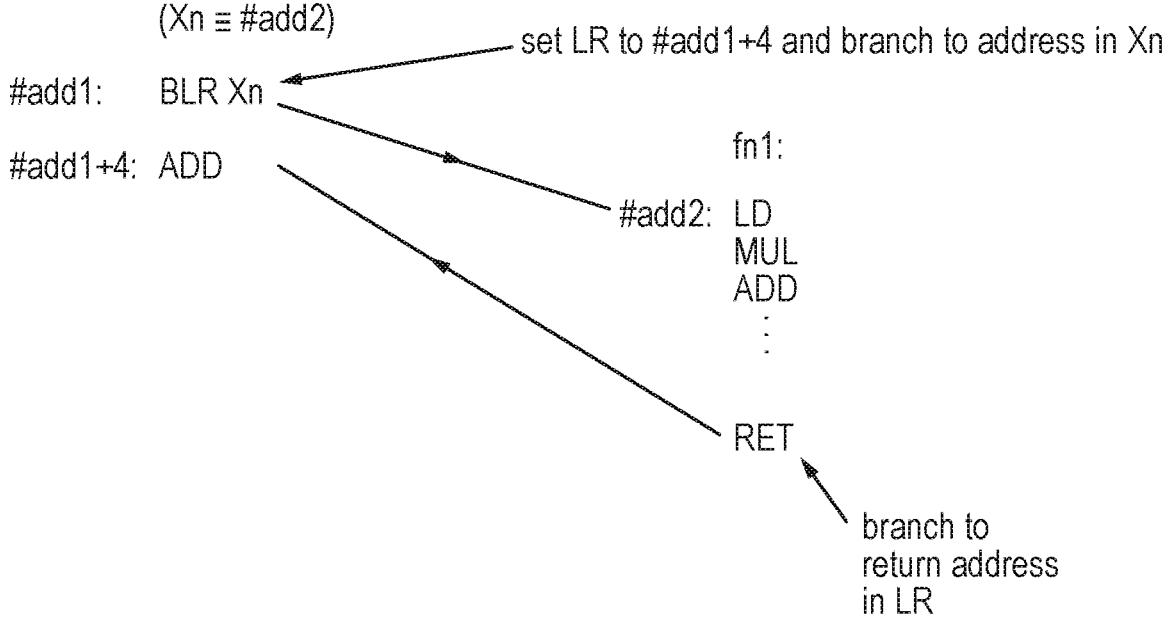
FIG. 19 illustrates an example of a function call and return.

Guarded Control Stack for Protection Against Return Oriented Programming Attacks FIG. 19 illustrates an example of calling a function (labelled fn1 for ease of reference) and returning from the function. A function (also known as a procedure) is a sequence of instructions that can be called from another part of a program and which when complete returns processing to the part of the program flow from which the function was called. The same function can be called from a number of different locations in the program, and so a function return address is stored on calling the function, so that the function return can distinguish which address program flow should be returned to.

For example, as shown in FIG. 19, a branch with link instruction BLR may be executed at the point where the function is to be called, to cause program flow to branch to an instruction at a branch target address specified using operands of the branch with link instruction. The branch with link instruction also causes the processing circuitry to set a link register (a designated register used for tracking a function return address) to an address of the next instruction after the branch with link instruction. After the branch has been taken, a number of instructions (e.g. LD, MUL, ADD, etc.) are executed within the function code and when the function is complete a return branch instruction RET is executed which causes a branch to the instruction indicated by the return address stored in the link register.

If no other functions are called from within fn1, and no exception occurs before the return branch at the end of fn1 is reached, then the address in the link register should still be the same as set when fn1 was called.

However, often a first function fn1 called by background code may itself call a further function (fn2, say) in a nested manner, and in this case the function call to fn2 would overwrite the return address stored in the link register, and so prior to calling that further function, the function code of the first function fn1 should include an instruction to save the return address from the link register to a data structure in memory (e.g. a stack structure, operated in a last-in-first-out (LIFO) manner), and after returning from fn2 the function code of fn1 should restore the return address to the link register before executing the return branch. The responsibility for saving and restoring function return state such as the return address would typically lie with the software (there may be no architecturally-enforced hardware mechanism for saving the return address).

However, while the function return address is stored in memory, it may be vulnerable to an attacker modifying that data, for example using another thread executing on another processor core, or by interrupting the called function and executing other code in the meantime which overwrites the return address stored in memory. Alternatively, the attacker could execute some instructions which aim to modify the address operands of the instruction which restores the return address from memory to a register, so that the data loaded from memory is not the same as the return address which was originally saved to memory before calling a nested function. If the attacker can cause the return branch to branch to a point in the program flow other than the instruction after the function calling branch (#add1+4 in the example of FIG. 19), the attacker may be able to cause the software to behave incorrectly, and may be able to circumvent certain security protections or cause undesired operations to be performed.

A function call is one example of an operation which generates return state information providing information about the state to which the processing circuitry is to be restored at a later time. Another scenario when return state information may be captured may be when an exception is taken, at which point exception handling circuitry provided in hardware, or a software exception handler, may capture exception return state information, such as an exception return address indicating an address of an instruction to be executed after returning from handling an exception, and/or saved processor state information indicating a mode or execution state in which the processor is to execute after returning from the exception. For example, the saved processor state information could indicate which of the exception levels EL0-EL3 the exception was taken from, as well as other information about the operating state of the processor at the time the exception was taken. As with function calls, exceptions may be nested and so exception return state captured for one exception can be saved to memory (either automatically in hardware, or by a software exception handler) when another exception is taken, and so may be vulnerable to tampering by an attacker while it is stored in memory. These types of attacks may be referred to as return oriented programming (ROP) attacks. It can be desirable to provide an architectural countermeasure against such attacks.

Figure 20:
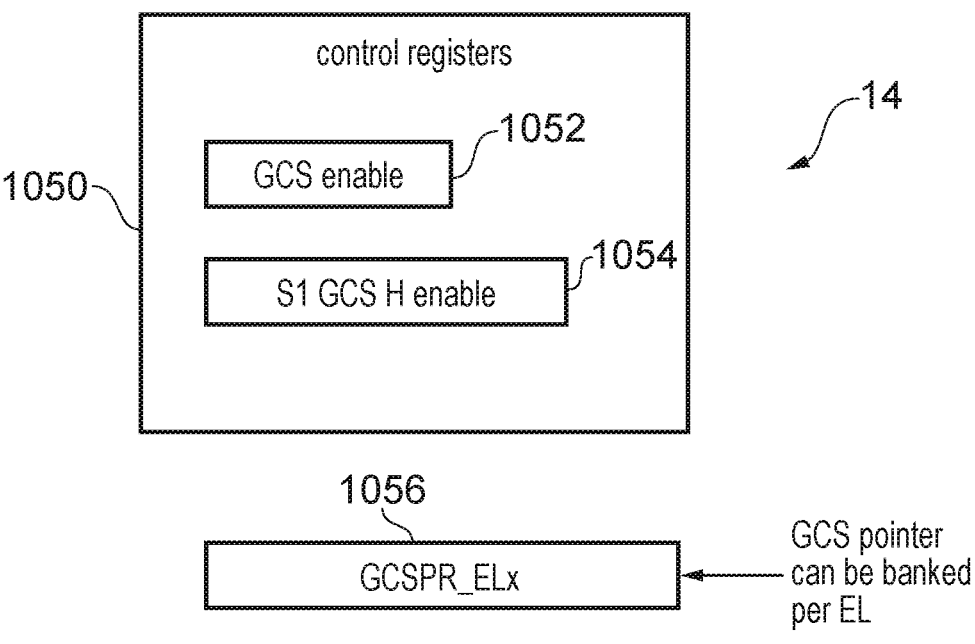
FIG. 20 illustrates registers for controlling access to a guarded control stack (GCS) data structure.
Figure 21:
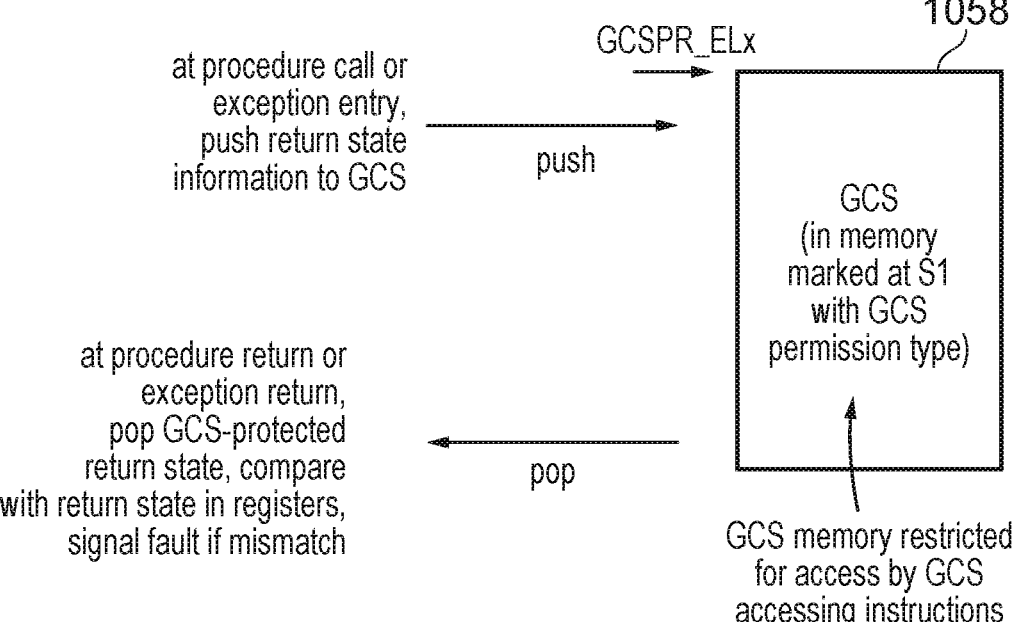
FIG. 21 illustrates use of the GCS data structure for protecting return state information for returning from a function call or an exception.

FIGS. 20 and 21 illustrate an approach for protecting against ROP attacks using a protected data structure in memory called a "guarded control stack" (GCS). The location of the GCS data structure within the memory address space may be selected by software, but the hardware provides a number of architectural features designed to protect the GCS data structure against tampering by a malicious attacker, including tampering by an operating system (operating at exception level EL1) which has been compromised by the attacker.

As shown in FIG. 20, the registers 14 include control registers 1050, which may include one or more registers which specify (among other parameters) a GCS enable parameter 1052 for specifying whether a GCS mode is enabled or disabled and a stage-1 GCS hardening-check enable control parameter 1054 which controls (when GCS mode is enabled) whether a GCS memory access request is subject to a check of whether the anti-aliasing property 79 discussed above is set for a memory region accessed by a GCS memory access request. The registers 14 also include one or more guarded-control-stack-pointer (GCS pointer) registers 1056 for storing a stack pointer indicating an address on the GCS data structure. In some examples, the GCS pointer register 1056 may be a banked set of registers, provided separately for at least two of the execution states (exception levels EL0-EL3), to enable software operating at different execution states to reference different GCS structures within memory without needing to reprogram a shared stack pointer register after each transition of execution state. Other examples could use a single GCS pointer register and software could update the stack pointer stored in the GCS pointer register 1054 on a transition between execution states. Although not shown in FIG. 20, the GCS enable parameter 1052 and stage-1 GCS hardening-check enable control parameter 1054 could also be specified separately for two or more different execution states.

As shown in FIG. 21, the GCS data structure 1058 is stored in a region of memory designated (by the stage-1 permissions 66 specified by the corresponding stage-1 address translation table entry) as being a GCS region of memory. The GCS region permission could be specified either directly within the encoding of the corresponding stage-1 address translation table entry, or could be referenced indirectly within a permission indirection register as shown in FIG. 18. When a memory region is identified as being the GCS region, then write access to that region is restricted to write requests triggered by the processing circuitry 4 when executing a certain subset of GCS-accessing instructions. General purpose store instructions used by software for general store operations not intended to access the GCS structure are not considered one of the restricted subset of GCS-accessing instructions. The MMU 28 may still permit the GCS structure to be read using a general purpose load instruction which causes issuing of a read request which is not a GCS memory access request. When a memory access request is requesting access to a GCS region, the request is a write request, and the request is not a GCS memory access request triggered by one of the restricted subset of GCS-accessing instructions, then the memory access request is rejected and the fault is signalled.

As shown in FIG. 21, the subset of GCS-accessing instructions may include at least a GCS push instruction which causes return state information (such as the function return address from the link register, or an exception return address or saved processor state captured on taking an exception) to be pushed to a location on the GCS structure determined using the stack pointer indicated in the GCS pointer register 1056 corresponding to the current execution state ELx. The GCS-accessing instructions also include at least one form of GCS pop instruction which pops protected return information from the GCS structure.

The GCS structure is separate from any data structure used by the software to maintain saved return state information within memory to handle nesting of function calls or exceptions. Hence, the GCS structure is not intended to eliminate the need for software itself to track saving and restoring of return state information when function calls or exceptions are nested (the software-triggered saving of return state may continue in the same way as on a processor not supporting the GCS-protected architectural measures discussed above). Instead, the GCS structure provides a region of protected memory which is protected against tampering by compromised code operating at exception level EL0 or EL1, which can be used to provide information for verifying the return state information intended to be used by the software to return from processing of the function call or an exception.

Hence, in some implementations the GCS pop instruction, which causes protected return state information to be popped from the GCS structure, may also cause the processing circuitry 4 to compare the popped return state with current return state information stored in registers (e.g. the link register for a function return, or an exception return address register and/or saved processor state register for an exception return), and to signal a fault if there is a mismatch between the return state information popped from the GCS structure 1058 and the intended return state information which software intends to use for a function/exception return. Hence, software can be protected against tampering by including instances of the GCS push and GCS pop instruction within the program code to be executed around a function call/return or exception entry/return.

Other implementations may define a separate instruction for verifying whether the intended return state information is valid, separate from the instruction which pops return state information from the GCS structure 1058.

Alternatively, the GCS pop instruction could pop the protected return state from the GCS directly to one or more registers used to specify the return state for an exception return or function return (or could be combined with the exception/function return instruction to both pop the protected return state and use that state for controlling an exception/function return), in which case it is not essential to carry out a step of verifying whether software-provided intended return state information is valid, as in such an implementation the GCS-protected return state is used directly to control the exception/function return.

Also, other types of GCS accessing instructions could also be supported. Some instructions, which have other functions when GCS mode is disabled using the GCS enable control parameter 1052, may cause the processing circuitry 4 to perform additional functions (such as additional GCS-mode-specific security checks) when executed when the GCS mode is enabled.

In general, by providing architectural support for defining a GCS memory region type for use for the GCS structure 1058, and restricting write access to the GCS region type to a limited subset of GCS accessing instructions (which may not be allowed to access memory regions other than the GCS region type), this reduces the attack surface available for an attacker to try to tamper with the protected return state information stored on the GCS structure 1058.

However, as the stage-1 permissions associated with the stage-1 translation table entry corresponding to a region storing the GCS structure 1058 are used to specify the property that indicates that region as being a GCS region, a compromised operating system may attempt to modify that stage-1 translation table entry to remove the GCS permission type, or define an aliasing stage-1 translation table entry as shown in FIG. 15 to allow access to the same region of physical memory using a different stage-1 translation table entry not specifying the GCS permission type.

To protect against such attacks, the translation hardening mechanism described earlier can be used to protect the stage-1 translation table entry used to designate the GCS region for storing the GCS data structure 1058. Hence, the stage-1 translation table entry which designates the GCS region type may be protected against tampering by storing it in either a read-only region or a partially-read-only region as specified by the stage-2 permissions information specified (directly or indirectly) by a corresponding stage-2 translation table entry for the memory region which stores the stage-1 translation table entry. Note that the read-only or partially-read-only region type should not be specified in the stage-2 permissions for the stage-2 entry corresponding to the GCS region itself, because pushing of return state information to the GCS region will require writing of data to the GCS region. Also, if protected entry encodings are supported as discussed above, then the stage-1 translation table entry corresponding to a GCS region can also be indicated as a protected entry to protect it against modification by the protected-entry-checking type of RCW instruction executed at EL1 as discussed earlier. Also, the anti-aliasing property 79 can be specified for the stage-2 translation table entry which corresponds to the GCS region, to enforce that all the walked stage-1 translation table entries which would be used to locate the address mapping for the GCS region have to be hardened stage-1 translation table entries which are stored in read-only or partially-read-only regions of memory (and, if the protected entry encoding is supported for stage-1 translation table entries and the translation table entries are stored in partially-read-only regions, are also required to be encoded as protected entries). These mechanisms mean that an attempt to modify the stage-1 translation table entry to remove the GCS region designation or an attempt to circumvent that entry using an aliasing stage-1 translation table entry would fail.

To ensure that the translation hardening mechanisms described above are used to protect the stage-1 translations corresponding to a GCS region and hence give confidence that GCS accesses are not being made to an alternative GCS structure substituted for the intended GCS structure by an attacker providing an aliasing stage-1 translation entry, when the stage-1 GCS translation hardening enable parameter 1054 is set to the enable state and the GCS mode is enabled by the GCS enable parameter 1052, GCS memory accesses (including both read and write accesses) are rejected (and so cause a fault) if the stage-2 translation table entry corresponding to the target memory region sought to be accessed by the GCS memory access does not specify the anti-aliasing property 79. This ensures that protections are in place that would cause a fault to be generated if any access to the GCS region is attempted using an unhardened stage-1 translation table entry that is neither: (a) stored in a region designated by a stage-2 translation table entry as being read-only, or (b) stored in a region designated by the stage-2 translation table entry as being partially-read-only and (in an implementation supporting the protected entry encoding) is encoded as an unprotected entry. The need to check the anti-aliasing property 79 in response to GCS memory accesses can be disabled by setting the stage-1 GCS translation hardening enable parameter 1054 to the disable state (this may be useful for legacy code written for a system which did not support the anti-aliasing property 79 or translation hardening mechanism).

The enable control values 1052, 1054 for controlling operation of GCS mode may be restricted to being updated by instructions executing in execution levels EL2 or EL3, to prevent update by an operating system at EL1 or application at EL0.

Figures 22, 23:
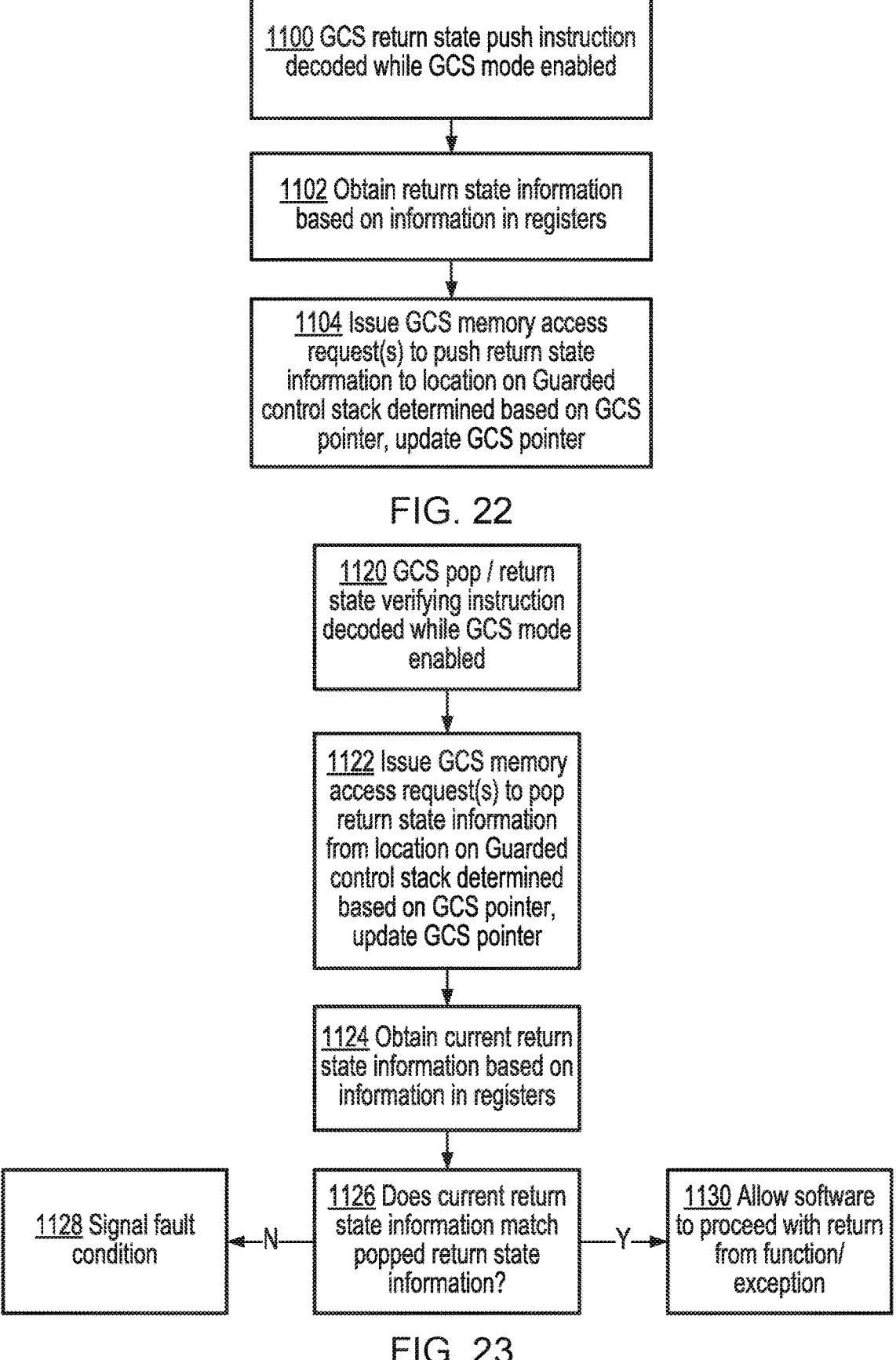
FIG. 22 is a flow diagram illustrating processing of a return state push instruction.
FIG. 23 is a flow diagram showing processing of a return state pop instruction.

FIG. 22 is a flow diagram showing processing of a GCS return state push instruction, which could be a GCS-specific instruction dedicated to pushing of return state to the GCS, or could be a repurposed function-calling branch instruction (branch-with-link instruction) which when executed in the GCS mode also acts as the GCS return state push instruction. At step 1100 the instruction decoding circuitry 10 decodes the return state push instruction while the GCS mode is indicated as enabled by the GCS enable parameter 1052. If the GCS mode is indicated as disabled then this type of instruction can be regarded as an undefined instruction and so may cause a fault, or could be treated as a no-operation (NOP) instruction which has no architectural effect but does not cause a fault. Assuming the GCS mode is enabled, then in response to the GCS return state push instruction, the instruction decoding circuitry 10 controls the execute stage

16 of the processing circuitry 4 to obtain return state information based on information in registers (e.g. the link register used to store a function return address, or exception return state registers used to store exception return information such as exception return address and saved processor state (e.g. mode/execution state indicating values)). At step 1104 the load/store unit 26 of the processing circuitry 4 issues one or more GCS memory access requests to push return state information obtained at step 1102 to a location on the guarded control stack determined based on the GCS pointer stored in the GCS pointer register 1056 for the current execution state (ELx), and the processing circuitry 4 updates the GCS pointer register 1056 to update the stack pointer to advance the stack pointer to the next location on the stack. Any known stack pointer updating mechanism can be used (e.g. the stack could be an ascending or descending stack, and the stack pointer could point either to the next location at which information is to be pushed, or to the last location to which information was pushed).

FIG. 23 is a flow diagram showing processing of a GCS return state pop instruction, which in this example also functions as a return state verifying instruction, which is decoded at step 1120 while the GCS mode is enabled. The GCS return state pop instruction could be a GCS-specific instruction dedicated to popping of return state to the GCS, or could be a repurposed exception return instruction which when executed in the GCS mode also acts as the GCS return state pop instruction. Again, if the GCS mode is disabled then this instruction may be treated as undefined or as a NOP instruction. In response to the decoding of the GCS return state pop instruction, at step 1122 the instruction decoder 10 controls the execute stage 16 (load/store unit 26) of the processing circuitry 4 to issue one or more GCS memory access requests to pop return state information from a location on the guarded control stack determined based on the stack pointer stored in the GCS pointer register 1056 for the current execution state ELx, and the processing circuitry 4 updates the stack pointer to account for the pop operation.

At step 1124, the processing circuitry 4 obtains current return state information based on information in return state registers (e.g. the link register or the exception return state registers as mentioned above). At step 1126, the processing circuitry 4 compares the current return state information with the popped return state information obtained from the GCS data structure 1058 at step 1122 and determines whether the compared state matches. If a mismatch is detected between the current return state information and the popped (GCS protected) return state information then at step 1128 a fault condition is signalled, as the mismatching return state could be a sign that a ROP attack has been attempted. If the current return state matches the popped return state obtained from the GCS structure 1058, then at step 1130, the software is allowed to proceed with a return from the function/exception. Note that the function return or exception return may be triggered by execution of a separate instruction, such as the return branch shown in FIG. 19 or an exception return instruction, so this need not be directly triggered by the GCS pop/return state verifying instruction.

While FIG. 23 shows a combined instruction for both popping return state information from the GCS and verifying the current return state against the popped return state, it is also possible to separate these operations into separate instructions (one instruction for popping return state from the GCS, and a second instruction for verifying the popped return state against the current return state). Also, a stand-alone GCS pop instruction could be provided to allow return state information to be removed from the GCS structure

1058 in a scenario where the corresponding function/exception return is no longer needed. Also, if the GCS return state pop instruction directly controls the function/exception return state used for a function/exception return (either because the GCS return state pop instruction is combined with an exception return instruction as mentioned above, or because the GCS return state pop instruction pops the GCS protected return state direct to registers used to provide the return state for controlling a function/exception return), there may be no need for the verifying steps 1126, 1128 to be performed.

Figure 24:
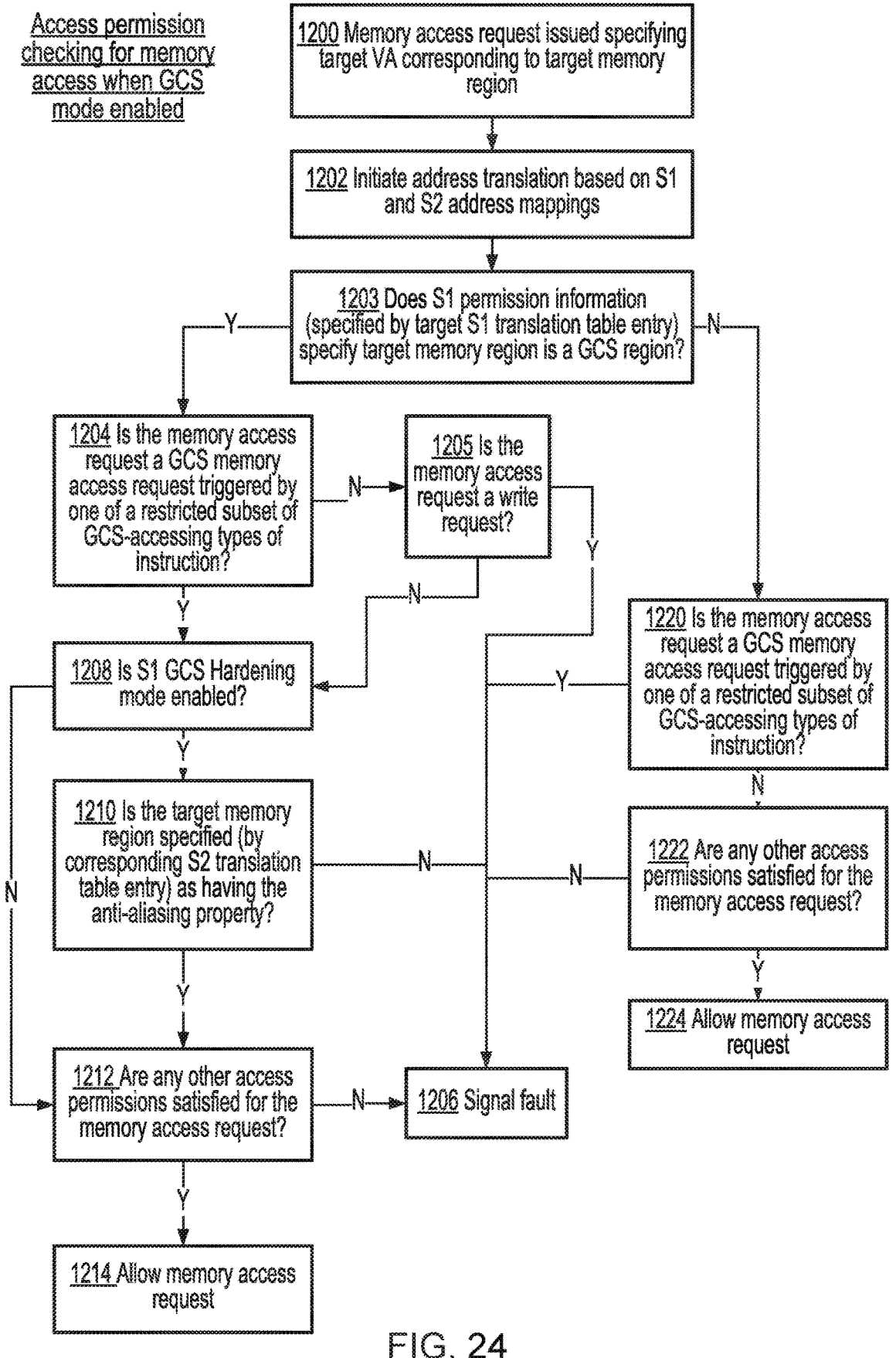
FIG. 24 illustrates access permission checking performed by memory management circuitry for a memory access request issued when a GCS mode is enabled.

FIG. 24 is a flow diagram showing access permission checking performed by the MMU 28 for memory accesses issued when the GCS mode is enabled by the GCS enable parameter 1052. At step 1200 a memory access request is issued specifying a target virtual address corresponding to a target memory region. The memory access request could be a GCS memory access request triggered by one of the GCS push/pop instructions shown in FIGS. 22 and 23 (or by another type of GCS-accessing instruction), or could be another type of memory access request not triggered by a GCS-accessing type of instruction. At step 1202, the MMU 28 initiates address translation based on the relevant stage-1 and stage-2 address mappings defined in the stage-1 and stage-2 address translation structures. At step 1203, the MMU 28 determines whether the stage-1 permission information, specified either directly or indirectly by the target stage-1 translation table entry which provides the address mapping for the target virtual address, specifies that the target memory region is a GCS region.

If the target memory region is a GCS region, then at step 1204, the MMU 28 determines whether the memory access request is a GCS memory access request triggered by one of the restricted subset of GCS accessing types of instruction. If not, then at step 1205 the MMU 28 determines whether the memory access request is a write request. If the memory access request is a write request, then at step 1206 a fault is signalled, to prevent other general store instruction types being able to write to the GCS structure 1058 stored in the GCS region.

If the memory access request is a GCS memory access request or is a read request, then at step 1208 the MMU 28 determines whether the stage-1 GCS hardening check enable parameter 1054 indicates that a stage-1 GCS hardening mode is enabled. When the stage-1 GCS hardening mode is enabled then at step 1210 an additional check is performed on the GCS memory access request, to check whether the anti-aliasing property 79 is specified for the target memory region by the stage-2 translation table entry corresponding to the target memory region. If the anti-aliasing property 79 is not specified for the target memory region, then again at step 1206 a fault is signalled.

If either at step 1208 the stage-1 GCS hardening mode was determined to be disabled, or at step 1210 the target memory region does have the anti-aliasing property 79 defined in the corresponding stage-2 translation table entry, then at step 1212 the MMU 28 determines whether any other access permissions are satisfied for the memory access request. For example, this may be based on other parameters specified in the stage-1 or stage-2 translation table entries corresponding to the target region, or other security conditions such as based on the security state, exception level or other operating modes of the processing circuitry 4. If any other access permission is not satisfied then a fault is again signalled at step 1206. If all the other access permissions are satisfied then at step 1214 the memory access request can be allowed.

If at step 1203 the MMU 28 determines that the target memory region was not a GCS region, then at step 1220 the MMU 28 determines whether the memory access request is a GCS memory access request triggered by one of the restricted subset of GCS-accessing types of instruction. This is the same check as at step 1204, but with a different outcome compared to step 1204. At step 1220, if the memory access request is a GCS memory access request, then a fault is signalled at step 1206 (this fault can be triggered for both read and write requests). This ensures that GCS memory access requests cannot be used to access non-GCS regions of memory, which will avoid software developers being tempted to use the GCS-accessing types of instruction for non-GCS accesses which would increase the attack surface available for an attacker, and allows for detection of an attack based on the address operands of a GCS-accessing type of instruction being modified by an attacker to point to a region other than the GCS. By restricting GCS-accessing types of instruction to accessing GCS regions and non-GCS-accessing types of instruction to accessing non-GCS regions, security can be improved.

If at step 1220 the memory access request is determined not to be a GCS memory access request, then at step 1222 the MMU 28 determines whether any other access permissions are satisfied for the memory access request. For example, this could include the checks based on security state, exception level or operating mode as discussed above, and could also include checks based on the partially-read-only region type or anti-aliasing property 79 mentioned earlier. Also, if the memory access request is triggered by the protected-entry-checking type of RCW instruction mentioned earlier, whether the access is allowed may also depend on the check of the old data read from the target location corresponding to the target VA. If all required access conditions are satisfied, at step 1224 the memory access request is allowed. If any access permission is breached, then a fault is signalled at step 1206.

While FIG. 24 shows a single step 1206 signalling a fault in response to a number of different checks being failed, it will be appreciated that some implementations may signal different fault types depending on the cause of the fault.

Also, while FIG. 24 shows an example in which no fault is necessary when a non-GCS read request targets a GCS region, other examples could omit step 1205 and could proceed from step 1204 to step 1206 to signal the fault if the memory access request targeting a GCS region of memory is not a GCS memory access request, regardless of whether the memory access request is a read request or a write request.

In the case when the GCS mode is currently disabled using the GCS enable parameter 1052, then GCS-accessing instructions may trigger a fault (e.g. an undefined instruction fault) or be treated as a no-operation (NOP) instruction. Also, memory access requests other than GCS access requests may cause the checks shown at steps 1212 or 1222 of FIG. 24 to be performed, but the checks at steps 1203, 1204, 1208, 1210 and 1220 may be omitted when the GCS mode is disabled.

Figure 25:
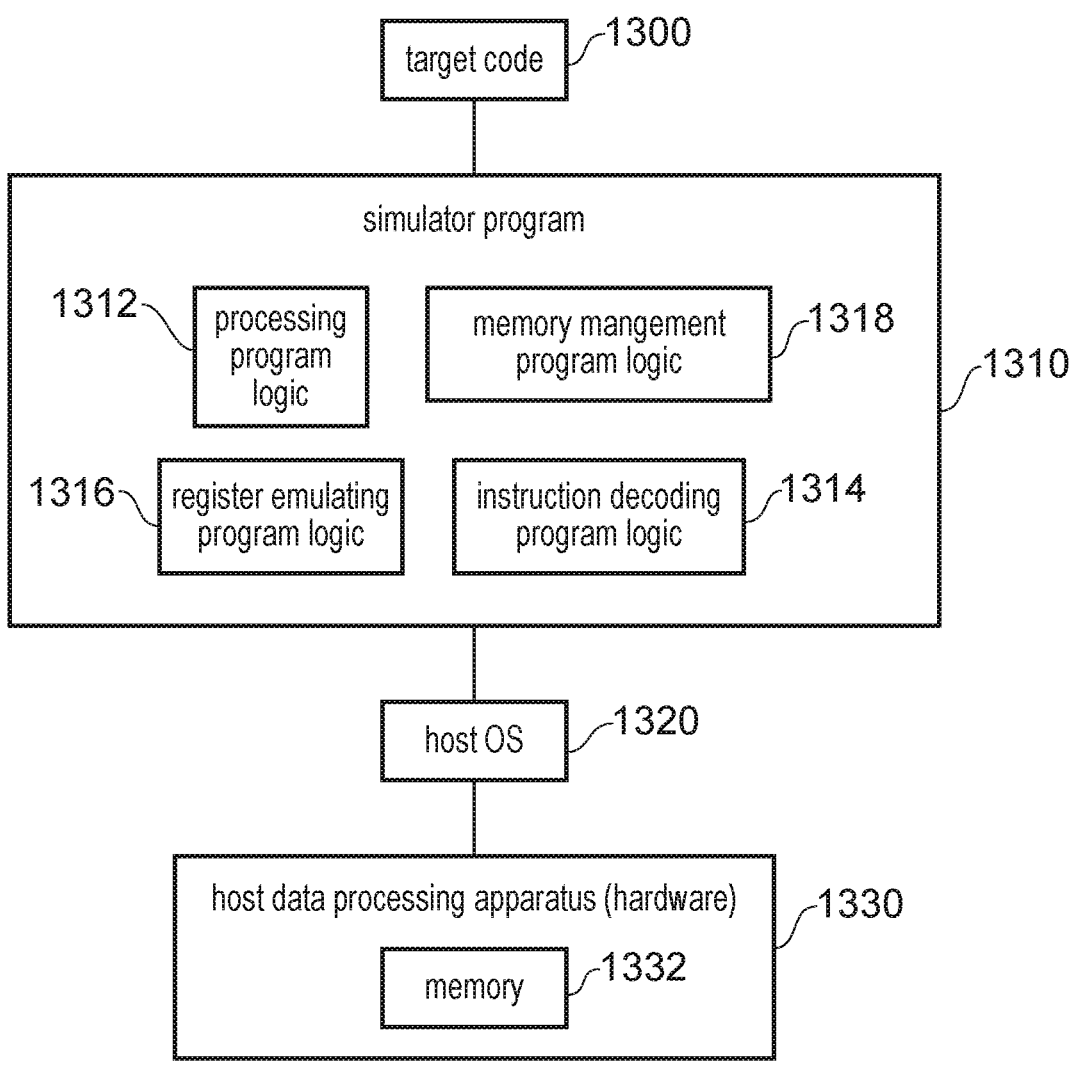
FIG. 25 illustrates a simulator implementation that may be used.

FIG. 25 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1330, optionally running a host operating system 1320, supporting the simulator program 1310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1330), some simulated embodiments may make use of the host hardware, where suitable.

The simulator program 1310 may be stored on a computer-readable storage medium (which may be a non-transitory medium), and provides a program interface (instruction execution environment) to the target code 1300 (which may include applications, operating systems and a hypervisor) which is the same as the interface of the hardware architecture being modelled by the simulator program 1310. Thus, the program instructions of the target code 1300, including the protected-entry-checking RCW instructions and GCS-accessing instructions described above, may be executed from within the instruction execution environment using the simulator program 1310, so that a host computer 1330 which does not actually have the hardware features of the apparatus 2 discussed above can emulate these features. Similarly, the various memory management checking functions as discussed above, including support for PRO region type, anti-aliasing property and GCS memory region type, may be emulated using memory management program logic 1318 of the simulator program 1310.

Hence, the simulator program 1310 may have processing program logic 1312 which simulates the state of the processing circuitry 4 described above. For example the processing program logic 1312 may control transitions of execution state EL0-EL3 in response to events occurring during simulated execution of the target code 1300. Instruction decoding program logic 1314 decodes instructions of the target code 1300 and maps these to corresponding sets of instructions in the native instruction set of the host apparatus 1330. The register emulating program logic 1316 maps register accesses requested by the target code to accesses to corresponding data structures maintained on the host hardware of the host apparatus 1330, such as by accessing data in registers or memory 1332 of the host apparatus 1330. Memory management program logic 1318 implements address translation, page table walks and access control checking in a corresponding way to the MMU 28 described in the hardware-implemented embodiment above, but also has the additional function of mapping the simulated physical addresses, obtained by the stage-2 mapping in the address translation based on the page tables defined for the target code 1300, to host virtual addresses used to access host memory 1332. These host virtual addresses may themselves be translated into host physical addresses using the standard address translation mechanisms supported by the host (the translation of host virtual addresses to host physical addresses being outside the scope of what is controlled by the simulator program 1310).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry configured to execute instructions in one of a plurality of execution states; and memory management circuitry configured to translate, in response to a memory access request specifying a target virtual address corresponding to a target memory region to be accessed, the target virtual address into a target physical address, where a mapping from the target virtual address to the target physical address depends at least on a stage-1 address mapping specified for the target virtual address by a target stage-1 translation table entry in a stage-1 translation table structure, the stage-1 translation table structure being accessible using a stage-1 base address settable by an instruction executed by the processing circuitry in a first execution state; in which:

at least when the memory access request is a write request, the memory management circuitry is configured to reject the memory access request in response to determining that both of the following conditions are satisfied:

stage-1 permission information specified by the target stage-1 translation table entry specifies that the target memory region is a guarded control stack (GCS) region for storing a GCS data structure for protecting return state information for returning from a function call or exception; and the memory access request is a request other than a GCS memory access request triggered by one of a restricted subset of GCS-accessing types of instruction;

the memory management circuitry is configured to support a translation hardening mechanism for defining, based at least on translation hardening information settable by an instruction executed by the processing circuitry in a second execution state with greater privilege than the first execution state, at least one hardened stage-1 translation table entry which is protected by the translation hardening mechanism from being tampered with by an instruction executed in the first execution state;

when an anti-aliasing property is specified for the target memory region, the memory management circuitry is configured to reject the memory access request in response to detecting that the target stage-1 translation table entry or another stage-1 translation table entry used to locate the target stage-1 translation table entry is an unhardened translation table entry which is unprotected by the translation hardening mechanism; and in at least one operating state of the processing circuitry, the memory management circuitry is configured to reject the memory access request in response to determining that the memory access request is said GCS memory access request and the anti-aliasing property is not specified for the target memory region.

2. The apparatus according to claim 1, in which the memory management circuitry is configured to support two-stage address translation in which the stage-1 address mapping comprises a mapping from the target virtual address to a target intermediate address, and the address mapping from the target virtual address to the target physical address also depends on a stage-2 address mapping from the target intermediate address to the target physical address specified for the target intermediate address by a target stage-2 translation table entry in a stage-2 translation table structure, the stage-2 translation table structure being accessible using a stage-2 base address settable by an instruction executed by the processing circuitry in the second execution state.

3. The apparatus according to claim 2, in which the target stage-2 translation table entry specifies whether the anti-aliasing property is specified for the target memory region.

4. The apparatus according to claim 2, in which, for a given stage-1 translation table entry stored at a given memory region corresponding to a given intermediate address, the translation hardening information for specifying whether the given stage-1 translation table entry is a hardened stage-1 translation table entry includes stage-2 permission information specified by a corresponding stage-2 translation table entry corresponding to the given intermediate address.

5. The apparatus according to claim 4, in which each hardened stage-1 translation table entry comprises a stage-1 translation table entry for which the given memory region storing that stage-1 translation table entry is indicated by the stage-2 permission information of the corresponding stage-2 translation table entry as being one of:

a read-only memory region for which write requests are prohibited; and a partially-read-only memory region for which write requests to the partially-read-only memory region are permitted for a restricted subset of write request types and prohibited for write request types other than the restricted subset, the restricted subset of write request types comprising at least a metadata-updating write request generated by the memory management circuitry to update access tracking metadata in a translation table entry.

6. The apparatus according to claim 5, in which the stage-2 permission information has encodings for indicating both the read-only memory region and the partially-read-only memory region.

7. The apparatus according to claim 4, in which the stage-2 permission information specifies whether the given memory region is a partially-read-only memory region for which write requests to the partially-read-only memory region are permitted for a restricted subset of write request types and prohibited for write request types other than the restricted subset, the restricted subset of write request types comprising at least a metadata-updating write request generated by the memory management circuitry to update access tracking metadata in a translation table entry; and the memory management circuitry is configured to support each stage-1 translation table entry of the first translation table structure having an encoding specifying whether that stage-1 translation table entry is a protected entry for which updates are restricted in comparison to unprotected stage-1 translation table entries not specified as a protected entry, the restricted subset of write requests types including a write request type allowed to update an unprotected stage-1 translation table entry but prohibited from updating at least a subset of bits of a protected stage-1 translation table entry.

8. The apparatus according to claim 7, comprising protected-entry-checking circuitry responsive to the processing circuitry executing a protected-entry-checking type of read-check-write instruction for requesting an update to a given memory system location, to:

read data from the given memory system location, check whether the data read from the given memory system location has a value consistent with a stage-1 translation table entry specified as a protected entry, and in response to determining that the data read from the given memory system location has a value consistent with a stage-1 translation table entry specified as a protected entry, prevent an update-restricted subset of bits of the stage-1 translation table entry from being updated in response to the read-check-write instruction; said restricted subset of write request types including a write request issued in response to the protected-entry-checking type of read-check-write instruction.

9. The apparatus according to claim 7, in which the translation hardening information comprises information indicating whether a given stage-1 translation table entry is specified as the protected entry, and the memory management circuitry is configured to treat an unprotected stage-1 translation table entry as an unhardened stage-1 translation table entry when the stage-2 permission information specified by the corresponding stage-2 translation table entry specifies that the given memory region is the partially-read-only memory region.

10. The apparatus according to claim 7, in which each hardened stage-1 translation table entry comprises one of:

a stage-1 translation table entry for which the given memory region is indicated by the stage-2 permission information as being a read-only memory region for which write requests are prohibited; and a stage-1 translation table entry specified as a protected entry for which the given memory region is indicated by the stage-2 permission information as being the partially-read-only memory region.

11. The apparatus according to claim 1, in which said at least one operating state of the processing circuitry comprises an operating state in which a GCS-translation-hardening-check enable control parameter is set to an enable state indicating that GCS memory access requests are to be subject to a check of whether the anti-aliasing property is specified for the target memory region.

12. The apparatus according to claim 1, in which the memory management circuitry is configured to reject the memory access request in response to determining that the memory access request is said GCS memory access request and that the stage-1 permission information does not specify that the memory region corresponding to the target virtual address is the GCS region.

13. The apparatus according to claim 1, in which the restricted subset of GCS-accessing types of instruction comprises a return state push instruction to control the processing circuitry to push return state information, obtained based on information indicated in one or more registers of the processing circuitry, to the GCS data structure.

14. The apparatus according to claim 1, in which the restricted subset of GCS-accessing types of instruction comprises a return state pop instruction to control the processing circuitry to pop return state information from the GCS data structure.

15. The apparatus according to claim 1, comprising at least one GCS-pointer register to store a stack pointer indicative of an address of the guarded-control-stack data structure.

16. The apparatus according to claim 1, in which the stage-1 permission information specifying whether the target memory region is the GCS region is specified in a field of a permission indirection register referenced by the target stage-1 translation table entry.

17. A computer-implemented method comprising:

executing instructions in one of a plurality of execution states; and in response to a memory access request specifying a target virtual address corresponding to a target memory region to be accessed, translating the target virtual address into a target physical address, where a mapping from the target virtual address to the target physical address depends at least on a stage-1 address mapping specified for the target virtual address by a target stage-1 translation table entry in a stage-1 translation table structure, the stage-1 translation table structure being accessible using a stage-1 base address settable by an instruction executed by processing circuitry in a first execution state; in which:

at least when the memory access request is a write request, the memory access request is rejected in response to determining that both of the following conditions are satisfied:

stage-1 permission information specified by the target stage-1 translation table entry specifies that the target memory region is a guarded-control-stack (GCS) region for storing a GCS data structure for protecting return state information for returning from a function call or exception; and the memory access request is a request other than a GCS memory access request triggered by one of a restricted subset of GCS-accessing types of instruction;

a translation hardening mechanism is supported for defining, based at least on translation hardening information settable by an instruction executed in a second execution state with greater privilege than the first execution state, at least one hardened stage-1 translation table entry which is protected by the translation hardening mechanism from being tampered with by an instruction executed in the first execution state; and the method comprises:

when an anti-aliasing property is specified for the target memory region, rejecting the memory access request in response to detecting that the target stage-1 translation table entry or another stage-1 translation table entry used to locate the target stage-1 translation table entry is an unhardened translation table entry which is unprotected by the translation hardening mechanism; and in at least one operating state of the processing circuitry, rejecting the memory access request in response to determining that the memory access request is said GCS memory access request and the anti-aliasing property is not specified for the target memory region.

18. A non-transitory storage medium storing a computer program comprising instructions which, when executed by a host data processing apparatus, control the host data processing apparatus to provide an instruction execution environment for executing target code, the computer program comprising:

processing program logic to simulate execution of instructions of the target code in one of a plurality of execution states; and memory management program logic to translate, in response to a memory access request specifying a target virtual address corresponding to a target memory region to be accessed, the target virtual address into a simulated target physical address, where a mapping from the target virtual address to the simulated target physical address depends at least on a stage-1 address mapping specified for the target virtual address by a target stage-1 translation table entry in a stage-1 translation table structure, the stage-1 translation table structure being accessible using a stage-1 base address settable by an instruction simulated as being executed in a first execution state; in which: at least when the memory access request is a write request, the memory management program logic is configured to reject the memory access request in response to determining that both of the following conditions are satisfied: stage-1 permission information specified by the target stage-1 translation table entry specifies that the target memory region is a guarded-control-stack (GCS) region for storing a GCS data structure for protecting return state information for returning from a function call or exception; and the memory access request is a request other than a GCS memory access request triggered by one of a restricted subset of GCS-accessing types of instruction; the memory management program logic is configured to support a translation hardening mechanism for defining, based at least on translation hardening information settable by an instruction simulated as being executed in a second execution state with greater privilege than the first execution state, at least one hardened stage-1 translation table entry which is protected by the translation hardening mechanism from being tampered with by an instruction simulated as being executed in the first execution state; when an anti-aliasing property is specified for the target memory region, the memory management program logic is configured to reject the memory access request in response to detecting that the target stage-1 translation table entry or another stage-1 translation table entry used to locate the target stage-1 translation table entry is an unhardened translation table entry which is unprotected by the translation hardening mechanism; and in at least one operating state of the processing program logic, the memory management program logic is configured to reject the memory access request in response to determining that the memory access request is said GCS memory access request and the anti-aliasing property is not specified for the target memory region.

* * * * *